April 18, 1967  J. H. FITZWATER  3,314,216
APPARATUS FOR FORMING AND FILLING CARTONS
Filed Feb. 17, 1964  40 Sheets-Sheet 1

INVENTOR.
JOHN H. FITZWATER
BY
*Salter & Michaelson*
ATTORNEYS

April 18, 1967   J. H. FITZWATER   3,314,216
APPARATUS FOR FORMING AND FILLING CARTONS
Filed Feb. 17, 1964   40 Sheets-Sheet 2

INVENTOR.
JOHN H. FITZWATER
BY
Salter & Michaelson
ATTORNEYS

INVENTOR.
JOHN H. FITZWATER
BY
*Salter & Nicholson*
ATTORNEYS

April 18, 1967  J. H. FITZWATER  3,314,216
APPARATUS FOR FORMING AND FILLING CARTONS
Filed Feb. 17, 1964  40 Sheets-Sheet 5

INVENTOR.
JOHN H. FITZWATER
BY
*Salter & Michaelson*
ATTORNEYS

INVENTOR.
JOHN H. FITZWATER
BY
ATTORNEYS

April 18, 1967 J. H. FITZWATER 3,314,216
APPARATUS FOR FORMING AND FILLING CARTONS
Filed Feb. 17, 1964 40 Sheets-Sheet 9

INVENTOR.
JOHN H. FITZWATER
BY
ATTORNEYS

INVENTOR.
JOHN H. FITZWATER
BY
*Salter & Michaelson*
ATTORNEYS

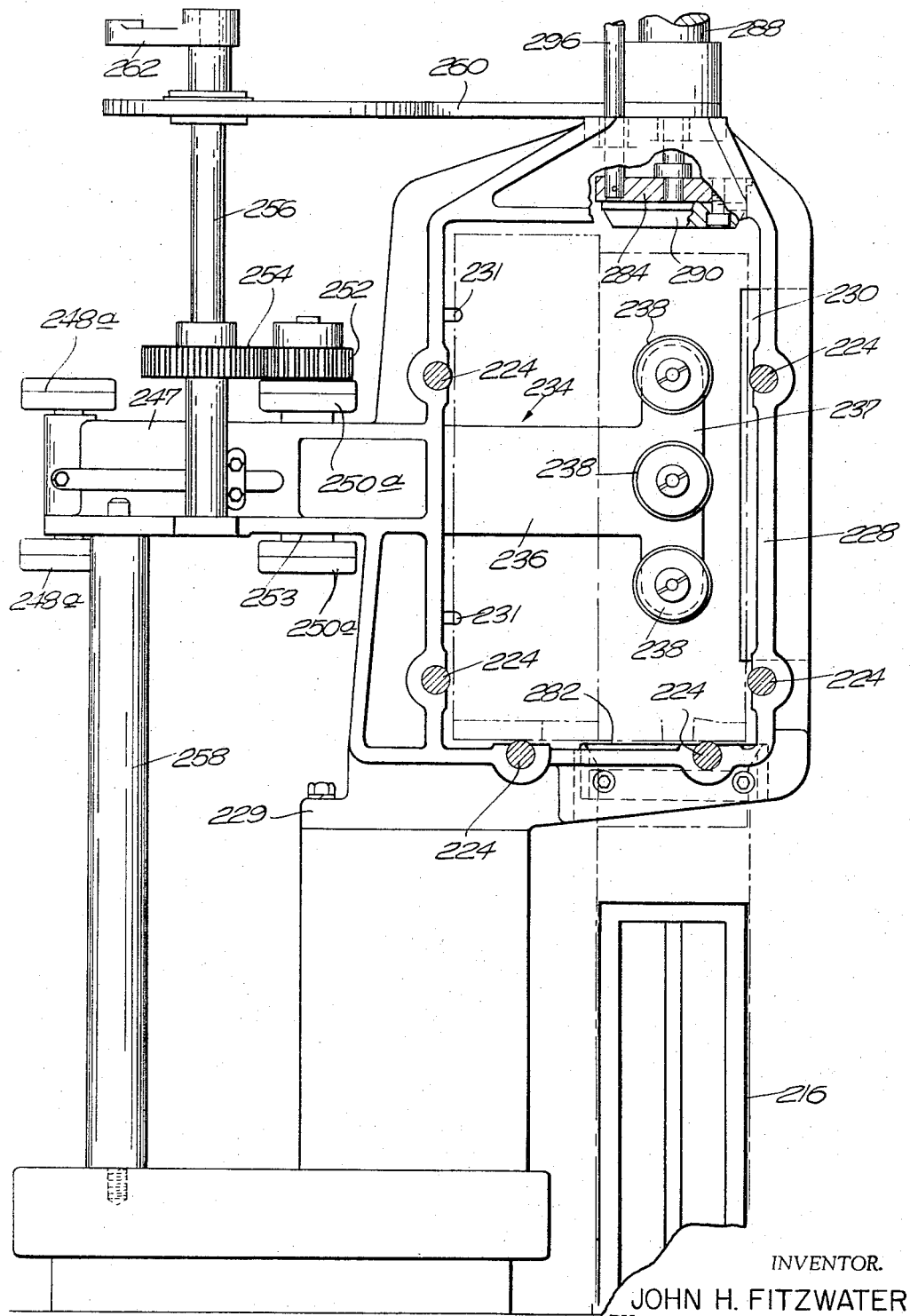

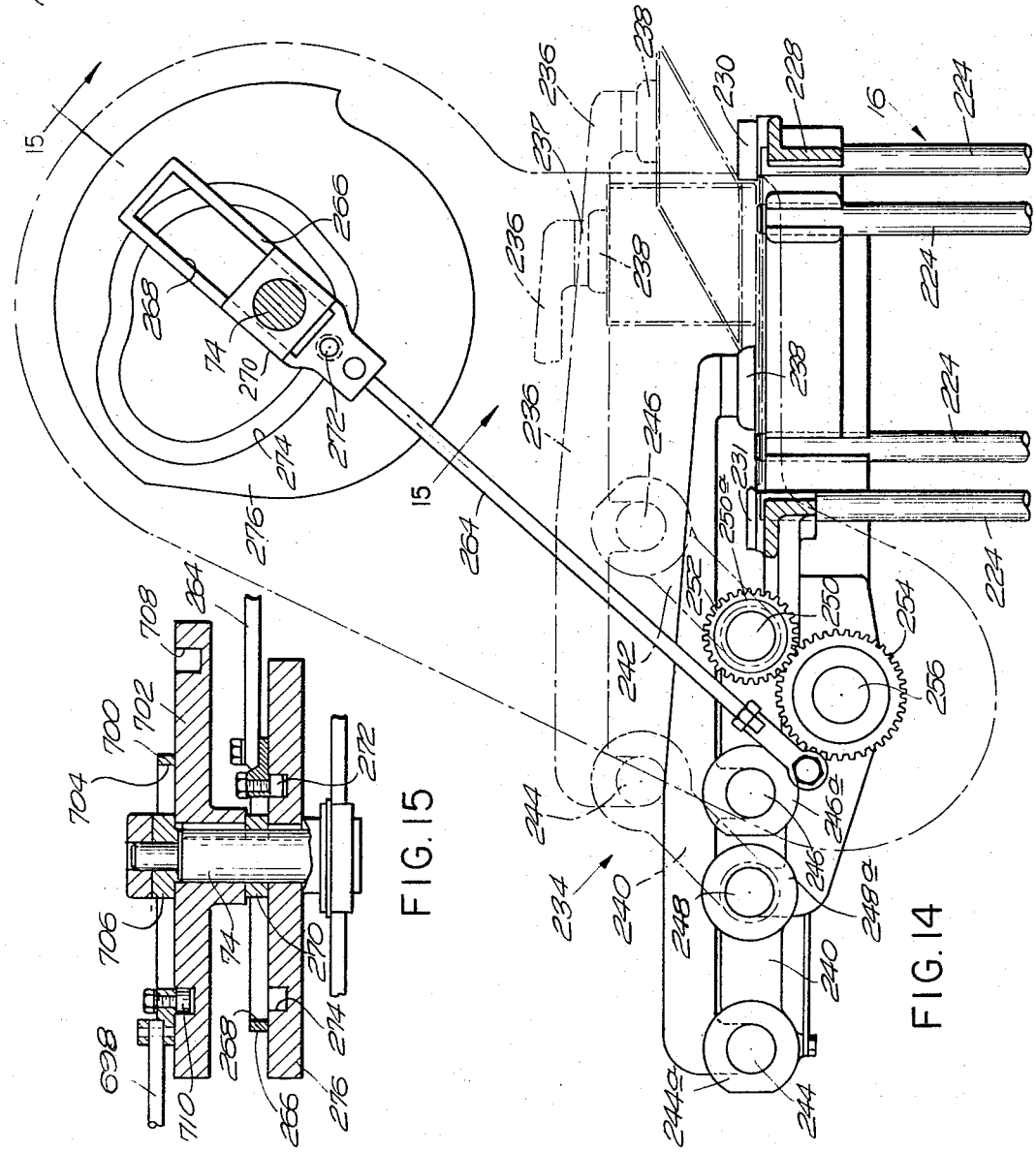

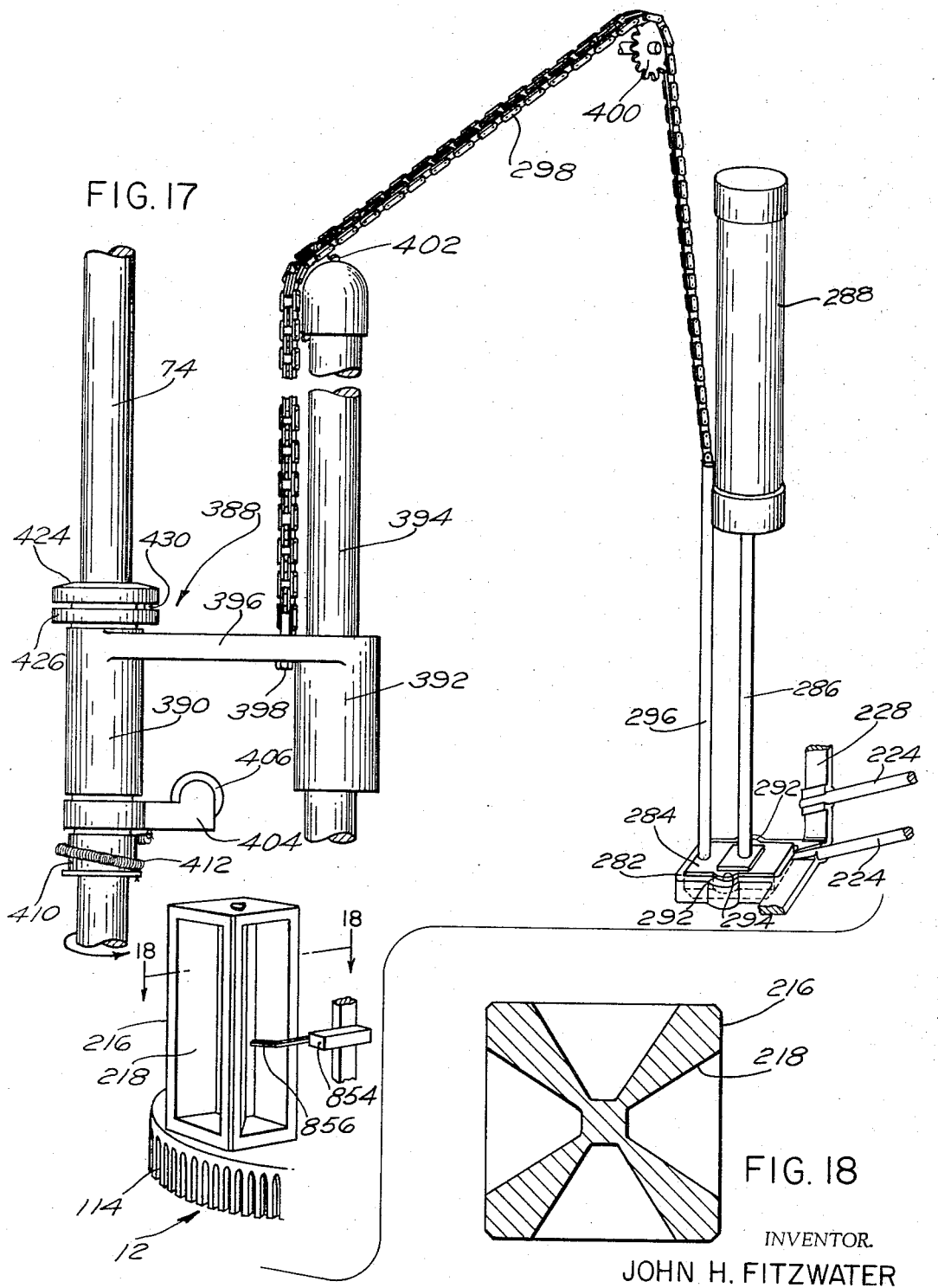

April 18, 1967 J. H. FITZWATER 3,314,216
APPARATUS FOR FORMING AND FILLING CARTONS
Filed Feb. 17, 1964 40 Sheets-Sheet 15

INVENTOR.
JOHN H. FITZWATER
BY
Salter & Michaelis
ATTORNEYS

INVENTOR.
JOHN H. FITZWATER
BY
ATTORNEYS

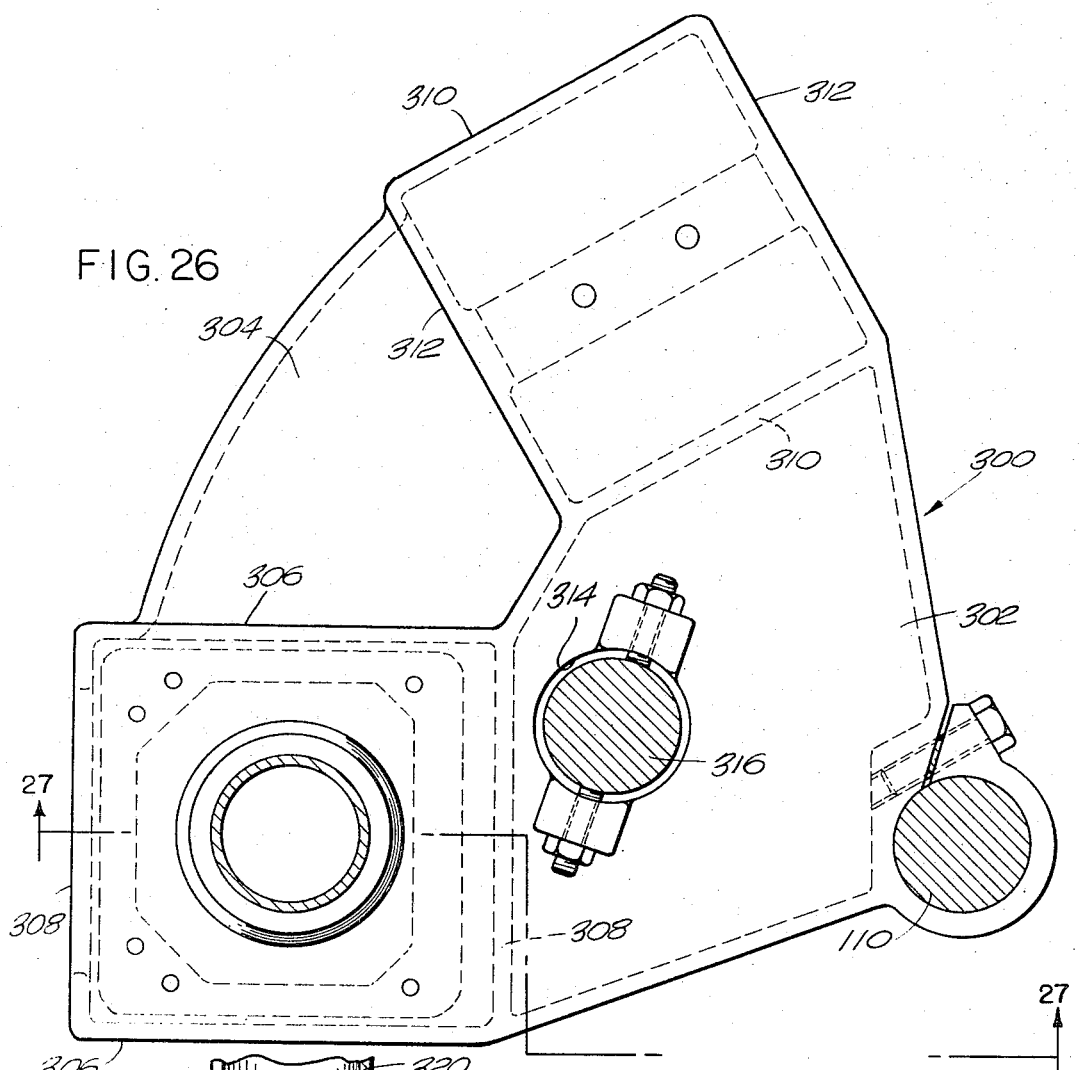
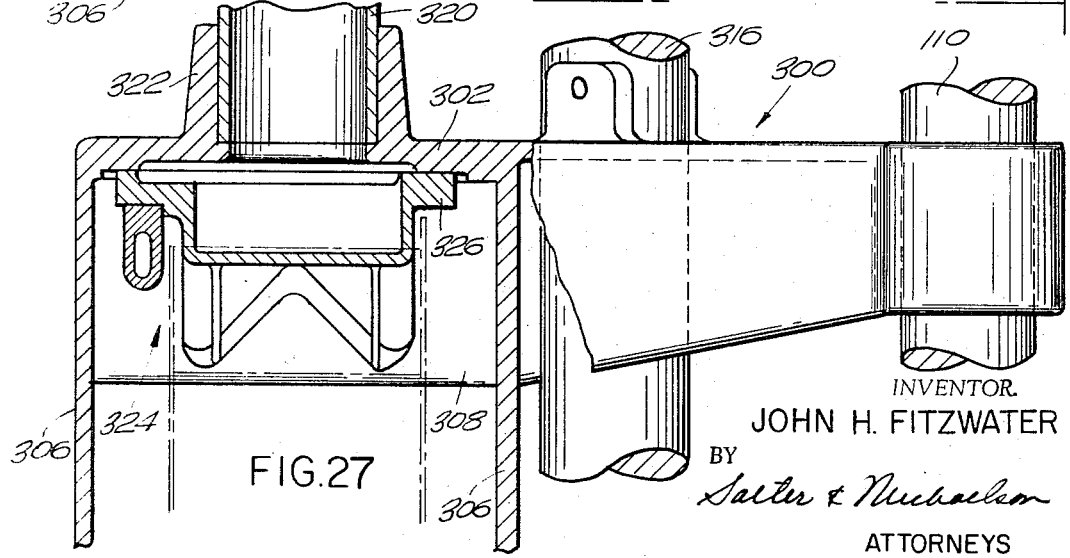

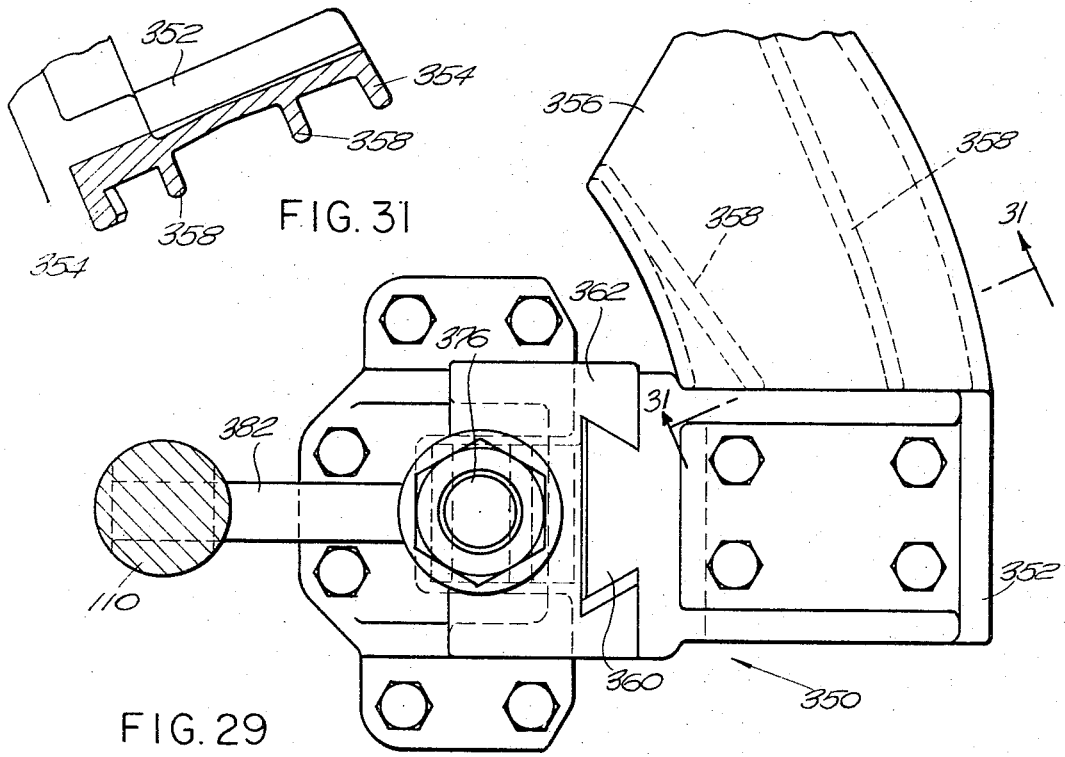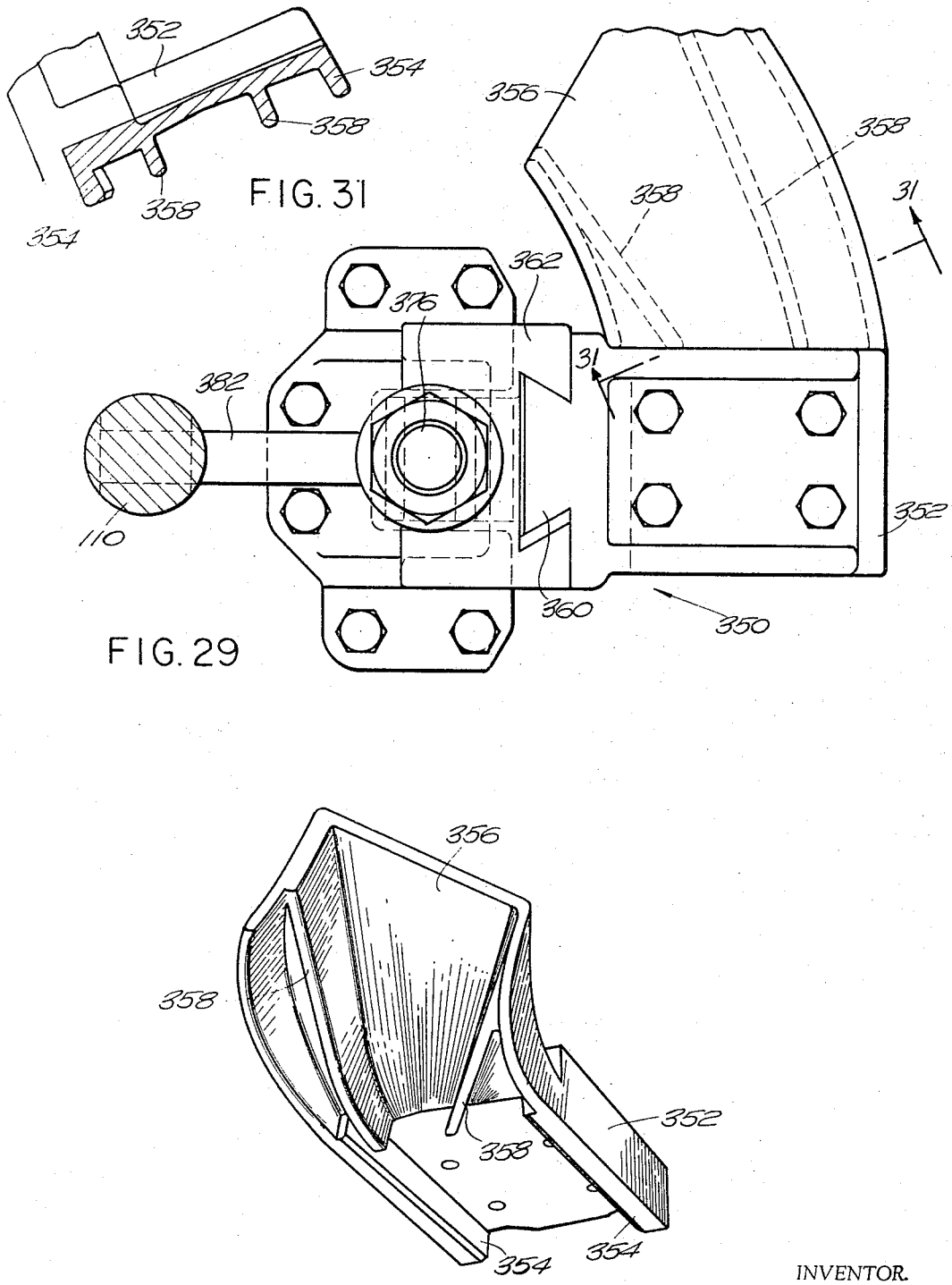

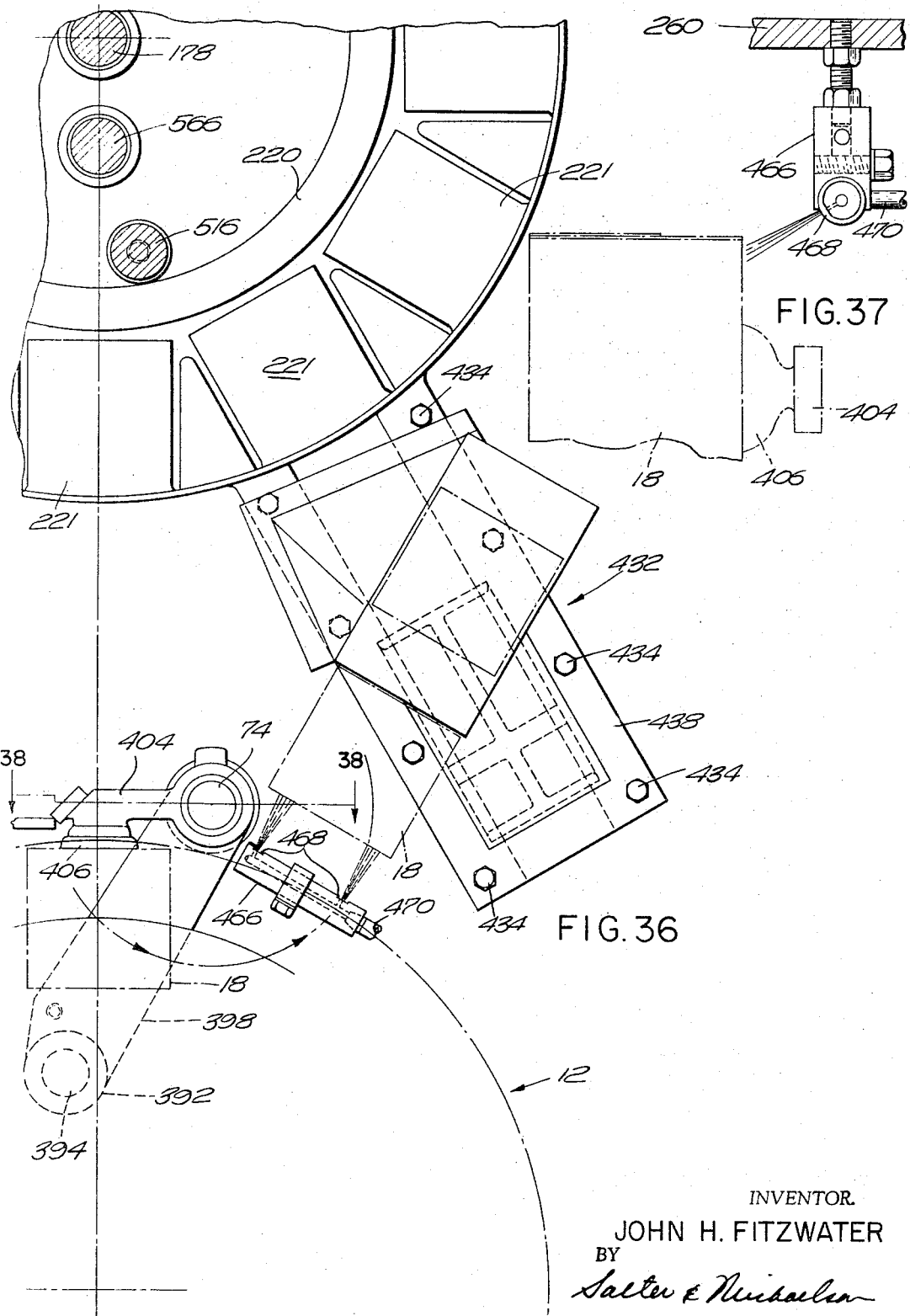

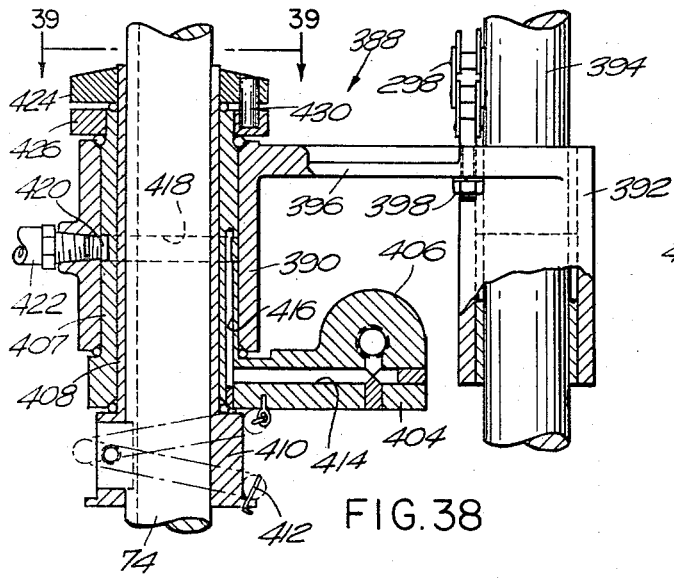

INVENTOR.
JOHN H. FITZWATER
BY
ATTORNEYS

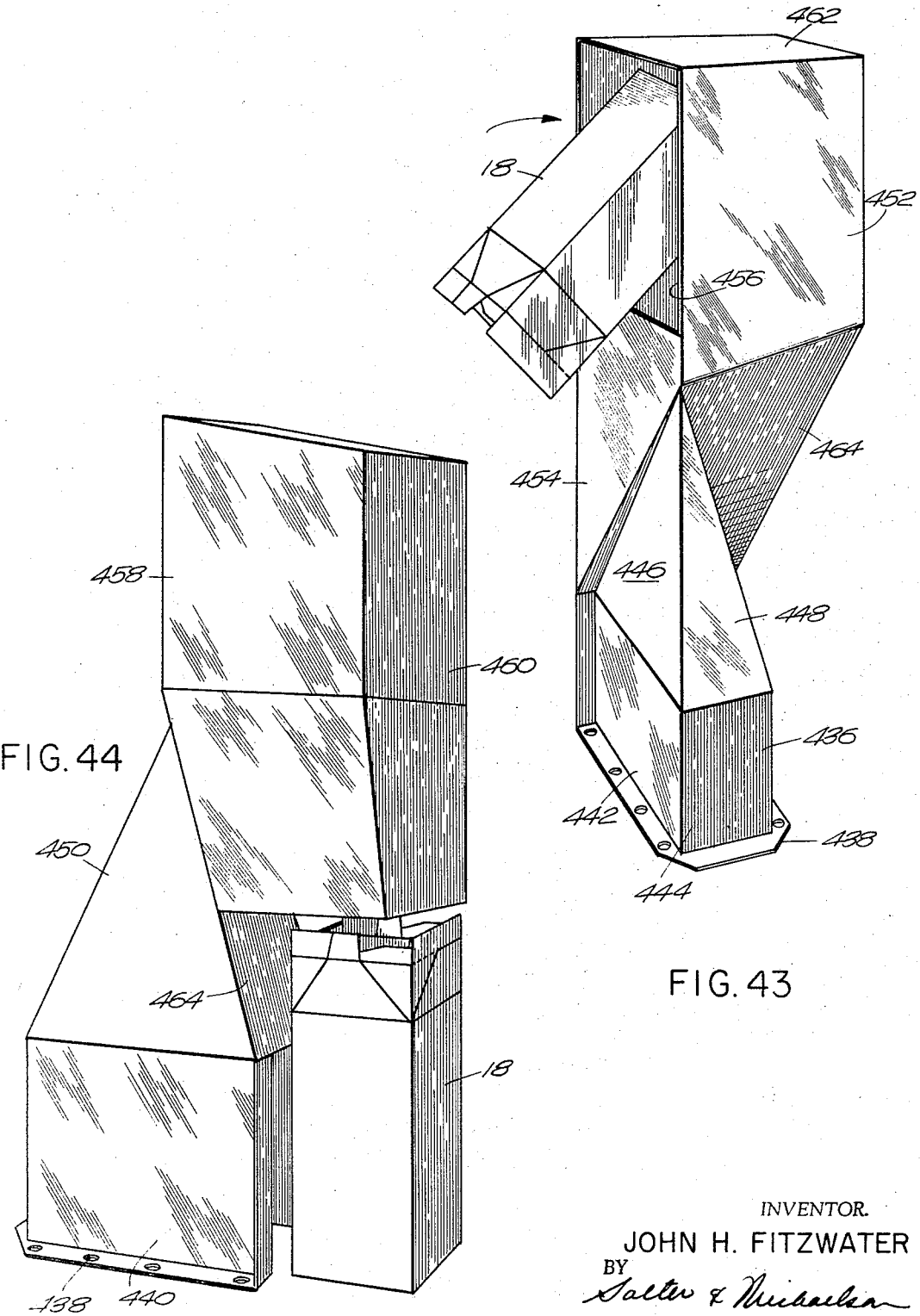

April 18, 1967  J. H. FITZWATER  3,314,216
APPARATUS FOR FORMING AND FILLING CARTONS
Filed Feb. 17, 1964  40 Sheets-Sheet 25

INVENTOR.
JOHN H. FITZWATER
BY
Salter & Nicholson
ATTORNEYS

April 18, 1967 J. H. FITZWATER 3,314,216
APPARATUS FOR FORMING AND FILLING CARTONS
Filed Feb. 17, 1964 40 Sheets-Sheet 26

INVENTOR.
JOHN H. FITZWATER
BY
*Salter & Michaelson*
ATTORNEYS

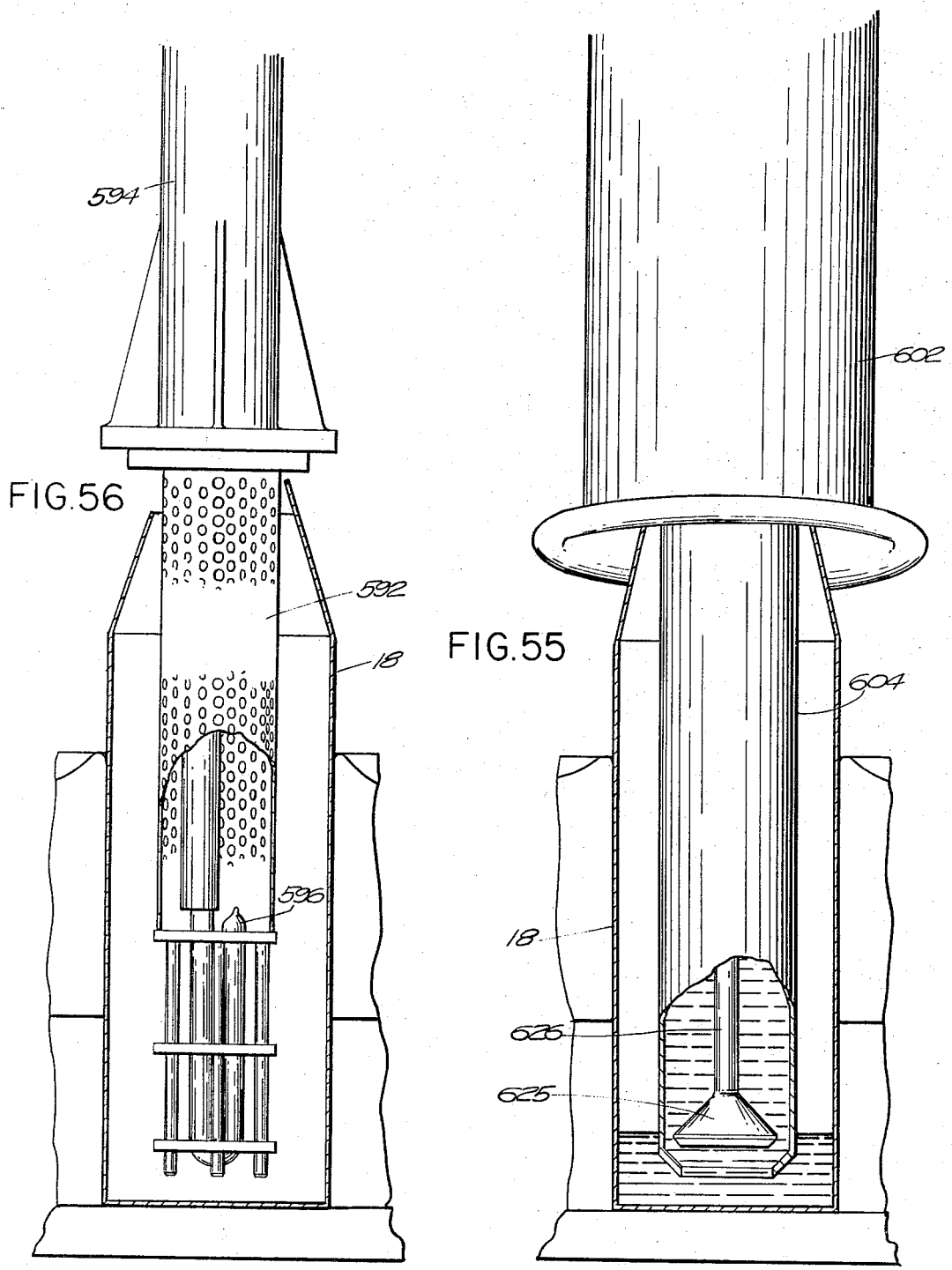

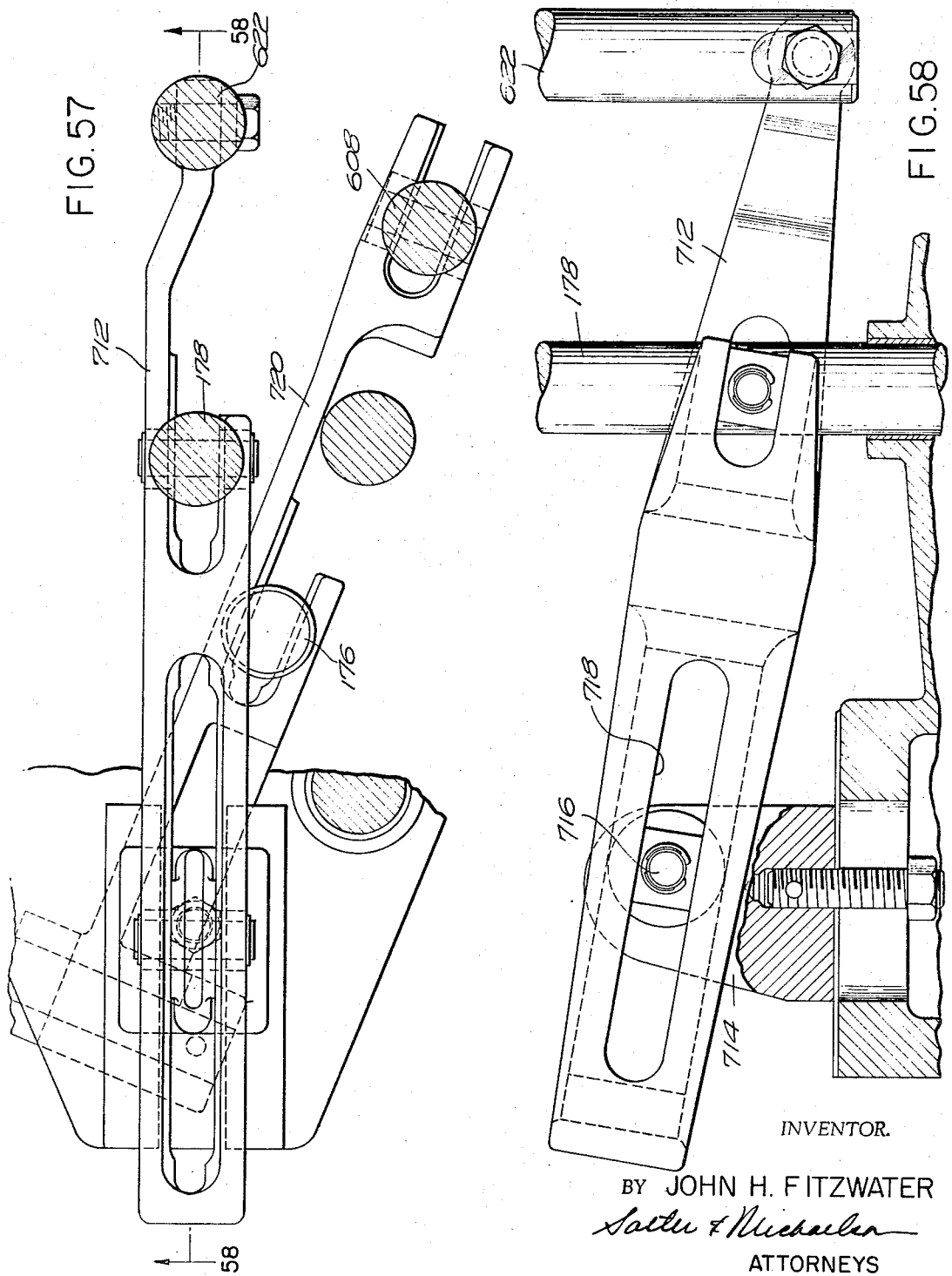

INVENTOR.
JOHN H. FITZWATER
BY Salter & Michaelson
ATTORNEYS

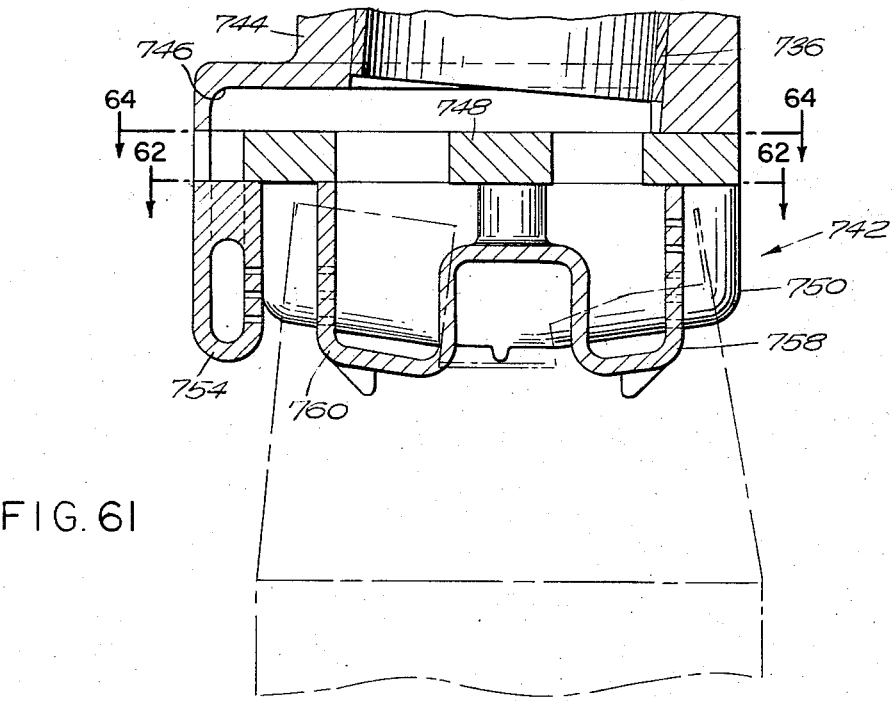
FIG. 61
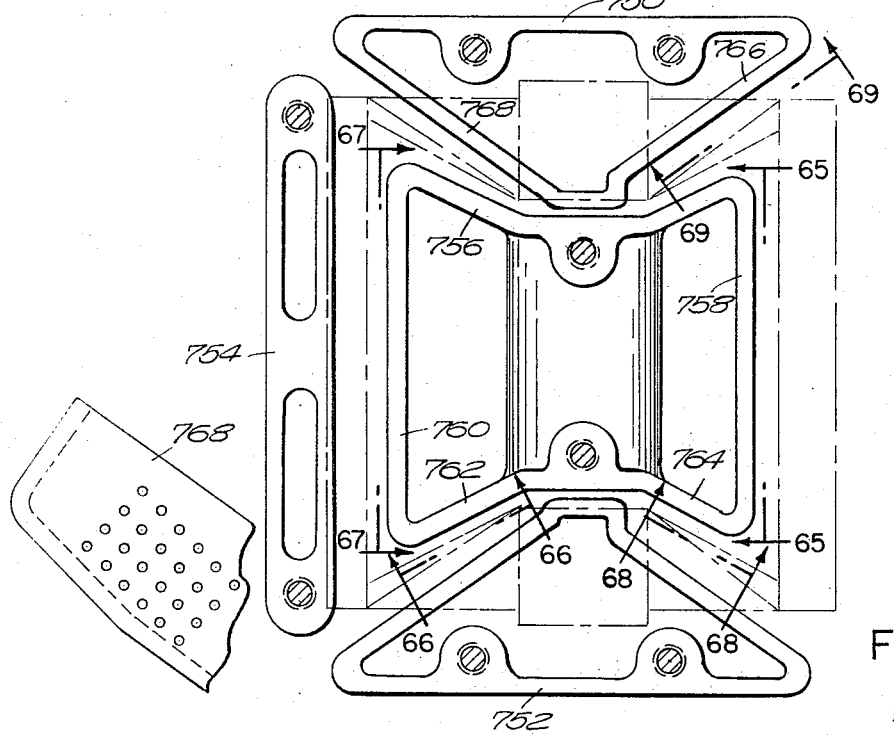
FIG. 63
FIG. 62
INVENTOR.
JOHN H. FITZWATER
BY
Salter & Michaelson
ATTORNEYS April 18, 1967   J. H. FITZWATER   3,314,216
APPARATUS FOR FORMING AND FILLING CARTONS
Filed Feb. 17, 1964   40 Sheets-Sheet 35

INVENTOR.
JOHN H. FITZWATER
BY
*Salter & Michaelson*
ATTORNEYS

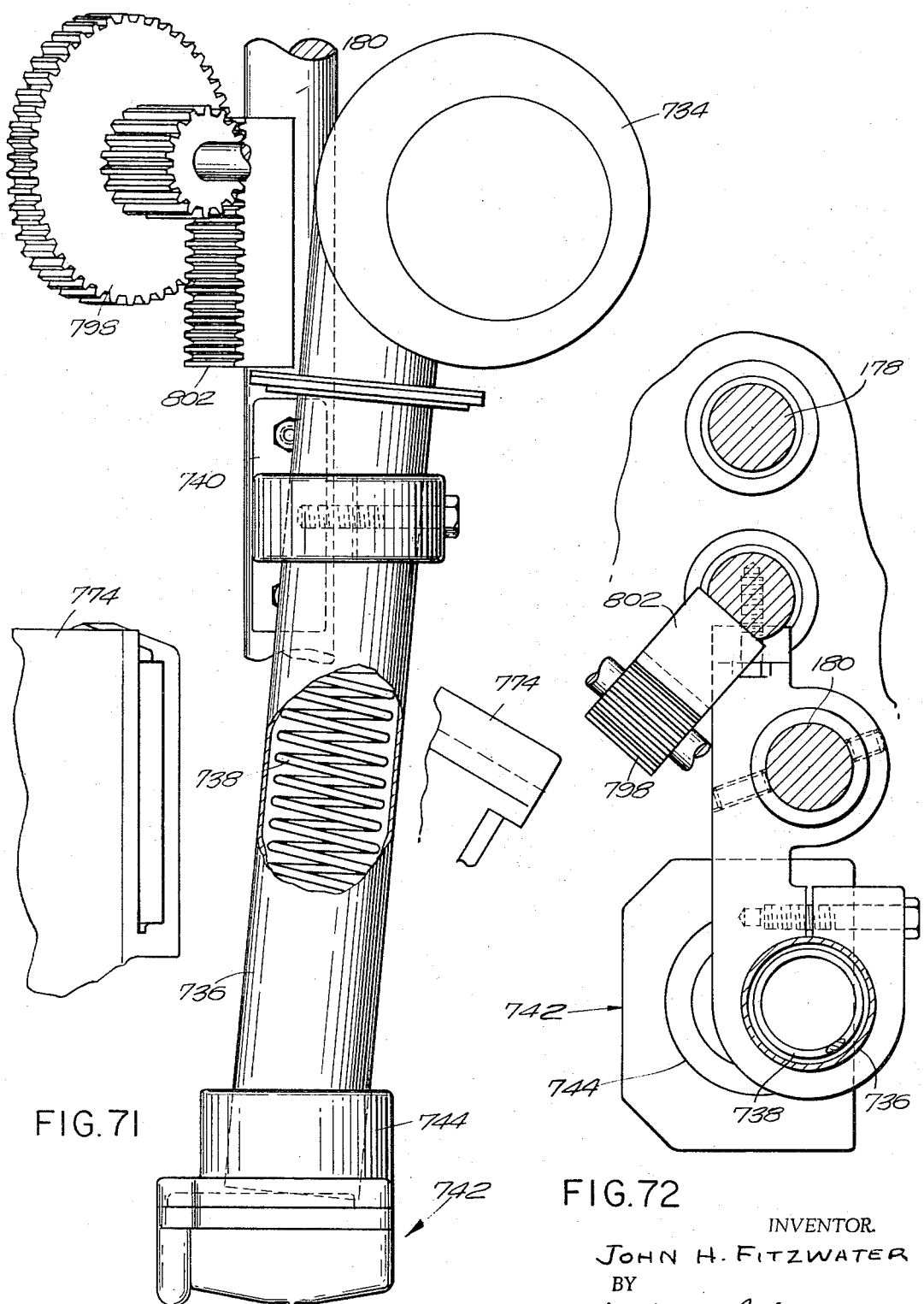

April 18, 1967 J. H. FITZWATER 3,314,216
APPARATUS FOR FORMING AND FILLING CARTONS
Filed Feb. 17, 1964 40 Sheets-Sheet 37

INVENTOR.
JOHN H. FITZWATER
BY
Salter & Michaelson
ATTORNEYS

INVENTOR.
JOHN H. FITZWATER

INVENTOR.
JOHN H. FITZWATER
BY
Salter & Michaelson
ATTORNEYS

United States Patent Office

3,314,216
Patented Apr. 18, 1967

3,314,216
APPARATUS FOR FORMING AND FILLING
CARTONS
John H. Fitzwater, Pawtucket, R.I., assignor, by mesne
assignments, to American Can Company, New York,
N.Y., a corporation of New Jersey
Filed Feb. 17, 1964, Ser. No. 345,239
99 Claims. (Cl. 53—186)

The present invention relates to a carton forming and filling machine. More particularly, the present invention relates to a machine for automatically processing a plurality of plastic coated paper board cartons that are received in the machine in inverted flat tubular form and are in successive steps erected to substantially a square form, sealed at the bottoms thereof, reversed in position, filled with a liquid, sealed at the tops thereof and then unloaded for further handling. The machine embodied herein as intended for use, is primarily concerned with the filling of the cartons with milk, although other liquids may be inserted in the carton without departing from the spirit of the invention.

The use of plastic coated paper board for the packaging of liquids such as milk has come into common practice in recent years and is now generally accepted by the public, particularly when the cartons are dispensed at grocery stores. The containers for packaging liquids have varied in some respect, although the more popular form of container includes a convenient top panel construction that provides for the deforming of the top of the container from the sealed position thereof to form a pouring spout for dispensing the liquid from the container. Automatic equipment has been developed heretofore for the forming and filling of these containers with a liquid and such equipment has found some favor in the trade. However the heretofore known forming and filling apparatus has been overly complicated in structure and as a result has been available only to the larger and more productive dairies.

The present invention, in addition to including unique and novel features of construction for automatically carrying out the forming and filling of cartons with a liquid, is compact in arrangement and therefore is economically more desirable than the heretofore known forming and filling machines. Contrary to the construction of the prior known carton forming and filling machines, the present invention incorporates a unique concept in the use of circular work tables that are interconnected, wherein the rotation of one table causes the other table to be rotated a corresponding angular distance. In order to carry out the working operations as the cartons are processed, each of the work tables of the present invention is provided with a plurality of work stations, the tables being periodically indexed so that the cartons that have been loaded thereon are sequentially transferred from one work station to another and all within the confines of the adjacent work tables. Since it is essential in the operation of the forming and filling machines embodied herein that the adjacent tables be synchronized during the movement thereof, the interconnection of the tables insures that they will be rotated in unison and in accordance with the work operations to be performed thereat.

One of the unique features of the present invention is the provision of a single source of power for all of the operating mechanisms of the machine. Thus the various tools and operating devices are interconnected to the single source of power and are driven therefrom in such a way that the work operations are synchronized after each indexing movement of the tables. Since the forming and filling tables at which the work stations are located are circular and are adapted to be rotated as the cartons are processed from one station to another, the various tools and work devices positioned at the stations are prevented from movement with the tables. However provision is made for movement of these work devices in a vertical direction at the various work stations. It is for this reason that the operating work devices are located interiorly of the periphery of the tables, whereby the machine exterior is maintained free and unencumbered in accordance with sanitary and health requirements.

Accordingly, it is an object of the present invention to provide a machine for forming and filling cartons that is compact in construction and that is automatic in operation so as to permit the successive handling of a plurality of cartons from their flat-folded tubular form to erected, filled and sealed condition.

Another object of the present invention is to teach a unique method of forming and filling plastic-coated paper board cartons, wherein the top and bottom panels of the cartons are closed and sealed in a particular manner, and the cartons are handled during the closing and sealing process within a confined area.

Still another object of the invention is to provide a machine for processing a plurality of cartons from flat-folded position to erected and sealed position, wherein side-by-side work tables are employed and are rotated in corresponding relation to perform a series of work operations on said cartons during the forming and filling thereof.

Still another object to provide a machine for forming and filling plastic-coated paper board cartons that includes a pair of rotatable tables on which the cartons are processed, one of the tables being interconnected to a drive mechanism for the periodic indexing thereof and the other table being drivingly connected to the first table and being rotatably indexed in accordance with the rotary movement of the first table.

Still another object is to provide a unique drive assembly for a carton form and fill machine, the drive assembly defining the source of power for the various work devices and operating mechanisms carried by the machine.

Still another object is to provide a machine for forming and filling cartons that includes a carton feed and load mechanism, wherein cartons are successively removed, erected in tubular form and loaded in a linear motion onto a circular work table for the processing of the cartons thereon.

Still another object is to provide a machine for processing tubular cartons from flat-folded to inverted, erected form, wherein the bottoms of the cartons are heated, pre-folded and sealed prior to the reversal of the cartons for the further processing thereof.

Still another object is to provide a pre-folding device for use in the forming of the bottoms of cartons, the pre-folding device being adapted to pre-break bottom panels of the cartons along the score lines thereof prior to the sealing of the panels.

Still another object is to provide a unique bottom sealing construction for sealing the bottoms of cartons in a carton forming and filling machine, the bottom sealing device including a folding plow that automatically folds the bottom carton panels to a closed position for the sealing thereof.

Still another object is to provide a unique unloading mechanism for a carton forming and filling machine that is interconnected to a loading device for the machine and that operates to unload a carton from an unloading station simultaneously with the loading of a carton onto the loading station of the machine.

Still another object is to provide a machine for forming and filling cartons that includes adjacent work tables on which the cartons are processed, a rotatable unloading means being employed for the unloading of cartons from the first table and cooperating with a unique turnover and orienting funnel to present the cartons to a transfer mechanism for transfer to loading station at the other table.

Still another object is to provide a carton forming and filling machine that includes adjacent tables on which a plurality of work stations are located and that are interconnected so that rotation of one table produces a corresponding rotation of the other table, a unique adjusting device being further provided for orienting one table with respect to the other so as to properly align the work stations located thereat.

Still another object is to provide a plurality of work stations at a pair of interconnected indexing tables for a carton forming and filling machine, each of the work stations including a work device that is adapted to carry out a prescribed operation on cartons that are indexed to the work stations by the tables.

Still another object is to provide work devices for use on tables of a carton forming and filling machine that are adapted to prefold the carton panels for the pre-breaking of the panels along their score lines.

Still another object is to provide a unique control mechanism for controlling the filling of cartons that are indexed to a filler station of a carton forming and filling machine.

Still another object is to provide heater assemblies for use in carton forming and filling machine that include manifolds having nozzles formed therein that are arranged in predetermined patterns for the heating of critical areas of end panels of the cartons being processed by the machine.

Still another object is to provide a unique sealing device for sealing the top panels of cartons that are processed in a carton forming and filling machine, the sealing device including a plurality of movable elements that are movable in a predetermined sequence for sealing the end panels of the cartons.

Still another object is to teach a unique method of processing cartons in a forming and filling machine wherein the cartons are removed in inverted form from a hopper, are angularly indexed on a rotatable table to a plurality of work stations, are lifted from the table and overturned to an upright position for transfer to another table for the further processing thereof.

Other objects, features and advantages of the invention will become apparent as the description thereof proceeds when considered in connection with the accompanying illustrative drawings.

In the drawings which illustrate the best mode presently contemplated by me for carrying out my invention:

FIG. 13 is an end elevational view of the carton hopper and load picker arm and drive therefor on the bottom former side of the machine, the load pusher for loading a carton being partially shown in section.

FIG. 14 is a top plan view of a portion of the carton hopper and load picker arm and drive mechanism therefor, the load picker arm being shown in dotted lines in the carton overbend and load positions.

FIG. 15 is a sectional view taken along lines 15—15 in FIG. 14.

FIG. 16 shows a carton after it has been moved to the overbent position during the erection thereof from the flat folded position.

FIG. 17 is a view showing the interconnection of the loading device and the unloading device for the bottom former table.

FIG. 18 is a sectional view taken along lines 18—18 in FIG. 17.

FIG. 26 is a top plan view of the housing in which the heater manifold and prebreak member are mounted.

FIG. 27 is a sectional view taken along lines 27—27 in FIG. 26.

FIG. 29 is a top plan view of the seal head, the seal plow and the drive for the seal head illustrated in FIG. 28.

FIG. 30 is a bottom perspective view of the seal plow.

FIG. 31 is a sectional view taken along lines 31—31 in FIG. 29.

FIG. 36 is a top plan view showing the unload device for the bottom former table, the turnover orienting funnel, the transfer and loading device for the filler table, and a portion of the filler table.

FIG. 37 is an end elevational view of the air pressure manifold showing the application of air pressure against a carton during the carton unloading operation from the bottom former table into the turnover orienting funnel.

FIG. 38 is a sectional view taken along lines 38—38 in FIG. 36.

FIG. 39 is a sectional view taken along lines 39—39 of FIG. 38.

FIG. 40 is a rear end elevational view of the transfer and loading device for the filler table.

FIG. 43 is a rear perspective view of the turnover orienting funnel showing a carton being received therein endwise position.

FIG. 44 is a front perspective view of the turnover orienting funnel showing a carton in oriented position after passage through the funnel.

FIG. 55 is an elevational view with parts shown in section of the filler tube as it appears in a carton during the filling operation.

FIG. 56 is an elevational view of an ultraviolet lamp as it appears in a carton during the sanitizing operation.

FIG. 57 is a top plan view of the two operating levers for the filler device mechanism.

FIG. 58 is a sectional view taken along lines 58—58 in FIG. 57 and showing the stroke adjusting device for the top section of the filler device.

FIG. 61 is a vertical sectional view of the heater manifold for the carton top showing the position of the manifold in the carton top during the heating operation.

FIG. 62 is a sectional view taken along lines 62—62 in FIG. 61.

FIG. 63 is a front elevational view of a portion of the heater manifold for the carton tops illustrating the formation of the nozzle openings therein.

FIG. 71 is a view in elevation with portions broken away showing the heating element and blower for the carton top heater manifold and further showing the rack drive for the sealing device.

FIG. 72 is a top plan view of the assembly illustrated in FIG. 70.

*Introduction and general description*

Figure 1:
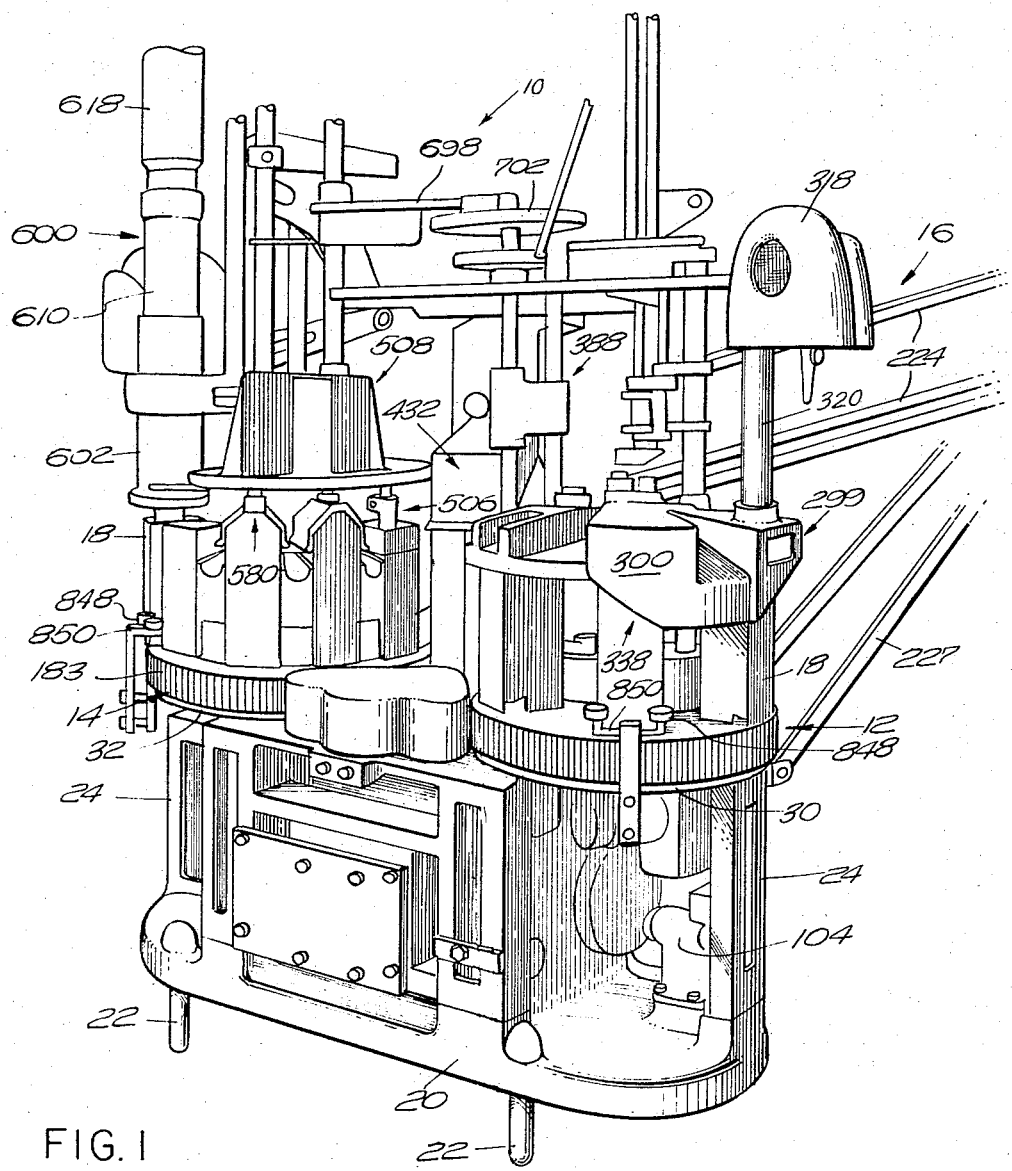
FIG. 1 is a rear perspective view of the form and fill machine embodied in the present invention.
Figure 2:
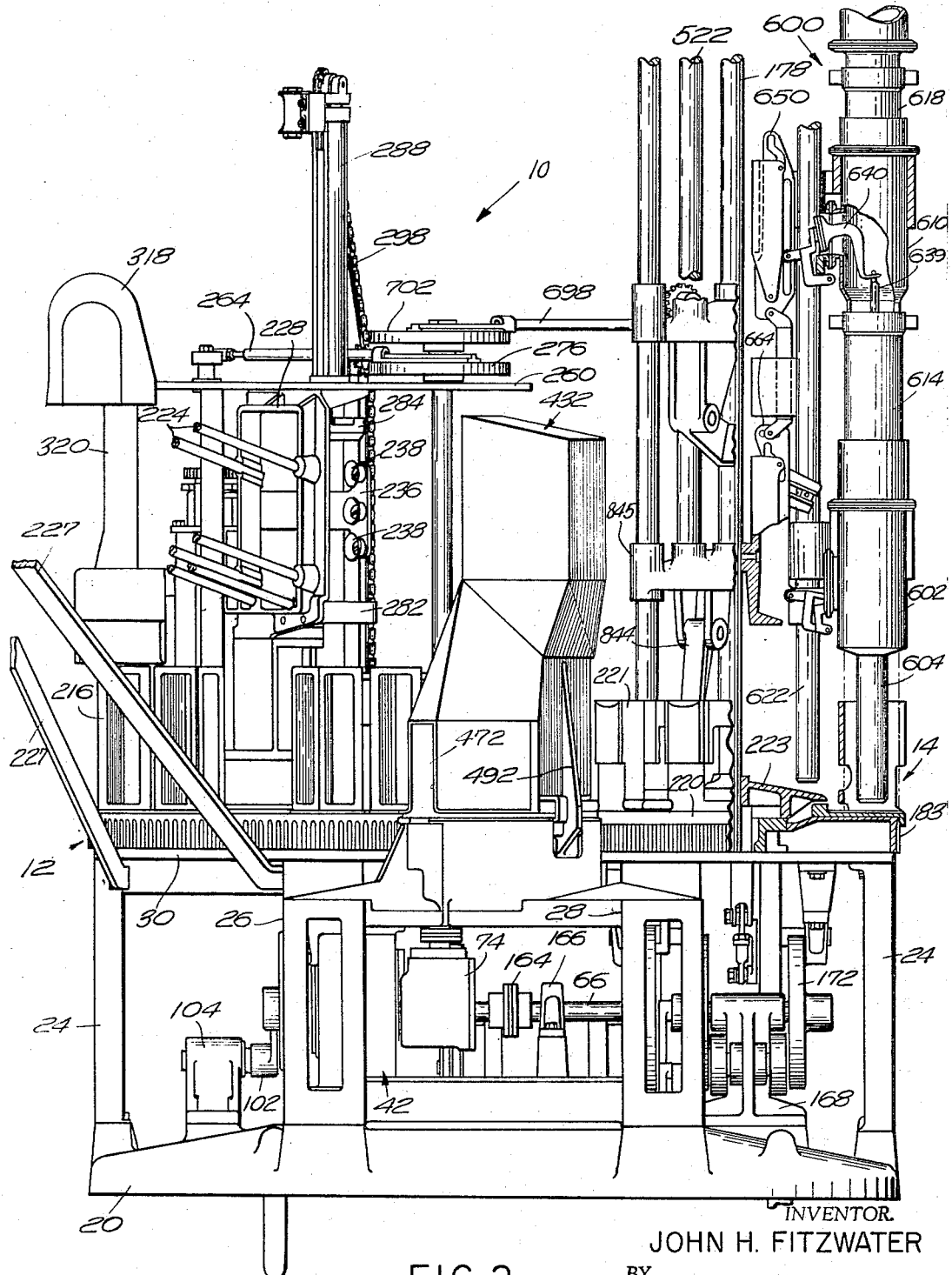
FIG. 2 is a side elevational view of the machine.

Referring now to the drawing, and particularly to FIGS. 1 and 2, the carton forming and filling machine embodied in the present invention is illustrated and is generally indicated at 10. As will be described the machine 10 includes a plurality of elements and devices that are adapted to successively process a series of cartons from flat-folded tubular form to erected, filled and sealed form. In general operation of the machine 10, a hopper is adapted to receive a supply of flat folded tubular cartons in inverted position therein, the cartons as will be described being appropriately cut and scored. The machine 10 is adapted to process the cartons in a manner such that the cartons are progressively erected, sealed at the bottoms thereof, filled with a liquid, and sealed at the tops thereof.

Figure 83:
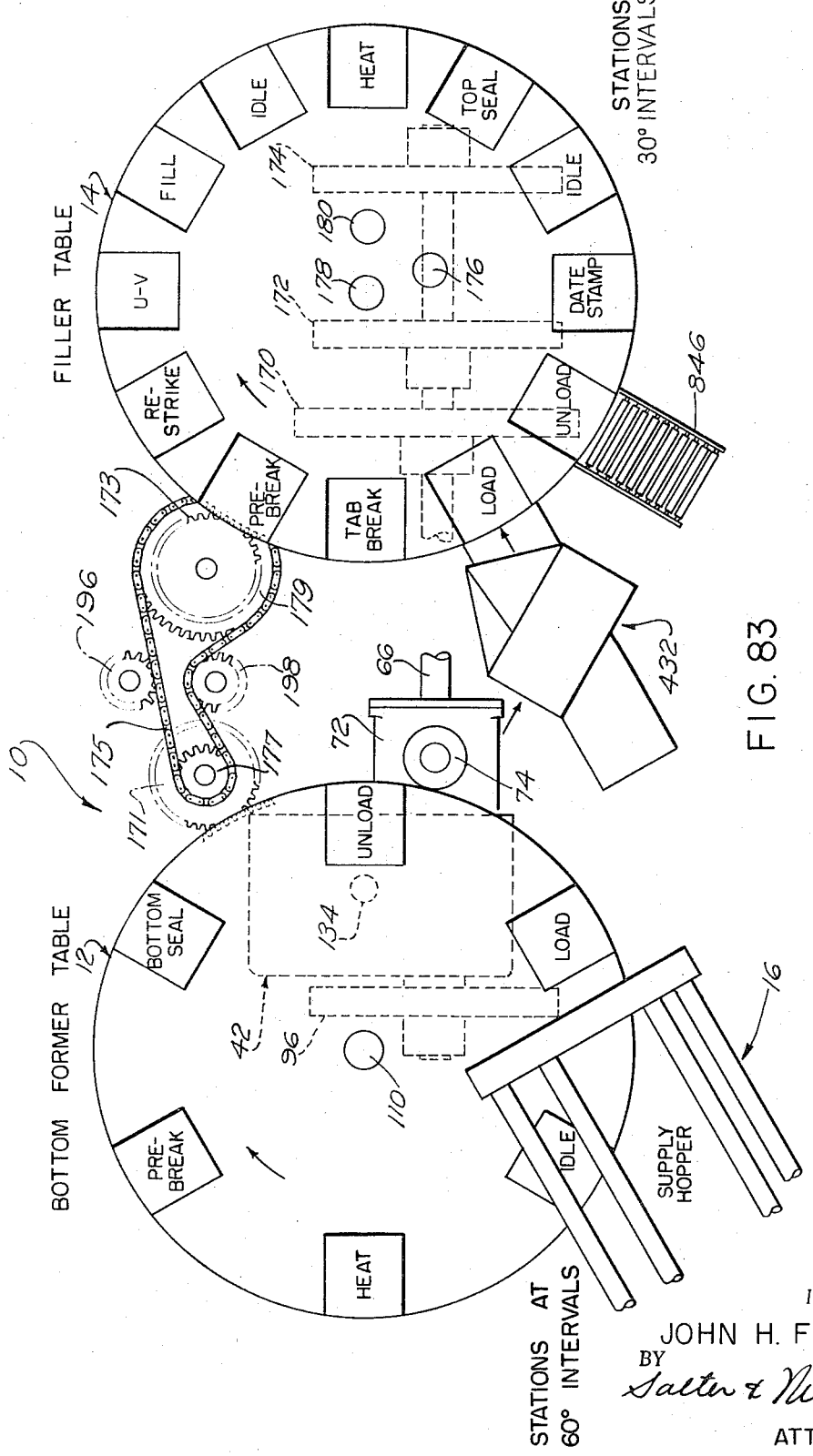
FIG. 83 is a diagrammatic illustration of the indexing, bottom former and filling tables showing the various stations at each table.

Referring to FIG. 83 the carton forming and filling machine 10 is diagrammatically illustrated and as shown includes a circular bottom former table generally indicated at 12 that is drivingly interconnected to a circular filler table generally indicated at 14. The designation of the table 12 as the bottom former table is intended to convey the purpose of operation of the table 12 wherein the bottoms of the cartons that are processed by the table 12 are formed and sealed thereon. The designation of table 14 as the filler table is also a general description and refers to the function of the table 14 of filling the cartons with a liquid processed thereon. It is understood that the cartons on the filler table 14 are also sealed at the tops thereof and discharged from the table onto an unload conveyor as will be described.

In order to better understand the description of the invention following hereinafter, reference will first be made to FIG. 83 and the various stations located at the bottom former table 12 and the filler table 14. As shown in FIG. 83 a plurality of flat-folded tubular cartons are adapted to be located in inverted stacked relation in a supply hopper generally indicated at 16. The cartons are successively removed from the supply hopper 16 by an unloading device, as will be described, and are successively deposited at a load station on the bottom former table 12. The bottom former table 12 is then indexed at predetermined intervals to sequentially move the cartons to a heat station, a pre-break station and a bottom seal station. After the bottoms of the cartons are sealed at the bottom seal station, the bottom former table then indexes the cartons to an unload station at which they are unloaded by an unloading device. The unloading device then moves the unloaded cartons to a turnover and orienting funnel that positions the cartons on a transfer mechanism in right side-up oriented relation, for transfer to a load station on the filler table. The filler table which is drivingly interconnected to the bottom former table is periodically indexed to move the cartons to a plurality of work stations at which the top panels of the cartons are prefolded for sealing at a seal station. Prior to indexing the cartons to the seal station, the filler table moves the cartons to a fill station at which the cartons are filled with a liquid and then moved to a heat station for heating the top panels thereof for sealing at the seal station. After the stamping of a date on the sealed cartons, the cartons are then indexed to an unload station for the unloading thereof for further handling.

The machine 10 is adapted to form and fill various kinds of paperboard cartons, but has particular application in the forming and filling of cartons having a modified gable top construction as illustrated in FIGS. 76 through 82. Such a carton is illustrated in the patents to Kuchenbecker Nos. D. 193,954, 3,024,959 and 3,081,016. The carton to be formed and filled by the machine 10 is generally indicated at 18 in FIGS. 32–34 and FIGS. 76–82 and in the erected form, as shown, has a squared construction that includes parallel, opposed walls A, C and B, D. As illustrated in FIGS. 76 through 82, the top panels of the carton are folded and sealed in a precise manner and as further illustrated in FIGS. 32, 33 and 34, the bottom panels of the carton 18 are also folded and in a particular manner sealed. Since the folding and sealing of the top and bottom panels of the carton 18 are performed by various work devices on the machine 10 to be described hereinafter, reference will be made to the carton panels and to the score lines on which the panels are folded during the various pre-breaking and folding and sealing operations. Referring again to FIGS. 76–82 and to FIG. 70 which shows the carton tops in blank form and with further reference to FIGS. 32–34 and to FIG. 35 which shows the carton bottom in blank form, the panels for the top and bottom of the carton and score lines will now be described.

Wall A of the carton 18 includes a bottom panel A1 (FIG. 35) which is adapted to be folded along a score line SA. Wall B includes bottom triangular panels B1, B2 and B3 which are adapted to be folded along score lines SB1, SB2 and SB3, respectively. The bottom portion of the wall C includes a bottom panel C1 that is adapted to be folded along its score line SC. The wall D is formed similarly to the wall B at the bottom end thereof and includes triangular panels D1, D2 and D3. These triangular panels are folded along the score lines SD1, SD2 and SD3, respectively. An edge panel E joined to the wall D is adapted to be folded along the score line SE and is joined to the inner-surface of the wall A in the erected form of the carton.

Figure 82:
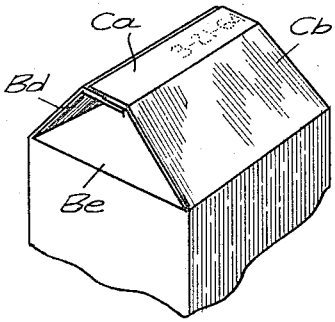
FIG. 82 is a perspective view of the sealed carton top showing the imprinting of indicia thereon by a date stamp.

Referring again to FIG. 70, the top portions of the walls A, B, C and D are shown being formed with various panels that are shaped and proportioned for folding to the configuration illustrated in FIG. 82. The top of wall A is provided with a panel A*a* at the uppermost end thereof that is located adjacent to the panel A*b*. Panel A*a* is adapted to be folded on score line SA*a* while panel A*b* is folded on score line SA*b*. The uppermost end of wall B is provided with panels B*a*, B*b* and tab B*c* which are cut so as to be movable with respect to each other. Panel B*a* is separated from a triangular panel B*d* by a score line SB*a*. Tab B*c* is separated from a truncated triangular portion B*e* by the score line SB*c*. A triangular panel B*f* is separated from the panel B*b* by a score line SB*b*. Panel B*e* is separated from the triangular panels B*d*, B*f* by the score lines SB*d* and SB*f* respectively. As shown the panel B*e* is adapted to be folded with respect to the wall B along the score line SB*e* in the sealed form of the carton. The upper portion of the wall C is provided with a panel C*a* that is separated from adjacent panel C*b* by a score line SC*a*, while the panel C*b* is separated from the main portion of wall C by the score line SC*b*. The upper portion of wall D is constructed similarly to that of wall B and includes the uppermost panels D*a*, D*b* and tab D*c* which are cut so as to be movable with respect to each other. The panel D*a* is separated from a triangular panel D*d* by a score line SD*a*. Tab D*c* is separated from a modified triangular position D*e* by a score line SD*c*. A panel D*f* is separated from the top panel D*c* by the score line SD*b* and the panel D*e* is separated from the triangular panels D*d* and D*f* by the score lines SD*d* and SD*f* respectively. As further shown the panel D*e* is adapted to be folded along the score line SD*e* with respect to the main portion of the wall D. As hereinbefore described the panel E is adapted to be folded along the fold line SE and is secured to wall A.

The carton 18, as described, which is paper board coated with plastic is erected from the flat folded form and is processed in the machine 10 to a self sustaining firm configuration by a plurality of work devices and operating mechanisms. A description of these work devices and operating mechanisms and the drive therefor now follows.

*Base and drive assembly*

Figure 4:
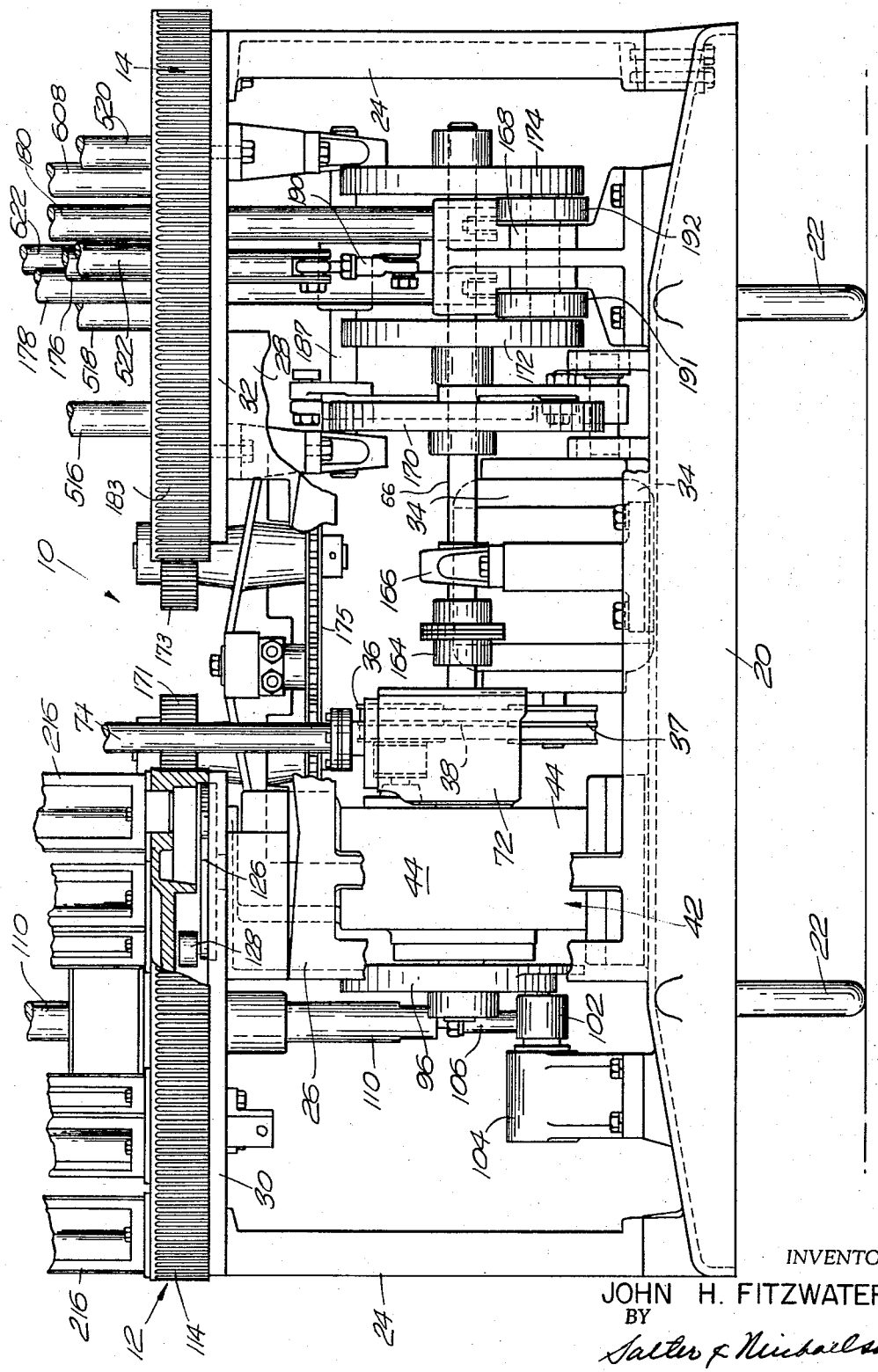
FIG. 4 is an enlarged side elevational view of the base and drive assembly of the form and fill machine.

The circular bottom former table 12 and filler table 14 are adapted to be rotatably mounted on a frame or base construction which as shown in FIG. 4 includes a base member 20 that is provided with sloping surfaces to prevent the accumulation of fluids thereon. The base member 20 is supported above the floor by legs 22 and is provided with corner standards 24 that project upwardly therefrom for engagement with upper portions of the frame or base. As seen in FIG. 4, spaced vertically extending frame elements 26 and 28 are joined to upper members 30 and 32 respectively and are provided for supporting the tables 12 and 14. It is understood that the flame construction as defined by the base member 20 and the other frame members and elements mounted thereon, form a rigid construction for supporting a drive assembly and the tables 12 and 14 that are rotatably mounted with respect to the base.

Figure 5:
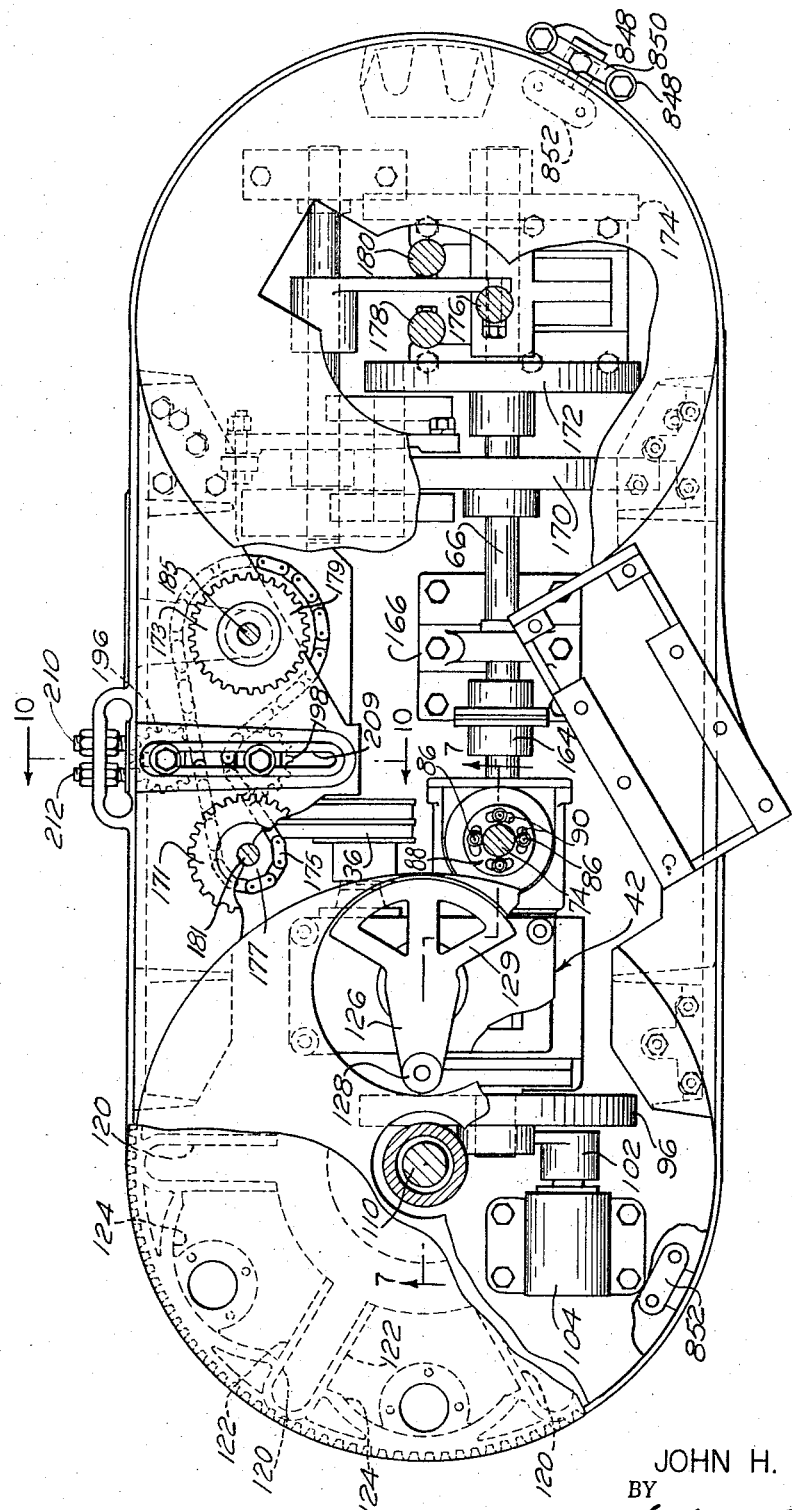
FIG. 5 is a top plan view of the base with parts broken away and parts further shown in section.
Figure 6:
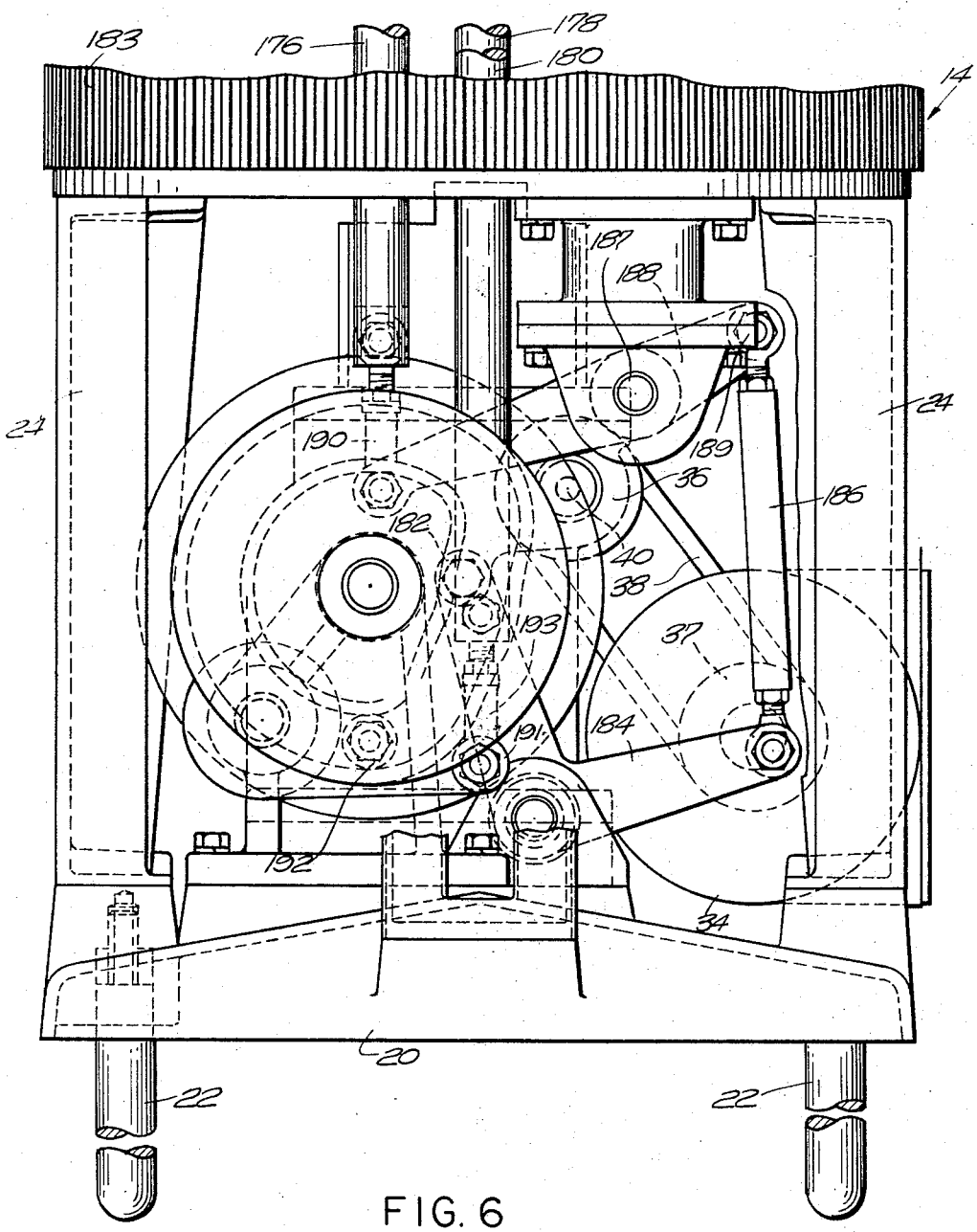
FIG. 6 is an enlarged end elevational view of the base showing the cam assembly on the fill side of the machine.
Figure 7:
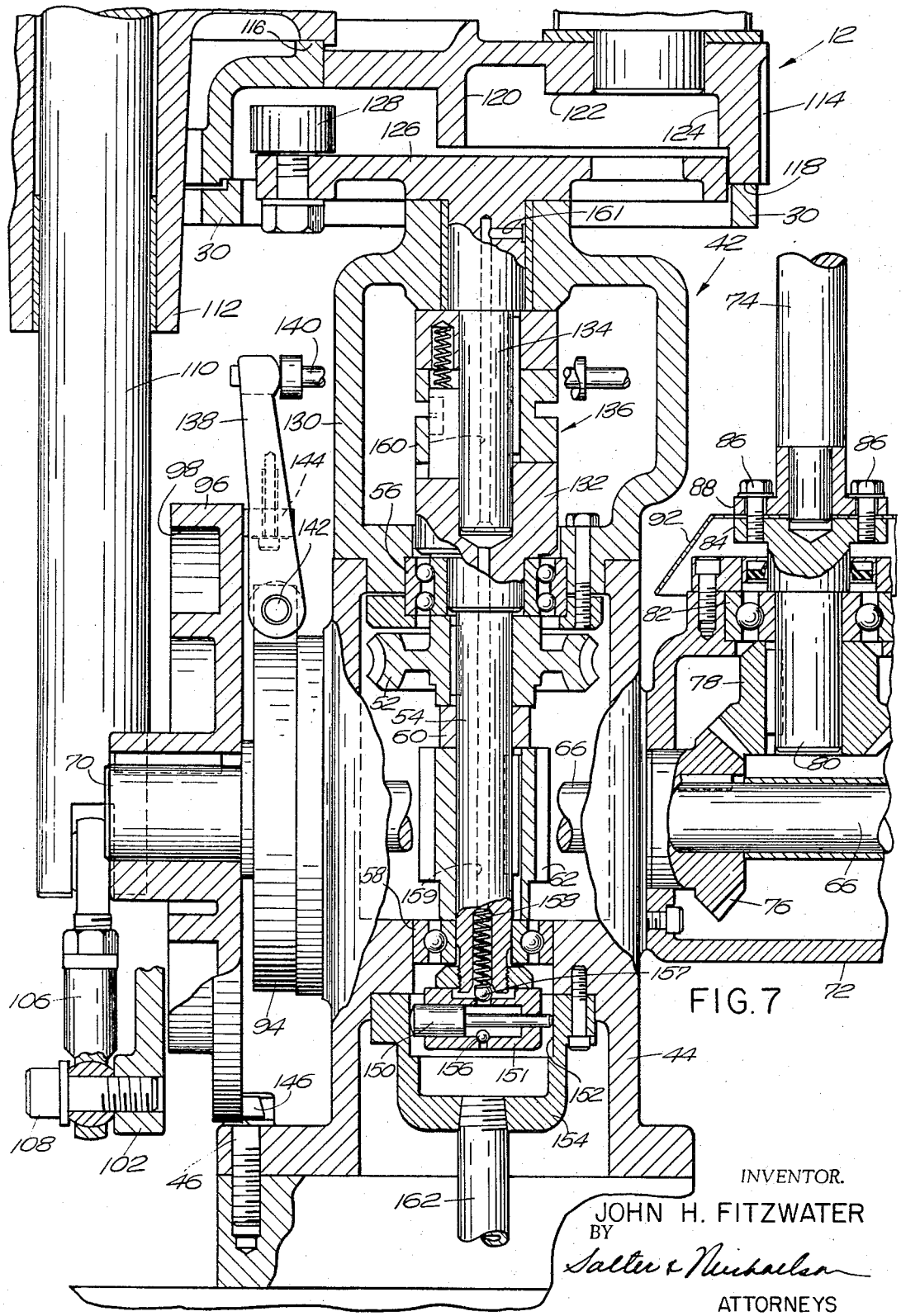
FIG. 7 is a vertical sectional view of the main gear box of the drive assembly for the machine taken along lines 7—7 in FIG. 5.
Figure 9:
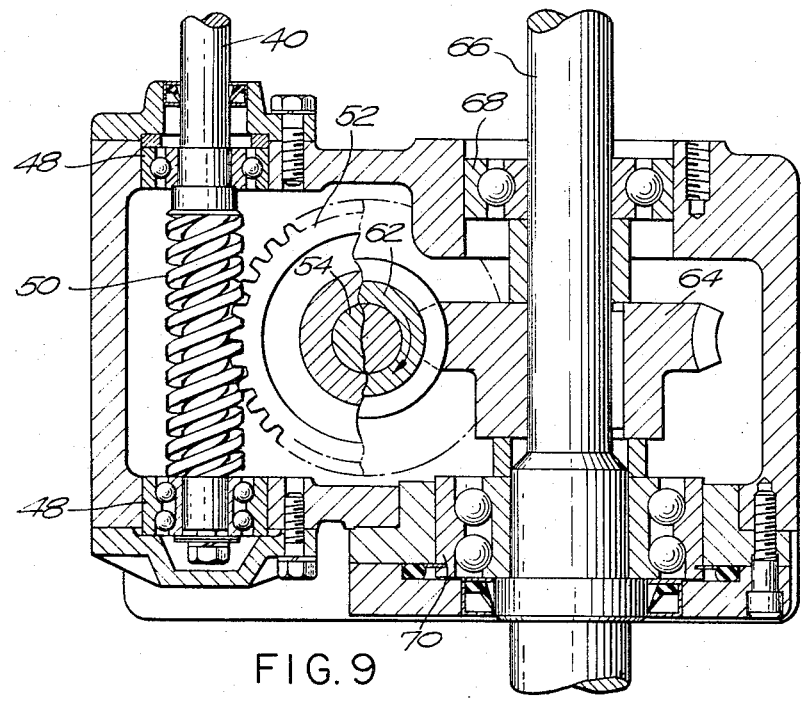
FIG. 9 is a sectional view taken along lines 9—9 in FIG. 8.

The present invention is unique in that a single drive assembly is provided for supplying the power for operating all of the work devices and operating mechanisms of the machine. Referring to FIG. 6 an electric motor 34 is shown mounted on the base member 20 and is drivingly connected to a pulley 36 through pulley 37 and a belt 38. The pulley 36 which is shown in FIG. 5, is mounted on an input shaft 40 that extends into a gear box generally indicated at 42. Referring now to FIGS. 7 and 9, the gear box 42 includes a housing 44 that is secured to the base member 20 by bolts 46. As illustrated in FIG. 9 the input shaft 40 is journaled for rotation in the housing 44 by spaced bearings 48. Formed on the interior portion of the input shaft 40 is a worm 50 with which a gear 52 meshes. The gear 52 is mounted on a vertical shaft, 54, which as shown in FIG. 7 is located generally centrally of the gear box housing 44 and is disposed perpendicular with respect to the input shaft 40 which extends in a horizontal direction. Referring again to FIG. 7 the vertical shaft 54 is shown journaled for rotation within the housing 44 in spaced bearings 56 and 58 and keyed to the vertical shaft 54 and spaced below the gear 52 by a collar 60 is a second worm 62. As shown in FIG. 9, the worm 62 meshes with a gear 64 that is keyed to a horizontal cam shaft 66 that is in turn journaled for rotation within the housing 44 in spaced bearings 68 and 70. As will be described hereinafter, the horizontal cam shaft 66 defines the shaft for driving the various cams that impart the drive motion to the work devices of the machine. The horizontal cam shaft 66 extends outwardly from both sides of the housing 44 of the gear box 42 and as seen in FIG. 7 projects into a bevel gear housing 72 for interconnection to a vertical cam shaft 74. The vertical cam shaft 74 is interconnected to the horizontal cam shaft 66 through a bevel gear 76 mounted directly on the horizontal cam shaft 66 and a bevel gear 78 that is keyed to the lower end of a stub shaft 80. The stub shaft 80 is journaled for rotation in a bearing 82 and is provided with an enlarged portion or flange 84 at the upper end thereof. A suitable seal and a plate 83 are mounted on the shaft 80 for sealing the shaft 80 from liquids. Secured to the upper end of the flange 84 by bolts 86 is the vertical cam shaft 74 that is provided with a lower flange 88 that has a diameter that corresponds generally to that of the flange 84. As seen in FIG. 5, the flange 88 is provided with slots 90 through which the bolts 86 extend and thus defines a means for adjusting the angular position of the vertical cam shaft 74 with respect to the horizontal cam shaft 66. As will be described, it is sometimes necessary to orient the vertical cam shaft 74 with respect to the horizontal cam shaft 66 so as to provide for properly executed movement of certain of the operating mechanisms that are mounted on the vertical cam shaft 74. As further shown in FIG. 7 a drip shield 92 may be secured on the coupling defined by the interconnection of the flanges 84 and 88 and also acts to prevent fluids from entering into the housing 72.

Figure 8:
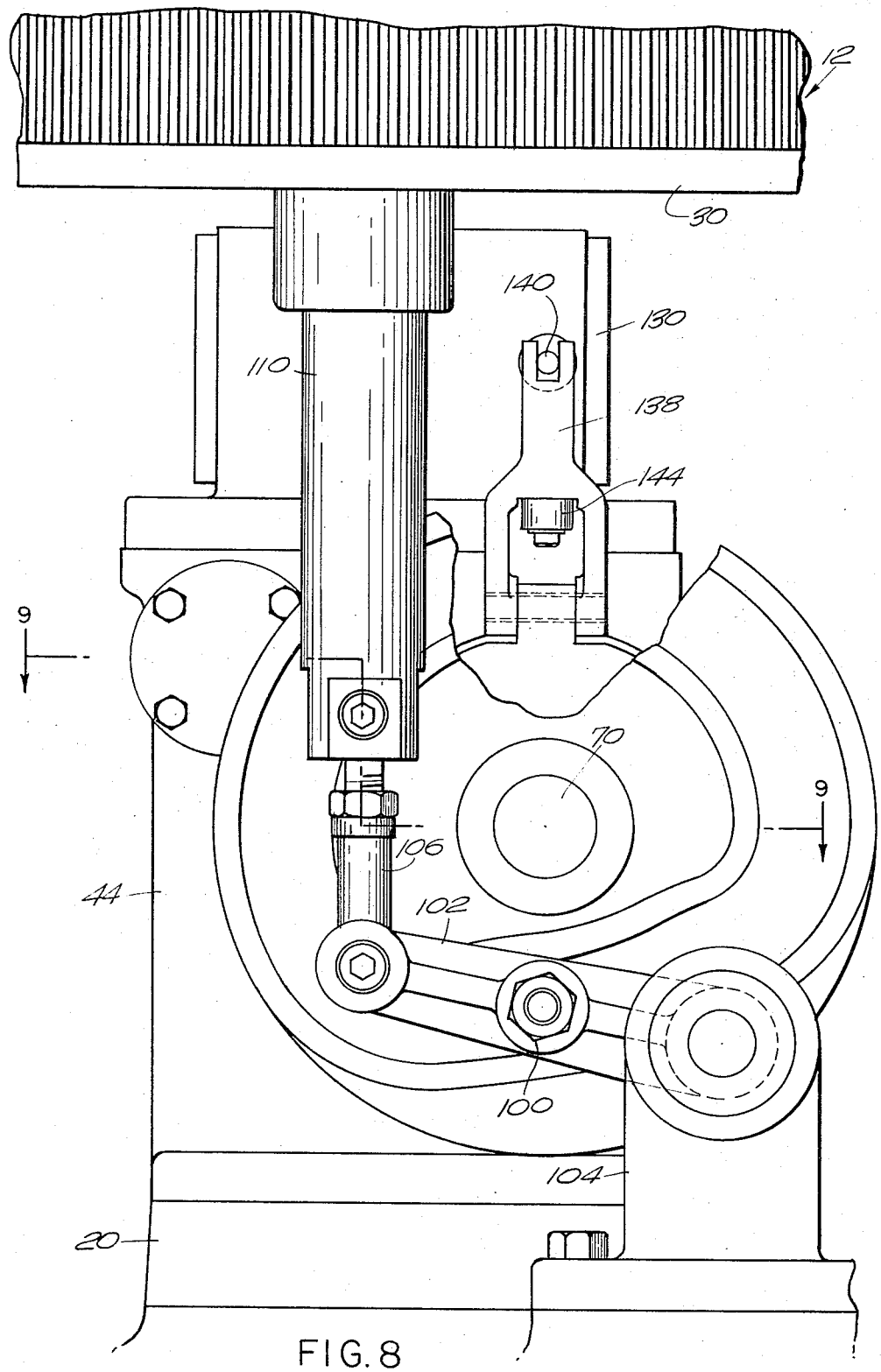
FIG. 8 is a side elevational view of the main gear box showing the vertical push rod and the push rod drive cam on the bottom former side of the machine.

The horizontal cam shaft 66 extends through the side of the housing 44 opposite the bevel gear housing 72 and projects through a bearing retainer 94. Mounted on the outermost end of the cam shaft 66, which is somewhat enlarged in diameter at this end, is a bottom former cam 96 in which a cam slot 98 is formed. As seen in FIG. 8, a follower 100 is received within the cam slot 98 and has a follower arm 102 secured thereto. One end of the follower arm 102 is journaled for rotation within a bearing housing 104 that is mounted on the base member 20. The other end of the arm 102 is secured to a link 106 through a bolt 108, the link 106 in turn being pivotally interconnected to the lowermost end of a bottom former push rod 110. As will be further described hereinafter, the push rod 110 projects axially through the bottom former table 12 and is adapted to provide the operating motion for various work devices located at the bottom former table.

In the processing of the cartons 18 by the machine 10, the bottom former table 12 is adapted to be rotatably indexed to move the cartons to the various work stations. For this purpose the bottom former table 12 is mounted for rotation on the base of the machine and as shown in FIG. 7 includes a depending hub 12 that defines the axis of the table through which the push rod 110 extends. As shown in FIG. 4, the periphery of the table 12 is formed with a plurality of gear teeth 114 which are provided for drivingly interconnecting the bottom former table 12 to the filler table 14. The interior or underside of the table 12 is formed with a particular configuration that defines a Geneva wheel and as further shown in FIG. 7 the under side of the table 12 is mounted in bearing relation on the frame of the machine on bearing surfaces 116 and 118.

Figure 11:
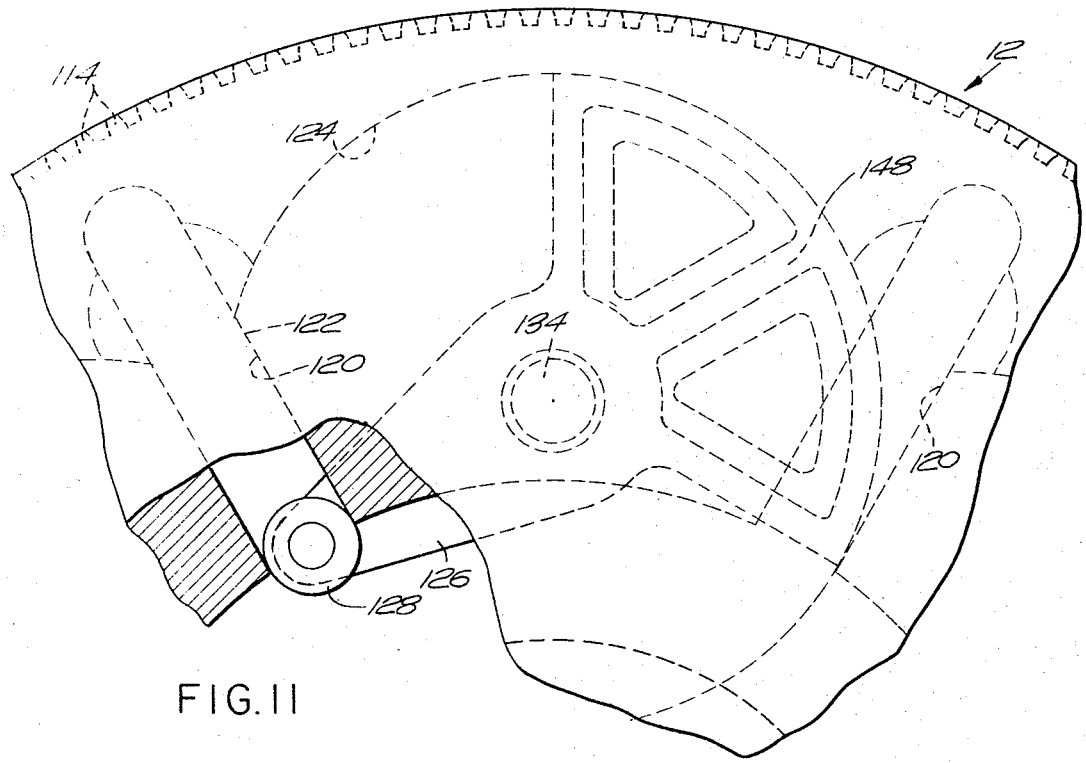
FIG. 11 is a fragmentary top plan view of the Geneva index table on the bottom former side of the machine, showing the Geneva drive wheel in dotted lines and further showing where the Geneva drive follower enters one of the slots on the underside of the Geneva index table.
Figure 12:
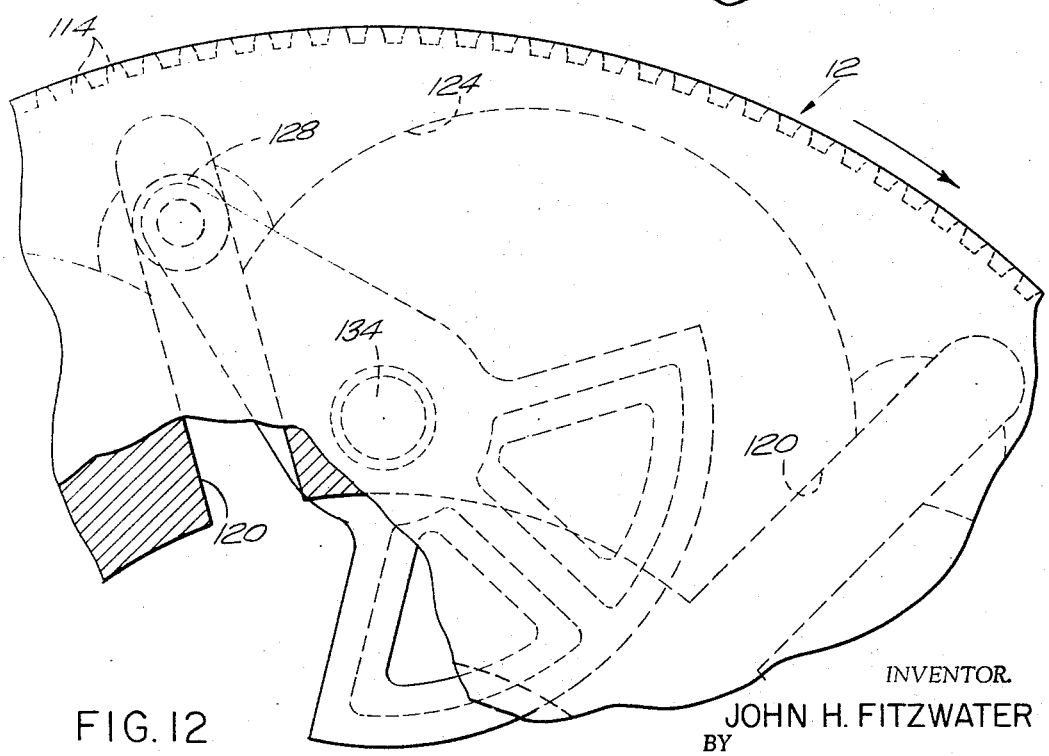
FIG. 12 is a view similar to FIG. 11 showing the location of the Geneva drive follower within the slot on the underside of the Geneva drive table and further showing the motion of the Geneva drive table during the driving operation.

Referring now to FIGS. 5, 7 and 12, the configuration of the underside of table 12 that defines the Geneva wheel is illustrated and as shown includes a plurality of spaced, radially extending slots 120. The radially extending slots 120 extend from a point adjacent to the periphery of the wheel 12 to a point somewhat removed from the axis thereof. The width of the slots 120 are dimensioned to accommodate the follower of a Geneva drive member, as will be described. Formed adjacent to the slots 120 and located in alternate arrangement therewith are grooves indicated at 122, and as shown in FIGS. 5, 11 and 12 each of the grooves 122 include an arcuate portion 124 that is provided for receiving a locking portion of the Geneva drive wheel.

One of the functions of the drive assembly of the machine 10 is to impart the indexing motion of the table 12. The indexing device as shown in FIGS. 7 and 12 includes a Geneva drive member 126 to which a follower 128 is secured for engaging a slot 120 on the underside of the table. The Geneva drive member further includes a locking portion 129 the outer periphery of which corresponds to that of the arcuate grooves 124. Mounted on the upper end of the housing 44 is a sub-housing 130 into which enlarged portion 132 of the vertical shaft 54 projects. The Geneva drive member 126 has a drive shaft 134 joined thereto that projects downwardly within the sub-housing 130 and within a cavity located in the enlarged portion 132. A conventional single revolution key clutch generally indicated at 136 is shown located within the sub-housing 130 and is provided for intermittently connecting the drive between the Geneva drive shaft and the vertical shaft 54 of drive assembly. The single revolution key clutch 136 is of standard construction and is designed to be actuated for interconnecting the vertical shaft 54 to the Geneva drive shaft 134 for one revolution thereof. After the termination of the revolution of the Geneva drive shaft which in effect will then produce an indexing motion of the table 12, the clutch 134 will disengage the Geneva drive shaft from the vertical shaft 54.

In order to actuate the single revolution key clutch 136, a clutch trip arm 138 is provided and engages a trip rod 140. The trip arm 138 is pivotally mounted on the bearing retainer 94 at 142 and has a follower 144 secured thereto. Secured to the inner surface of the bottom former cam 96 is a lobe 146 that is located so as to engage the follower 144 at predetermined intervals during rotation of the bottom former cam 96. As the bottom former cam 96 rotates with the shaft 66, the lobe 146 will intermittently strike the follower 144 to produce a pivoting action of the clutch trip arm 138. The trip rod 140 is then moved to cause the single revolution key clutch 136 to interconnect the Geneva drive shaft 134 to the vertical shaft 54. For the period of time that the single revolution key clutch 136 is in engagement, the Geneva drive member 126 will rotate to produce an indexing motion of the table 12. This indexing motion is carried out by the movement of the follower 128 of the Geneva drive member into a slot 120 located on the underside of the table 12. Referring to FIGS. 11 and 12 again, it will be seen that as the Geneva follower 128 enters a slot 120, continued rotation of the Geneva drive member 126 will force the table 12 to be rotated as the follower 128 drives radially outwardly within the slot in which it has entered. In FIG. 11 the follower 128 has just entered a slot 120. In FIG. 12 the follower 128 has moved upwardly within the slot to cause an indexing motion of the table 12. Upon further rotation of the Geneva drive member 126 the arcuate locking portion 129 formed thereon moves within the adjacent groove 122, to become substantially centered therein and at this point the follower 128 leaves the slot 120 to complete the indexing motion. After the indexing motion of the table 12, the single revolution key clutch automatically cuts out and will await the next cycle of operation by the trip rod 140. With the arcuate locking portion 129 now located within a groove 122 in engagement with the arcuate surface 124, a locking action is produced that prevents movement of the table 12 with respect to the frame of the machine. It is understood that as the single revolution key clutch 136 is periodically actuated upon rotation of the bottom former cam 96, the Geneva drive member 126 will be rotated to produce an indexing motion of the table 12 as described. It is pointed out here that the design of the Geneva wheel formed on the underside of the table 12 is such as to produce movement of the wheel for a predetermined angular distance. As will be described six stations are located at the table 12 and the cartons that are loaded onto the table must be periodically indexed to the stations in order to carry out the processing of the cartons. Accordingly the table 12 is indexed 60° during each indexing motion thereof and the stations located at the table are spaced at 60° intervals.

Since the gear box 42 is a self contained unit, a self lubricating system is provided for the parts located therein and as illustrated in FIG. 7 this system includes a piston 150 that is located in a cylinder 151 and that is eccentrically mounted wth respect to a chamber 152 formed in a cup member 154. Rotation of the shaft 54 and piston 150 therewith causes lubricating fluid in the cup member 154 to move upwardly through an opening normally closed by a ball 156. Pressure of the fluid then moves a ball 157 loaded by a spring 158 to uncover an outlet port, the lubricating fluid then passing upwardly within a passage 159 formed in the shaft 54 and into a corresponding passage 160 formed in the shaft 134. A radial passage 161 located within the shaft 134 communicates with the bearing surfaces of the shaft 134 and the lubricating fluid then passes downwardly by gravity through the various bearing surfaces of the unit. The chamber located within the cup member 154 acts as a sump for receiving gravitating lubricating fluid and a discharge pipe 162 is provided for draining moisture from the sump prior to the beginning of each operation of the machine.

The horizontal cam shaft 66 not only produces the vertical reciprocating movement of the push rod 110 for the bottom former table, but also is employed for producing vertical movement of a plurality of push rod located at the filler table 14. Referring now to FIGS. 4, 5 and 6 the horizontal cam shaft 66 is shown extending through a coupling 164, a central bearing housing 166 mounted on the base member 20 and through an end bearing housing 168 also supported by the base member 20. As shown more clearly in FIGS. 4 and 5, cams indicated at 170, 172 and 174 are mounted on the horizontal cam shaft 66 in spaced relation and beneath the filler table 14. The cam 170 is interconnected to a vertical push rod 176 for the vertical reciprocation thereof, while the cams 172 and 174 are adapted to vertically reciprocate vertical push rods 178 and 180 respectively. Referring particularly to FIG. 6, the cam 170 is shown being drivingly interconnected to the vertical push rod 176 through a follower 182 to which a pivotally mounted bell crank follower arm 184 is connected. The follower arm 184 is pivotally connected to a link 186 located at the rear of the machine and which extends vertically upwardly for pivotal interconnection to a jack shaft 187. Connected to the jack shaft 187 for movement therewith is an arm 188 that is pivoted about a pivot shaft 189. The other end of the arm 188 is joined to a link 190 that is connected to the lower end of the push rod 176. Both the cams 172 and 174 have followers 191 and 192 secured thereto to which links 193 and 194 are joined respectively. The links 193, 194 are in turn interconnected to the push rods 178, 180 respectively. It is understood that the cams 170, 172 and 174 all have cam slots of predetermined configurations formed therein and in which their respective cam followers are received. Thus rotation of the cams 170, 172 and 174 will produce vertical reciprocation of the push rods 176, 178 and 180 in a timed sequence and in accordance with the sequence of operation of the work devices that are operated by these push rods.

Figure 3:
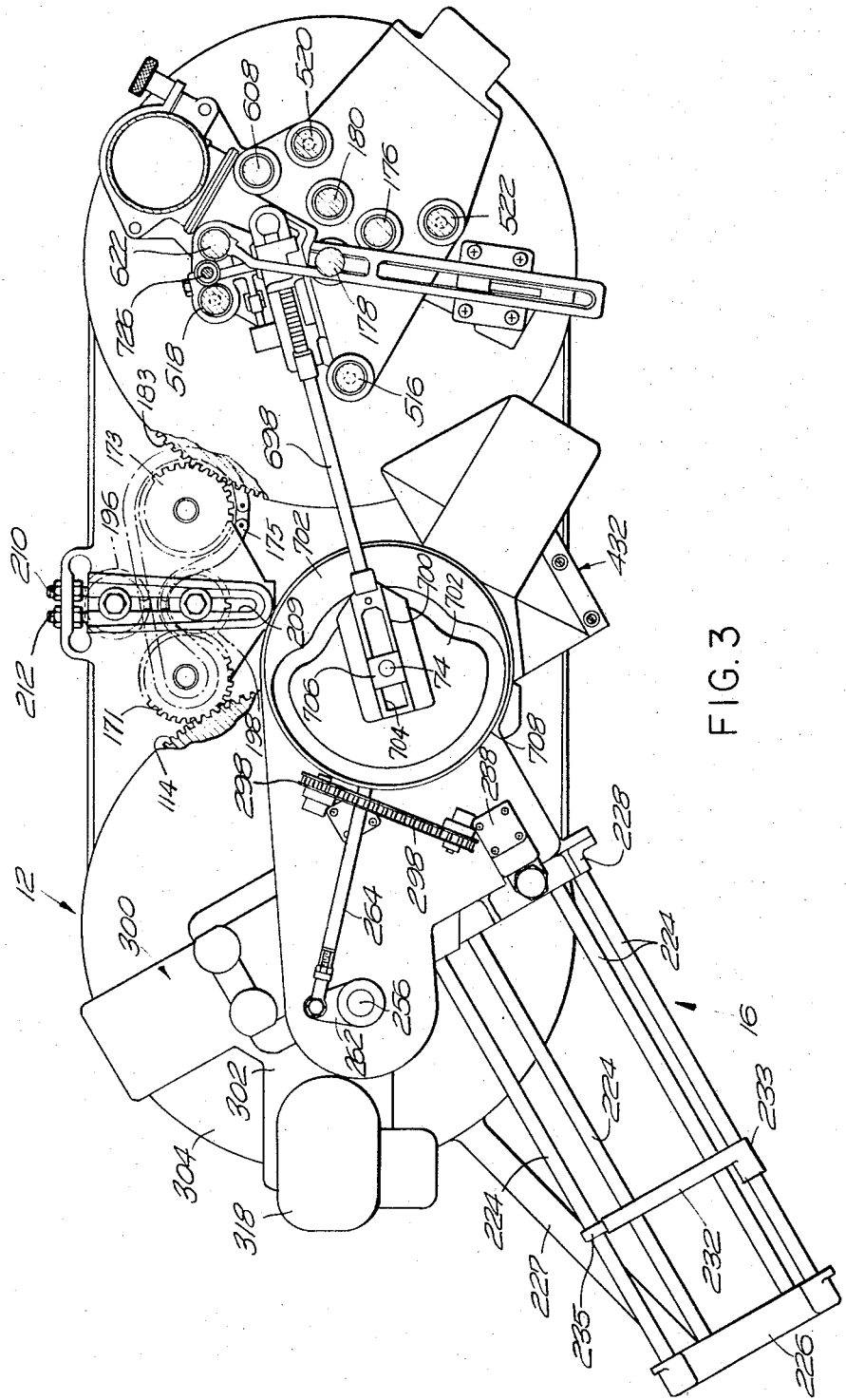
FIG. 3 is a top plan view of the machine with parts shown in section.

In the operation of the machine, it is essential that the cartons be indexed in proper sequence at both the table 12 and the table 14. Thus an operation is simultaneously performed on cartons at the work stations at each table after the indexing motion of the tables. It is essential therefore that the filler table 14 be indexed in accordance with the indexing motion of the bottom former table 12. In the present invention the motion of the filler table 14 is related to the motion of the bottom former table 12 through an interconnecting drive which as shown in FIGS. 3 and 5 includes a gear 171 mounted for rotation on the frame of the machine. The gear 171 engages with the teeth 114 of the bottom former table 12 and hence the indexing motion of the bottom former table 12 will produce a corresponding rotation of the gear 171. As illustrated in FIG. 6, the filler table 14 is also formed with a plurality of gear teeth 183 on the periphery thereof that are similar to teeth 114. Referring again to FIG. 3 a second gear 173 is shown mounted for rotation on the frame of the machine and is located in engagement with the gear teeth 183 of the filler table. Interconnecting the gears 171 and 173 is a sprocket chain 175, the sprocket chain engaging sprocket gears 177 and 179 that are located on the lowermost ends of the shafts 181 and 185, respectively on which the gears 171 and 173 are mounted. It is seen that the diameter of the sprocket gear 179 is somewhat larger than that of the sprocket gear 177 and this difference in diameter of the sprocket gears defines a ratio therebetween that determines the relation of movement of the filler table 14 with respect to the movement of the bottom former table 12. As will be described, the filler table has 12 stations located thereat. Accordingly the filler table must be indexed at 30° intervals. Since there is a direct relation between the number of stations located at the bottom former table and the number of stations located at the filler table, the ratio between the sprocket gears 177 and 179 must be in accordance therewith. Hence the ratio between the sprocket gears 177 and 197 is established at 2:1, whereupon the angular movement of the bottom former table 12 will be twice that of the filler table 14 during each indexing operation. Thus it is seen that when the Geneva drive member 126 is rotated to index the bottom former table 12 in its prescribed movement of 60°, the filler table 14 will then be indexed a corresponding angular distance of 30°.

Figure 10:
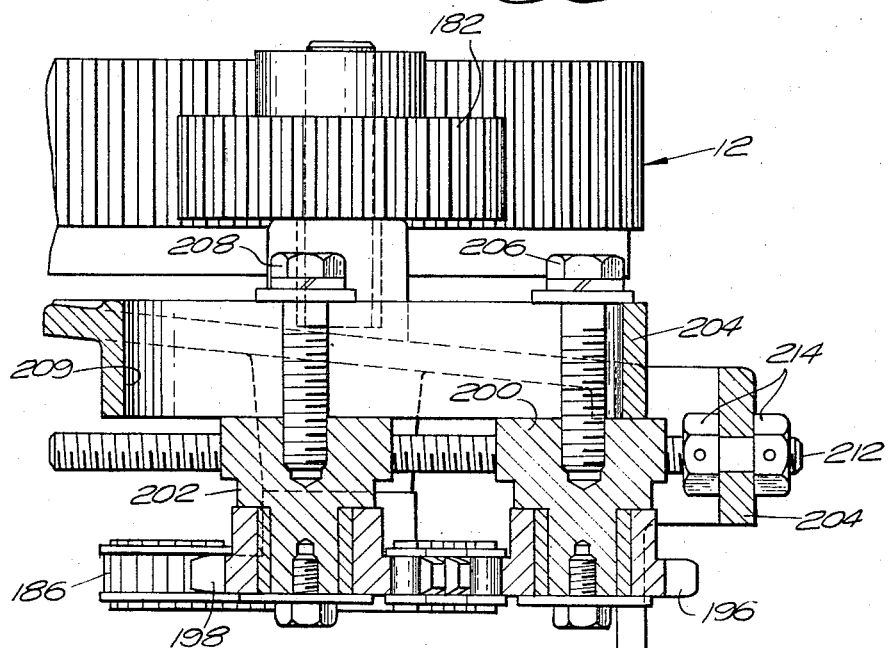
FIG. 10 is a sectional view taken along lines 10—10 in FIG. 5.

As further shown in FIGS. 3, 5 and 10 spaced idler sprocket gears 196 and 198 are located on opposite sides of the sprocket chain 175 to tension the sprocket chain 175 during the driving movement thereof. The idler sprockets 196 and 198 also provide a means for orienting the tables with respect to the work devices located thereat.

Referring particularly to FIG. 10 the idler sprockets 196, 198 are shown mounted for rotation on suitable bushings secured to the lowermost ends of idler mounting blocks 200 and 202 respectively. The idler blocks 200 and 202 are secured to a rear extension 204 of the frame of the machine by bolts 206 and 208 respectively, the bolts 206, 208 projecting through a transverse slot 209 formed in the frame 204. Extending beneath the frame extension 204 and through appropriate openings formed in the mounting blocks 200 and 202 are parallel adjustment rods 210 and 212. Each of the adjustment rods 210 and 212 slidably extends through one idler block but threadably engages the other so that rotation of each adjustment rod will produce a corresponding lateral movement of the idler block with which it is threadably engaged. Thus in order to adjust the filler table with respect to the bottom former table, bolts 206 and 208 are loosened in the slot 209 and with respect to the frame 204 to permit lateral movement of the mounting blocks 200 and 202. Lock nuts 214 mounted on the outer ends of the adjustment rods 210 and 212 are then loosened to permit the rotation of the rods for adjusting movement of the idler mounting blocks 200 and 202 as required. It is understood that first one mounting block and the sprocket secured thereto will be moved a required distance to loosen sprocket chain 186 and then the other mounting block with the sprocket secured thereto will be moved a corresponding distance to again tighten the sprocket chain 186. The repositioning of the sprocket chain 186 will produce a corresponding movement of the tables and the tables will then be oriented and aligned with respect to the work devices located thereat.

As previously mentioned hereinabove, both the bottom former table 12 and the filler table 14 are provided with a plurality of stations at which a work operation is performed on the cartons carried by the tables. In order to receive and locate the cartons on the bottom former table in inverted position, a plurality of upstanding mandrels 216 are provided and are secured to the upper surface of the bottom former table. The mandrels 216 have substantially a square configuration as seen in top plan for receiving the cartons in erected form thereon and as seen in FIGS. 17 and 18 are provided with hollowed portions 218 in the side walls thereof. Any convenient means may be utilized to secure the mandrels 216 to the bottom former table such as bolts or the like. Since the bottom former table 12 is periodically indexed through an angular travel of 60°, six of the mandrels are fixed to the table 12 at 60° intervals therearound.

Figure 45:
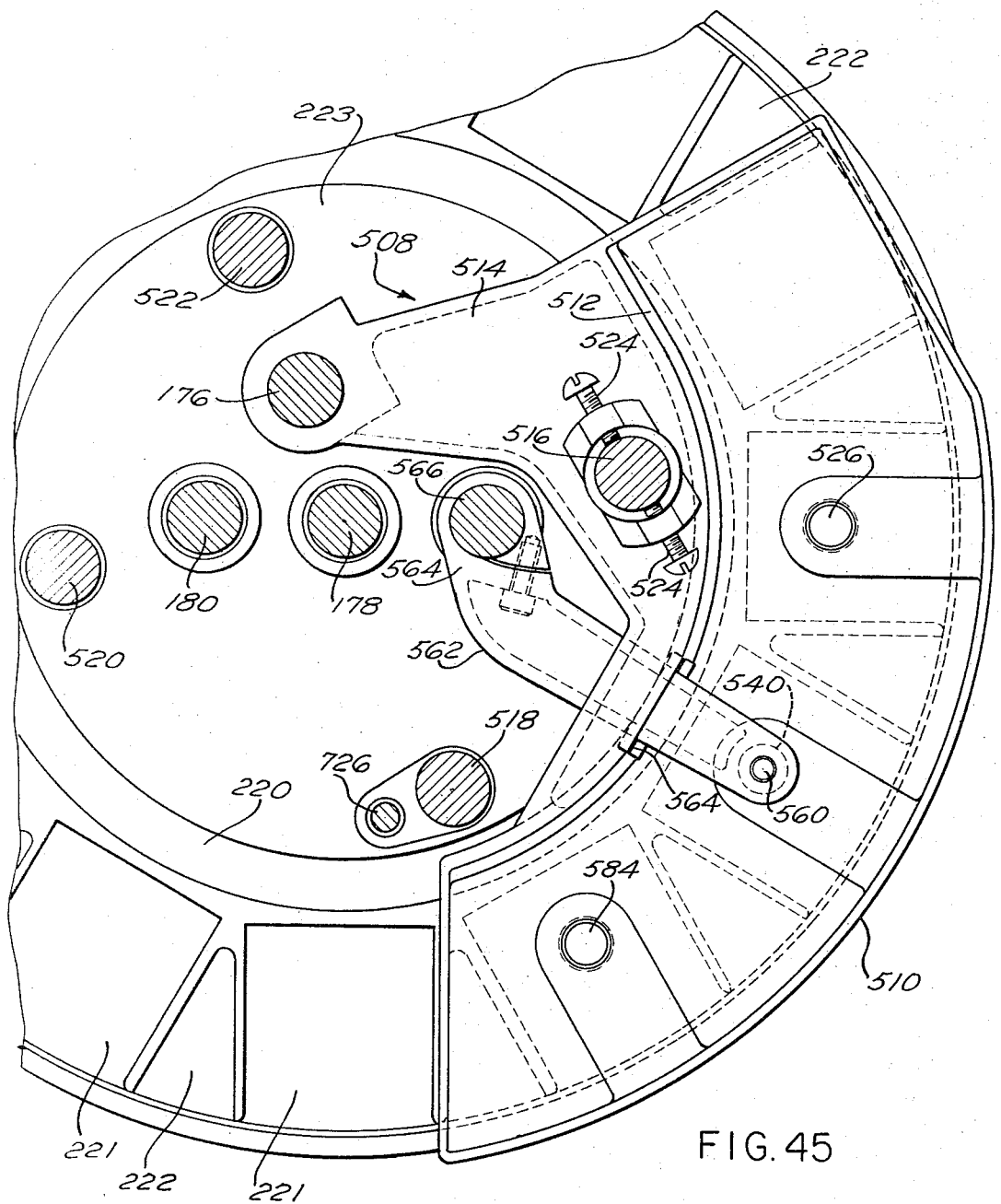
FIG. 45 is a top plan view with parts shown in section of the filler table showing the vertically movable bracket that carries the tab break, prebreak and restrike devices.

In order to accommodate the cartons on the filler table 14, a circular casing 220 is provided and is secured directly to the upper surface 219 of the filler table and is formed with twelve equally spaced cavities or chambers 221 therein which are arranged at 30° intervals around the filler table (FIG. 45). It is understood that the cartons located in the cavities 221 are advanced to the various stations at the filler table in angular movements of 30°. As further shown in FIGS. 42 and 75, the filler table 14 is mounted in bearing relation on the plate 30 at 222 and beneath a central portion 223 at 225, the central portion 223 being fixed to a pedestal 227 mounted on the frame of the machine.

*Feed and load mechanism for bottom former table*

The cartons 18 are located in the hopper 16 in inverted and flat folded stacked position and are arranged so as to be successively extracted therefrom by an unloading device to be described. As shown in FIGS. 2, 3 and 14, the hopper 16 includes spaced inclined rods 224 that are secured to an outer, upper bracket 226 and lower, forward bracket 228, the bracket 226 being supported on the base frame by inclined braces 227. The bracket 228 which is located at the discharge end of the hopper 16 is mounted on a support 229 that is also fixed to the frame of the machine. Since the rods 224 are inclined, the cartons 18 which are stacked therebetween in inverted relation will feed by gravity to the discharge end of the hopper 16. It is understood that additional cartons will be inserted in the upper feed end of the hopper as the cartons are loaded during the operation of the machine. An elongated end gate 230 (FIG. 13) and stops 231 secured to the bracket 228 are engaged by the endmost carton in the stack and restrict movement of the stack through the opening in the bracket 228. A suitable feed member 232 is mounted for movement on the rods 224 in the hopper at the rear of the carton stack and will act to feed the carton stack toward the discharge end of the hopper. As shown in FIG. 3, the feed member 232 includes a bearing 233 on one side through which an upper rod 224 extends and a roller 235 on the other side that rides on the spaced upper rod 224.

In order to successively remove the cartons from the hopper 16, an unloading device generally indicated at 234 in FIGS. 13 and 14 is provided. The unloading device 234 includes an elongated load picker arm 236 on the end of which a head 237 carrying suction members 238 is joined. Although not shown, a vacuum pump is mounted on the frame of the machine and communicates with the suction member 238 for producing a suction therein during the interval of time when the suction members are operative to remove a carton from the hopper 16. A valve that is controlled by a cam mounted on the horizontal cam shaft 66 will be operated periodically, to interconnect the suction members 238 to the vacuum pump. The picker arm 236 is pivotally connected to parallel links 240 and 242 at pivot points 244 and 246 respectively, the parallel links 240 and 242 also being pivotally joined to a bracket 247 at pivot connections 248 and 250 respectively. The pivot connections 244 and 246 define shafts that are received within hinge knuckles that are located between end bearing caps 244a and 246a. The pivot connections 248 and 250 also define shafts that are received within hinge knuckles that are located between end bearing caps 248a and 250a, the hinge knuckles forming part of the links 240 and 242. The shaft 250 to which the link 242 is pivotally connected has a gear 252 secured to the uppermost end thereof, the gear 252 being located in engagement with a gear 254 that is secured to a vertical shaft 256 journaled in the bracket 247. The bracket 247 is supported from the main frame by a fixed post 258 and the vertical shaft 256 extends upwardly through a fixed plate 260 that is secured to the portion of the frame on which the end bracket 228 of the hopper is mounted. Joined to the uppermost end of the vertical shaft 256 is a drive arm 262, which as shown in FIG. 3 is pivotally connected to a rod 264. As seen in FIG. 14, the rod 264 which defines the drive for the load picker arm 236 carries a shoe 266 at the inner end thereof. Formed in the shoe 266 is a slot 268 through which the vertical cam shaft 74 extends, a guide 270 receiving the vertical cam shaft 74 therein and being mounted for movement within the slot 268 of the shoe 266. Secured to the shoe 266 adjacent to the guide 270 is a follower 272 that is received within a cam slot 274. The cam slot 274 is formed in a cam 276 that is mounted for rotation on the vertical cam shaft 74. It is seen that rotation of the vertical cam shaft 74 will rotate the cam 276 and will produce a corresponding reciprocating motion of the picker arm drive rod 264. The configuration of the cam slot 274 will cause the picker arm drive rod 264 to be moved in a predetermined manner so as to cause a corresponding rotation of the shaft 256, which in turn, produces a corresponding movement of the load picker arm 236 through the parallel links 240 and 242.

The head 237 of the load picker arm 236 is initially pivotally moved by the parallel links in an arcuate path so as to locate the suction members 238 in engagement with the adjacent wall of the carton disposed at the discharge end of the hopper. As seen in FIG. 14, the load picker head 237 is thereafter moved in response to rotation of the cam 276 and movement of the parallel links 240 and 242, in a second arcuate path to shift the position of the engaged wall of the carton. The elongated gate 230 engages an adjacent longitudinal edge of the carton and, as seen in FIG. 14, acts to restrict movement of this edge to cause the carton walls to be overbent as the head 237 is moved in the arcuate path by the load picker arm 236. When the carton is moved to the overbent position by the load picker arm 236, the score lines defining the edges thereof are "broken" to permit the carton to be erected in a substantially square open-end configuration. After the overbending operation, the picker head 237 is partially returned in an arcuate path in accordance with the configuration of the cam slot 274 to locate the carton that is now squared in a load position as illustrated in FIG. 14. In this position, the carton that is held by the suction members 238 of the picker head 237 is disposed just above a guide funnel 282 which as shown in FIGS. 13 and 17 is joined to the bracket 228 located at the discharge end of the hopper. Located directly beneath the guide funnel 282 in aligned relation therewith is the load station on the bottom former table 12 that is defined by a mandrel 216 mounted on the table.

In order to load the withdrawn carton located in the load position onto the mandrel 216 at the load station on the bottom former table 12, a pusher member 284 is provided and as shown in FIGS. 13 and 17 is located upwardly with respect to the guide funnel 282. The pusher member 284 is secured to the lowermost end of a piston rod 286 that is connected to a piston that is movable within an actuating cylinder 288 into which air under pressure is directed. The pusher member 284 is formed with a lower beveled portion 290 that is designed to be received within the open upper end of the carton to be loaded and as shown in FIG. 17 the pusher member is formed with opposed ears 292 that are designed to engage the upper located edges of the carton when the pusher member 284 is moved downwardly into contact therewith. Air under pressure is supplied from a suitable source and a valve controlled by operation of the horizontal cam shaft is periodically operated to direct the compressed air to the cylinder 288 at predetermined intervals, wherein a positive downward movement of the pusher member 284 is produced. As the pusher member 284 moves downwardly the upper edges of the carton in the load position are engaged by the opposed ears 292 and the carton then moves downwardly with the pusher member 284 through the guide funnel 282. As shown in FIG. 17, the guide funnel is formed with opposed grooves 294 for accommodating the ears 292 as the pusher member directs the carton through the funnel 282. Since the guide funnel is located in aligned relation above the mandrel 216 disposed at the load station on the bottom former table, the downwardly directed carton will be moved directly onto the mandrel 216 at the load station. As the pusher member 284 moves into engagement with the carton at the load position, the valve controlling the vacuum to the suction members 238 is actuated to cut off communication to the vacuum pump and the carton is released from the picker head 237, for movement by the pusher member 284 down through the funnel 282 and onto the mandrel 216. Once the carton has been positioned on the mandrel 216 at the load station, the bottom former table 12 is indexed, in accordance with the movement of the Geneva drive member 126, to move the loaded carton in the inverted position thereof to the next station at the bottom former table. The loading operation is then continuously repeated and cartons are withdrawn from the hopper stack and loaded in bottom-side-up position onto the mandrels that are successively moved to the load station on the bottom former table. It is pointed out at this time, that the pusher member 284 has a fixed rod 296 secured thereto that extends upwardly therefrom in adjacent relation to the actuating cylinder 288. A chain 298 is interconnected to the rod 296 and is secured to an unloading device which as will be described hereinafter is simultaneously operated to unload a carton from the table 12 upon the loading of a carton thereon.

*Heat, prebreak and bottom seal work devices at bottom former table*

As described hereinabove, the bottom former table 12 includes a plurality of stations thereat to which the cartons are indexed in inverted position, each station including a work device for performing a work operation on the bottom panels of the cartons so that these bottom panels may be folded and sealed. The heat station, which is the first station to which the cartons are indexed for the performing of a work operation thereon after the loading thereof on the table 12, is that station at which the critical areas of the bottom panels are heated prior to the sealing thereof. The work device located at the heat station for carrying out the heating operation of the bottom panels is illustrated in FIGS. 19 through 25, and is further illustrated in FIGS. 3, 26 and 27 as a bottom former heater assembly 299 that is mounted on a work housing generally indicated at 300. The work housing 300 is mounted for movement on the bottom former push rod 110 and includes a fan shaped body portion 302 in which a central fan shaped depression 304 is formed. The central depression 304 defines a side wall 306 that is spaced from another side wall 306, the side walls cooperating with end walls 308 to define a heater manifold chamber. A prebreak chamber for receiving a prebreak device, to be described, is defined by an end wall 310 located on the other side of the depression 304 and by another spaced end wall 310 and side walls 312. Formed in the body portion 302 is an opening 314 through which a guide rod 316 extends, the work housing 300 thereby being vertically movable with the push rod 110 and being guided for movement by the fixed guide rod 316.

Figure 35:
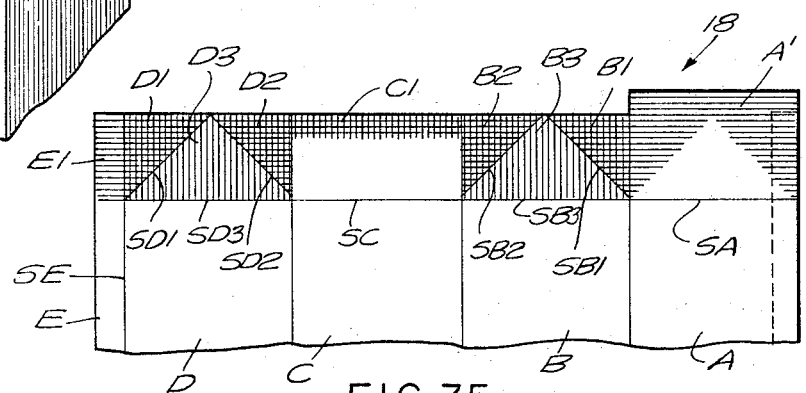
FIG. 35 is a view of the bottom portion of the carton in blank form showing the areas that are heated by the bottom former heater manifold.
Figure 41:
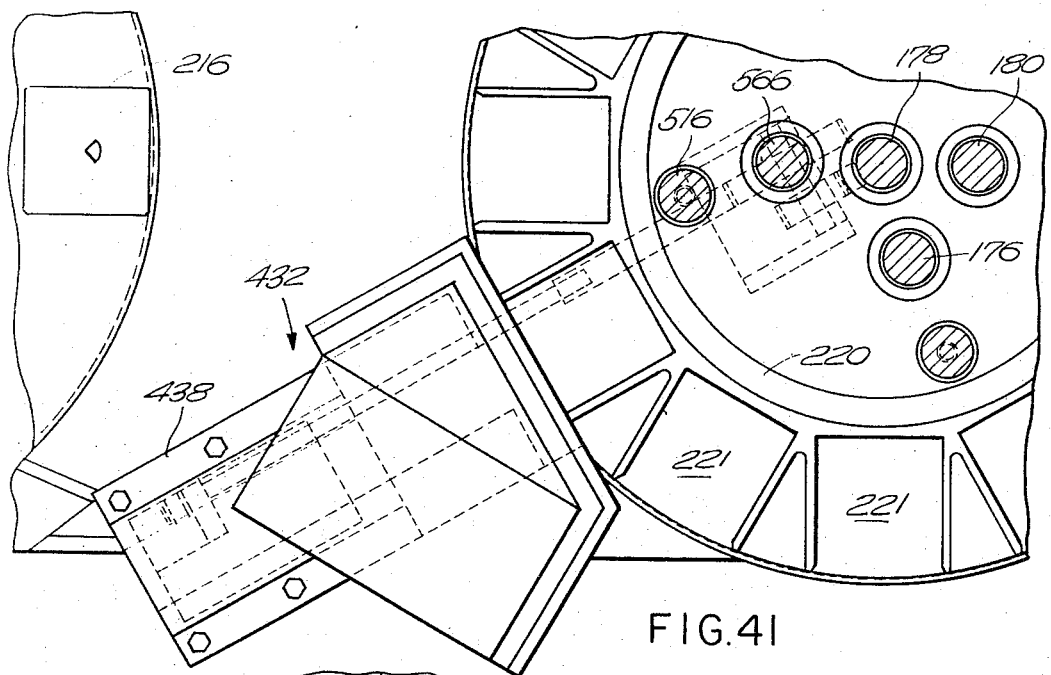
FIG. 41 is a top plan view of a portion of the bottom former and filler tables and of the turnover funnel and transfer device that receives and directs the cartons to the filler table load station.

As seen in FIG. 1, the work housing 300 has a casting 318 mounted thereon that is supported in postion by a heat conducting tube 320. Positioned within the casting 318 and communicating with the tube 320 is a blower which is adapted to direct air over heated coils (not shown) that are fixed within the tube 320. As shown in FIG. 27 the tube 320 is retained in fixed position within a neck portion 322 located on the body portion 302 of the work bracket 300 and communicates with a heater manifold generally indicated at 324 that is located within the heater manifold chamber. The heater manifold 324 is constructed and arranged for enveloping the bottom panels of the carton wherein heated air is applied to critical areas of these panels in predetermined patterns. Referring to FIG. 35, the areas of the bottom panels to be heated are illustrated, and as shown the horizontal lines on panels D1 and E1 represent inside surfaces of the walls D and E to which heat is applied in the patterns as indicated. The vertical lines on panels B3 and D3 represent outside surfaces of these panels to which heat is applied in the patterns as indicated. The horizontal and vertical combination lines on B1, B2, C1, D1 and D2 represent both inside and outside surfaces of these panels that are to be heated in the patterns as indicated. Since the carton walls are plastic coated the bottom panels may be heated as just described to form tacky surfaces and these panels can then be folded upon their score lines into engaging relation for the sealing thereof.

Figure 20:
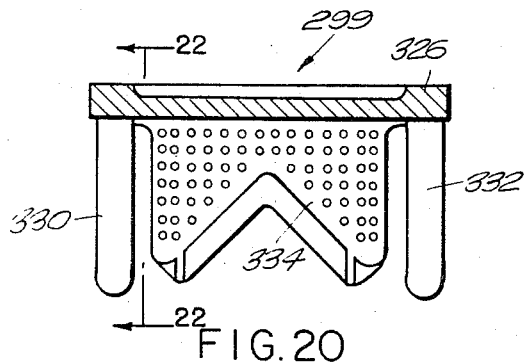
FIG. 20 is a sectional view taken along lines 20—20 in FIG. 19.
Figure 21:
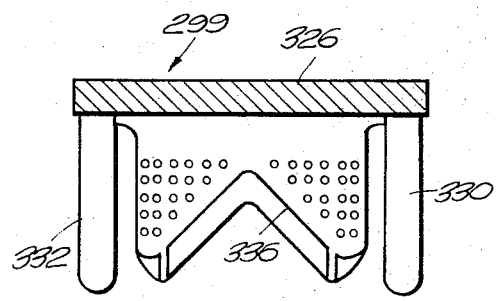
FIG. 21 is a vertical sectional view of a portion of the heater and prebreak bracket, a section of the heater manifold being shown in side elevation.
Figure 22:
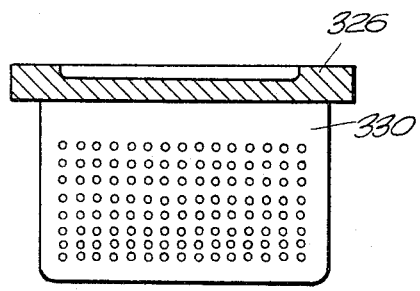
FIG. 22 is a sectional view taken along lines 22—22 in FIG. 20.
Figure 23:
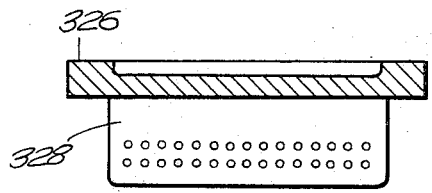
FIG. 23 is a sectional view taken along lines 23—23 in FIG. 21.
Figure 32:
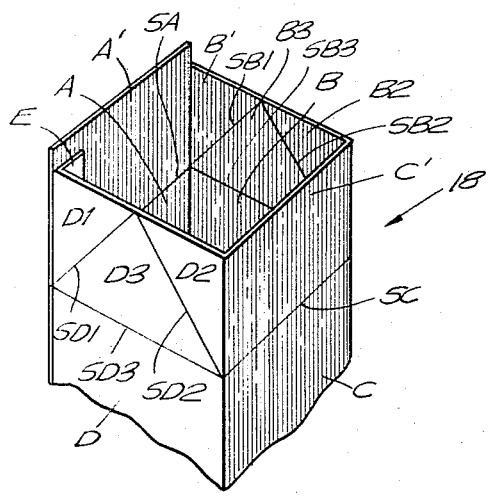
FIGS. 32, 33 and 34 are bottom perspective views of a carton showing the sequence of folding and sealing the bottom panels thereof.
Figure 33:
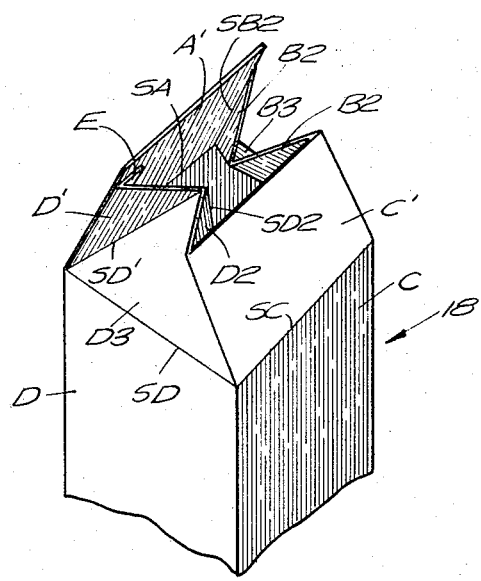
Figure 34:
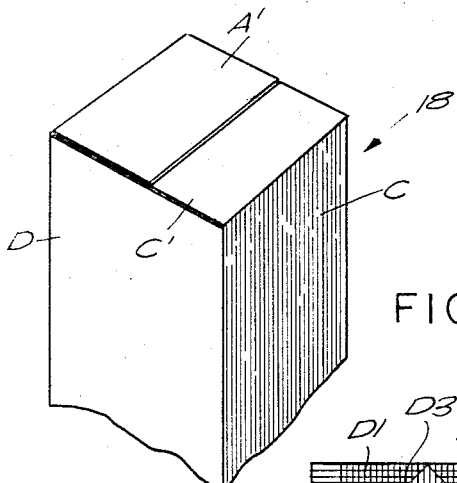

In order to apply the heated air that is directed through the tube 320 by the blower in the housing 318 to the critical areas of the bottom panels of the carton, the heater manifold 324 is formed with a plurality of manifold sections, the configuration of which are illustrated in FIGS. 20 through 23. Secured to the underside of the body portion 302 of the work housing 300 within the heater manifold chamber is a flat manifold section that is provided with passages that communicate with the interior of the tube 320 for receiving heated air therefrom. As seen in FIG. 23, a shortened outside manifold section 328 is secured to the flat manifold section 326 and is provided with a plurality of nozzle openings therein that define a pattern for supplying the heated air to panel C1 on the outside surface thereof. Disposed at right angles with respect to the short manifold section 328 are outside manifold sections 330 and 332, both of which are provided with a plurality of nozzle openings for heating the outside surfaces of the panels D1, D2 and D3 and B1, B2 and B3 respectively, in the patterns as illustrated in FIG. 35. Since the outside of panel A1 forms the bottom of the carton there is no requirement for heating this surface and as shown in FIG. 21, a manifold section is not located opposite this panel. The bottom panels of the walls B and D are adapted to be folded in the manner as illustrated in FIG. 33 and thus these triangular areas must be heated in corresponding patterns. For this purpose manifold sections 334 and 336 are provided and are located interiorly of walls B and D, when the carton is disposed at the heating station. As seen in FIGS. 20 and 21 the nozzle openings that are formed in the manifold sections 334 and 336 are located so as to direct the heated air onto the inside surfaces of the panels D1, D2 and B1, B2 in appropriate triangular patterns. Inside manifold sections similar to 334 and 336 are disposed opposite the manifold sections 330 and 332 and are provided with nozzle openings in patterns similar to that formed in the manifold sections 334 and 336. It will be seen that when a carton is indexed to the heating station with the bottom panels thereof located in an upwardly directed position as illustrated in FIG. 32, the work housing 300 will be moved downwardly by the push rod 100 to locate the manifold sections of the manifold assembly in enveloping relation around the bottom panels. Heated air supplied through the tube 320 is then directed through the nozzle openings formed in the various manifold sections to heat the critical areas of the panels in the patterns as illustrated in FIG. 35.

Figure 24:
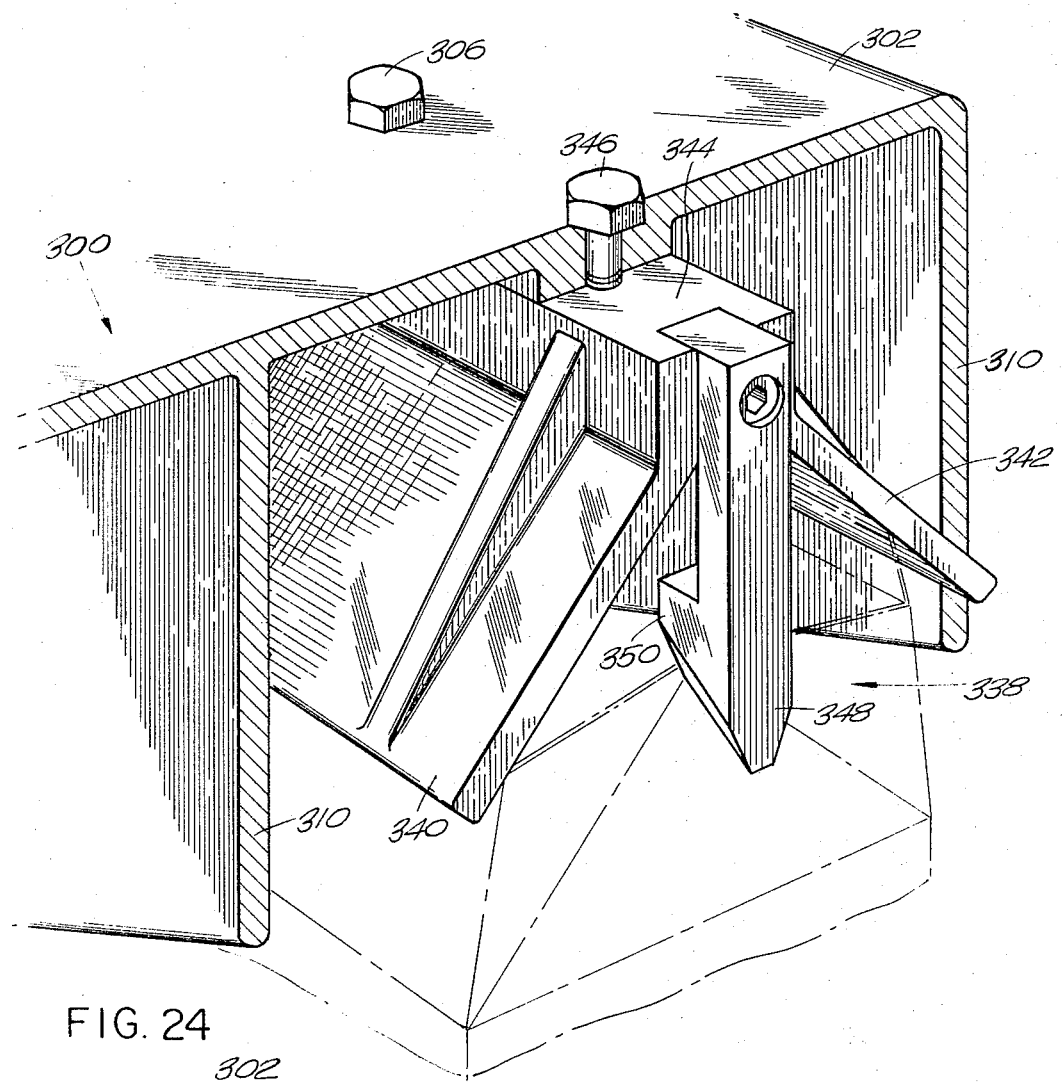
FIG. 24 is a perspective view of the bottom prebreak member on the bottom former table, the bracket therefor being shown in section.
Figure 25:
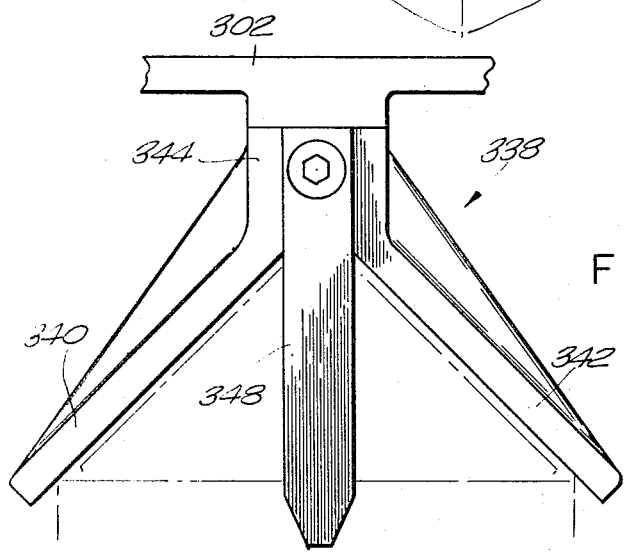
FIG. 25 is an end elevational view of the prebreak member illustrated in FIG. 24.

Located at the bottom former table 12 and spaced 60° from the heat station is the pre-break station at which the bottom panels of the carton are prefolded or "broken" along the score lines thereof. The device for performing the pre-break or prefold operation on the bottom panels is generally indicated in FIGS. 24 and 25 at 338 and is defined by a shed-like V-shaped member that includes inclined walls 340 and 342. The inclined walls 340 and 342 terminate at their upper ends in an upper portion 344 into which bolts 346 extend from the body portion 302 of the work housing 300 for mounting the pre-break device 338 in the pre-break chamber between the spaced walls 310, 312. Secured in notches formed in the opposite ends of the body portion 344 and depending therefrom to a point below the lowermost edges of the inclined walls 340 and 342, are pre-break fingers 348. The lowermost ends of the pre-break fingers 348 are formed with inwardly directed extensions 350, the bottommost edges of which are inclined with respect to the horizontal. As clearly illustrated in FIGS. 24 and 25, the pre-break device 338 which is defined by the inclined walls 340 and 342 and the pre-break fingers 348 are fixed in position with respect to the work housing 300. Thus the only movement incident to the operation of the pre-break device is the vertical movement thereof when the work housing 300 is reciprocated by the push rod 110.

Referring again to FIGS. 24 and 25 and referring further to FIG. 33, it is seen that during operation of the pre-break device the push rod 110 moves the work housing 300 downwardly carrying the pre-break device 338 therewith. Since the pre-break fingers 348 are disposed somewhat below the lower edges of the inclined walls 340 and 342, and are positioned intermediate thereof, they will strike the panels B3 and D3 and will cause these panels to begin the folding thereof along their score line SA1, SA2, SB3 and SD1, SD2, SD3 respectively. Simultaneously with the folding of the panels B1, B2 and B3, and D1, D2 and D3, panels A1 and C1 are caused to fold along their score lines SA and SC respectively. These panels are then engaged by the inner surfaces of the inclined walls 340 and 342 to further fold them to the inclined position as illustrated in dotted lines in FIG. 25. The bottom panels of the carton are thus prefolded along their score lines to the position shown in FIG. 33 to ensure that the subsequent folding of the bottom panels will result in the movement thereof to the proper closing position for sealing.

Figure 28:
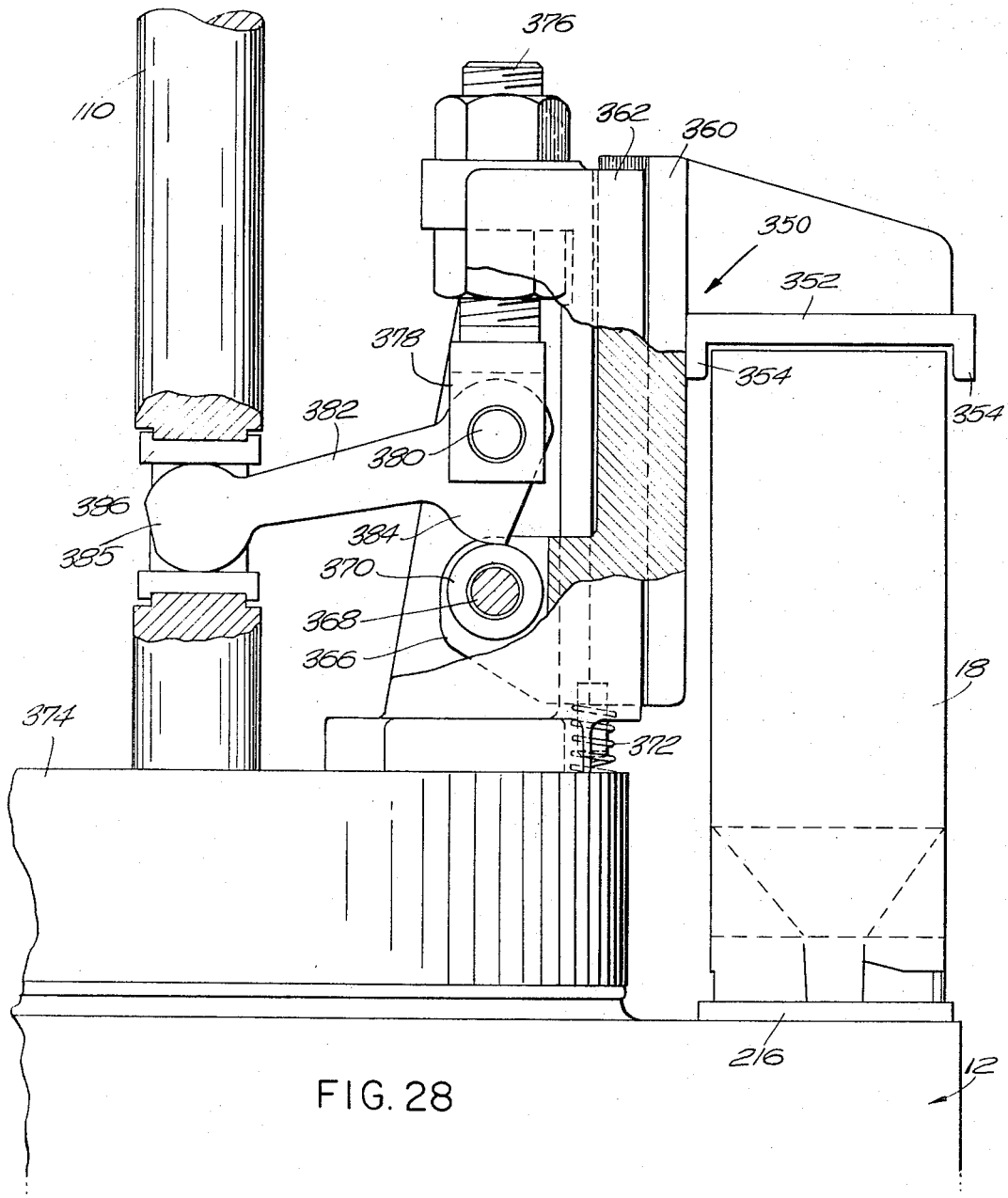
FIG. 28 is a side elevational view with parts broken away of the seal head and drive therefor that are mounted on the bottom former table.

After the bottom panels of the cartons are prefolded they are then ready for the sealing operation. Referring now to FIGS. 28, 29 and 30 the sealing device for the bottom panels is generally indicated at 350, and includes a seal head 352 that is formed with depending flanges 354 that are spaced apart sufficiently to receive the carton 18 therebetween. Joined to the seal head 352 at the leading end thereof is a seal plow generally indicated at 356 that is designed to automatically fold the bottom panels to their closed position as the carton is moved by the table 12 from the prebreak station to the seal station. Referring particularly to FIG. 30, the underside of the seal plow 356 is shown being formed with spaced runners or ribs 358 that are arranged in diverging relation in a direction toward the seal head 352 and that are engaged by the prefolded panels of the carton for moving the panels to a closed position prior to the sealing thereof.

Since the seal head 352 must be vertically reciprocated to permit movement of a carton thereunder and to effect the sealing action of the prefolded panels that have been closed by the seal plow 356, a seal head slide 360 is provided on which the seal head 352 is mounted. The seal head slide 360 is formed with a dove tail configuration and is mounted for vertical movement within a fixed bracket 362 having a corresponding dove tail configuration. Joined to the seal head slide 360 at the lowermost end thereof is a rearwardly extending portion 366 through which a pin 368 extends, the pin 368 having a roller 370 mounted thereon. The seal head slide 360 is normally urged to the upper position thereof by springs 372 that engage the underside of the slide and are mounted on the upper surface of a platform 374 mounted within the table 12 and fixed with respect thereto. The fixed bracket 362 is also mounted on the platform 374 and receives a threaded bolt 376 that projects through the upper end thereof and that carries a member 378 through which a pin 380 extends. A link 382 is pivotally connected to the pin 380 at one end thereof and is formed with a cam edge 384 that is adapted to engage the roller 370. The other end of the link 382 opposite the pin 380 is formed with a head 385 that is interconnected to the push rod 110 by any suitable means such as a bracket 386. It is understood that vertical movement of the push rod 110 will result in pivotal movement of the link 382 around the pivot pin 380. Since the cam edge 384 is movable into engagement with the roller 370, the dove tail seal slide 360 will be moved downwardly against the action of the spring 372 and into engagement with the folded and closed bottom panels of the carton that has been moved by the table beneath the seal head 352. The corresponding upward movement of the push rod 110 will move the cam edge 384 of the toggle link 382 off of the roller 370 thereby releasing the slide 360 under the action of the springs 372 for movement of the seal head 352 to the upper position thereof. It is understood that during the sealing operation, the top surface of the mandrel 216 defines a rigid backing for the bottom panels and cooperates with the seal head 352 to produce an effective sealing action as the bottom panels are firmly squeezed therebetween.

In operation of the sealing device 350, the table 12 indexes the carton beneath the seal plow 356 where the carton panels are folded to the closed position thereof as they are moved beneath the seal head 352. The push rod 110 now moves vertically to pivot the link 382, thereby forcing the cam edge 384 into engagement with the roller 370. The seal slide 360 is than moved downwardly to bring the seal head 352 into firm engagement with the closed bottom panels of the carton. Although the bottom panels had been heated at the heat station prior to movement to the pre-break and seal stations, the heat applied to the bottom panels is sufficiently retained therein by the plastic coated material thereof to retain the panel surfaces in tacky condition for effective sealing when the panels are pressed together by the downward movement of the seal head 352 thereagainst. Upon completion of sealing of the bottom panels of the carton at the seal station, the table 12 is indexed to move the carton to the unload station for the removal of the bottom sealed carton from the table 12 and for transfer to the filler table 14.

*Unload device for bottom former table, orienting funnel and transfer mechanism*

Referring to FIGS. 17 and 36 through 39, the device for unloading the carton at the unload station of the bottom former table 12 is illustrated and includes an unload picker arm assembly generally indicated at 388. As previously mentioned in connection with the operation for loading the cartons onto the bottom former table 12, the unloading operation is carried out simultaneously therewith. In order to accomplish this purpose, the unload picker arm assembly 388 is provided with an unload carrier 390 to which a collar 392 is connected by an arm 396. The collar 392 is mounted for slidable movement on a guide shaft 394 that is fixed to the frame of the machine, the collar 392 having a bolt 398 extending therethrough for interconnection to the chain 298. The chain 298 is movable on idler wheels 400 and 402 that are conveniently mounted in fixed position, and it is seen that a downward movement of the pusher member 284 during a loading of carton onto the load station of the bottom former table will result in an upward movement of the unload picker carrier 390.

Referring now to FIG. 38, the unload picker assembly 388 is shown including an unload picker arm 404 on which a suction member 406 is secured. Joined to the unload picker arm 406 is a sleeve 407 that is mounted coaxially inside the unload carrier 390. The sleeve 407 is movable relative to the carrier 390 and is mounted on a collar 408 that is fixed to the vertical cam shaft 74 for rotation therewith. Formed on the lower end of the collar 408 is an enlarged flange portion 410 to which one end of a tension spring 412 is secured. The tension spring 412 is wrapped around the enlarged flange portion 410 and is secured at the other end thereof to the unload picker arm 404. The unload picker arm 404 is thus interconnected to the vertical cam shaft 74 for rotation therewith but has limited relative movement with respect thereto through the interconnection of the tension spring 412. In order to introduce a vacuum in the suction member 406 a passage 414 is formed in the unload picker arm 406 that communicates with passages 416 and 418 formed in the sleeve 407 and vertical cam shaft 74 respectively, the passage 418 further communicating with an inlet port 420 that is formed in the unload picker carrier 390. A vacuum line 422 is secured to the picker carrier 390 and communicates with the port 420 for establishing communication between the suction member 406 and the vacuum source. A suitable valve controlled by a cam mounted on the horizontal cam shaft 66 may be periodically actuated for supplying vacuum pressure to the suction member 406 as required.

In order to locate the unload picker arm in a positive position with respect to the cam shaft 74 during the rotation thereof, a stop construction is provided and includes an upper collar 424 that is secured to the inner collar 408. Mounted on the sleeve 407 of the unload picker arm 404, is a collar 426 that has limited movement relative to the collar 424. As shown in FIG. 39 a slot 428 is formed on the underside of the collar 424 and receives a pin 430 therein that is secured to the collar 426. Since the collar 426 is fixed to the sleeve 407 of the unload picker arm 424 it will be tensioned therewith by the spring 412 so as to locate the pin 430 against one end of the slide 428 in the stop position thereof. By reason of the location of the pin 430 in the stop position, normal rotation of the shaft 74 will cause the picker arm 404 to be rotated therewith through the collars 426 and 424. As will be described, during the unload operation, the picker arm 404 will be momentarily retarded with respect to the rotation of the shaft 74. Because of the resilient interconnection of the picker arm 404 with respect to the cam shaft 74, this retarding action is permitted but the tension spring 412 will thereafter return the unload picker arm 404 to in-phase rotation with the vertical cam shaft 74. As described, the load picker arm 404 is mounted on and continuously rotates with the vertical cam shaft 74. As indicated in FIG. 17 when the unload picker arm 404 is located in the lower unload position thereof, rotation of the cam shaft 74 will move the suction member 406 into contact with the adjacent wall of the carton that has been indexed to the unload station. As previously described and shown in FIG. 13, just prior to the load operation the load pusher member 284 is disposed in the upper position thereof and with the load pusher member 284 so located, the unload picker arm 404 is rotated into contact with the carton at the unload station. This action produces the momentary retardation of the movement of the unload picker arm 404 with respect to the vertical cam shaft 74. However by reason of the resilient interconnection of the unload picker arm 404 with respect to the cam shaft 74, this retarding effect is permitted. As the unload picker arm 404 is rotated into contact with the carton at the unload station, the valve communicating with the vacuum source is operated to create a vacuum in the suction member 406 so that when the unload picker arm 404 is rotated to the unload position the suction element 406 firmly engages the carton. At this point the valve controlling the air to the cylinder 288 is actuated and the piston in the cylinder is removed downwardly carrying the pusher member 284 therewith. As the pusher member 284 moves down to load a carton onto the table 12 the picker carrier 390 together with the picker arm 404 are simultaneously moved upwardly carrying the carton engaged by the picker arm 404 therewith. The carton is then lifted from the mandrel 216 at the unload station and rotated with the unload picker arm 404 in the circular path as seen in FIG. 36. As soon as the carton clears the mandrel, the tension spring 412 returns the unload picker arm 404 to in-phase rotation with the cam shaft 74 and the unloaded carton is carried in a circular path with the unload picker arm 404 to an unload position directly adjacent a turnover and orienting funnel generally indicated at 432. As previously described the carton as carried on the bottom former table 12 was located in inverted or bottom side up position on a mandrel thereon. Since it is now necessary to reverse the position of the carton for the loading thereof onto the filler table 14, the turnover and orienting funnel 432 is provided and is so designed to cooperate with the unloading device to turn over and orient the carton for the transfer thereof to the filler table.

The funnel 432 is located adjacent to the bottom former table 12 and is mounted on a projecting portion of the base frame of the machine in fixed position. Since the funnel 432 is not only adapted to turn over and orient the cartons directed thereto but is also adapted to position the cartons for transfer onto the filler table 14, the funnel is further located in adjacent relation to the load station of the filler table. A transfer mechanism to be described, is associated with the funnel 432 and is operative to move the cartons directed thereto by the funnel for transfer to the load station of the filler table. As shown in FIGS. 43 and 44 the turnover funnel 432 has a specific shape and configuration for receiving unloaded cartons from the unload picker assembly 388 and is operative to reverse and orient the position of the carton for transfer to the filler table. For this purpose the funnel 432 includes a base 436 on which a flange 438 is formed, bolts 434 extending through convenient openings formed in the flange 438 for securing the funnel 432 to the frame of the machine. The base 436 is defined by spaced vertical walls 440 and 442, and a rear wall 444, a load pusher device to be described being received within the base 436 and movable in a linear direction therein. The spaced walls 440 and 442 define a front opening through which the load pusher device is movable during the loading operation of the carton onto the filler table. Extending upwardly from the spaced walls 440, 442 and the rear wall 444 are triangular wall portions 446, 448, 450 to which the orienting and turnover portion of the funnel is joned. The orienting and turnover portion of the funnel 432 is defined by an upper housing that includes a rear wall 452, a side wall 454, in which an opening 456 is formed, and a side wall 458 that is joined to the rear wall 452 and that is spaced from the said wall 454. A front wall 460 is joined to the side walls 454 and 458, and a top wall 462 which defines the top of the funnel is joined to the front, rear and side walls thereof. Joined to the rear wall 452 and depending therefrom in inclined relation is a bottom wall 464 that extends below the lowermost ends of the side walls 454, 458 and front wall 460. The side walls 454, 458 and the front wall 460 cooperate with the inclined bottom wall 464 to define an opening through which the cartons are directed by the funnel. As will be described, as each of the cartons is transferred from the unload station of the bottom former table to the funnel 432, by the unload picker arm 404 it is released therefrom and the sealed bottom end of the carton is directed into the opening 456 of the side wall 454. This movement reverses the position of the carton which is then directed against the side wall 458 and inclined bottom wall 464 for orientation with respect to the proper loading position onto the filler table. The carton is then presented at the transfer station as illustrated in FIG. 44 in right-side-up position for movement onto the load station of the filler table 14 by the transfer mechanism to be described.

In order to direct the sealed bottom end of the unloaded carton into the opening 456 of the funnel 432, a unique device is employed in the form of an air pressure manifold 466 illustrated in FIGS. 36 and 37. The air pressure manifold 466 is secured to the plate 269 and is formed with spaced nozzles 468 through which air under pressure is intermittently directed. An air line 470 communicates with the nozzles 468 and receives air under pressure from the source that supplies the compressed air to the cylinder 238. A valve operated by a cam mounted on the horizontal cam shaft 66 is actuated periodically to control the supply of air to the nozzles at selected intervals. As seen in FIG. 37 the air pressure manifold 466 is located such that the nozzles 468 are positioned just upwardly with respect to the carton as it is held in position adjacent to the funnel 432 by the unload picker arm 404. As the unload picker arm 404 moves the unloaded carton in the circular path, as seen in FIG. 36, to the unload position adjacent to funnel 432, the vacuum in the suction member 406 is cut off to release the carton from the suction member. Simultaneously therewith, air under pressure is supplied to the nozzles 468, which direct air blasts against the upper positioned bottom ends of the carton as held by the unload picker arm. The blasts of air against the carton flips the bottom end into the opening 456 of the turnover portion of the funnel 432. The carton is thus reversed in position as the bottom end thereof drops downwardly in the funnel. The carton is then directed against the side wall 458 and inclined bottom wall 464 for orientation thereof. The carton slides downwardly on the inclined bottom wall 464 and through the opening in the upper housing of the funnel to the position illustrated in FIG. 44 for transfer to the load station on the filler table.

Figure 42:
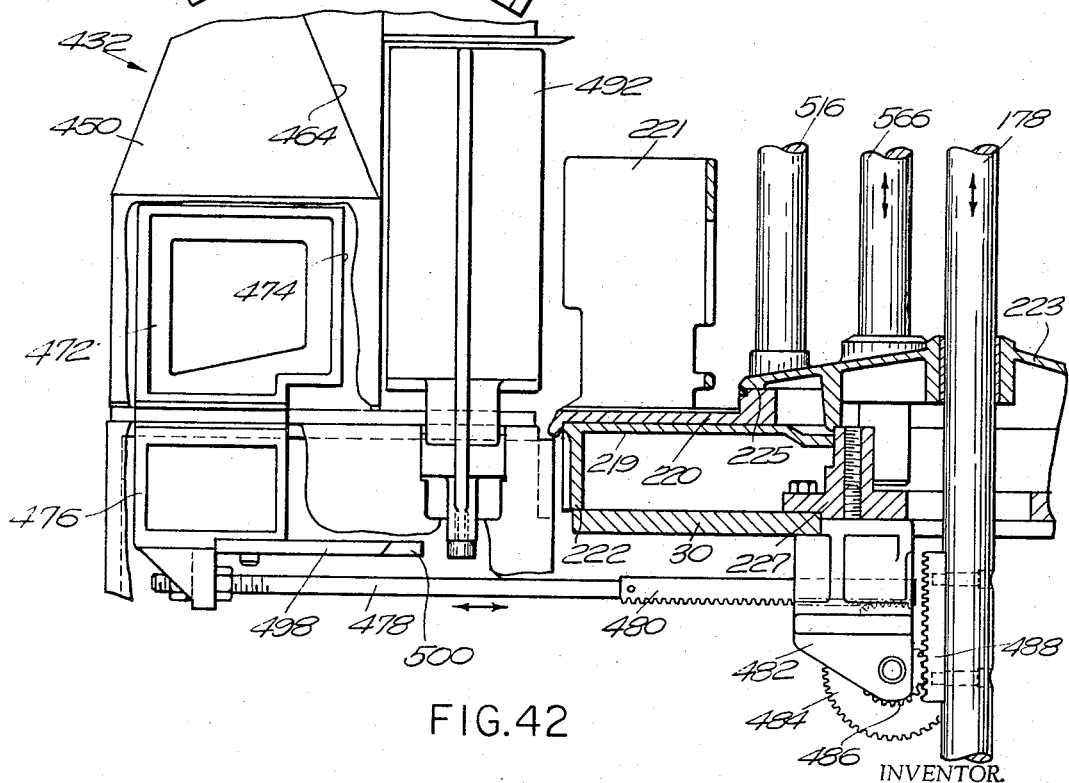
FIG. 42 is a side elevational view with parts broken away of the transfer device for the filler table showing the drive between the transfer device pusher and the filler table.

Referring now to FIGS. 40 and 42, the transfer mechanism for moving the carton from the transfer station at the funnel 432 to the load station on the filler table 14 is illustrated. The transfer mechanism includes a pusher device 472 that is positioned within the lower portion of the funnel between the spaced walls 440, 442 and end wall 444. The pusher device 472 includes a forward face 474 that is adapted to engage the adjacent surface of the carton located at the transfer station. Secured to the pusher device 472 and depending therebelow through an opening in the frame on which the funnel 432 is mounted, is a lower portion 476 to which a pusher rod 478 is operatively connected. The pusher rod 478 extends beneath the filler table 14 and has a horizontal pusher rack 480 secured to the innermost end thereof. Mounted on a bracket 482 fixed to the frame of the machine is a gear 484 that is located in meshing engagement with the rack 480. Formed on the gear 484 is a smaller gear 486 that engages a vertical rack 488 that is in turn, secured to the vertical push rod 178. As described above the vertical push rod 178 is mounted for reciprocation in the filler table 14 and is operated by the cam 172 that is rotated by the horizontal cam shaft 66. It is seen that vertical reciprocation of the push rod 178 will produce a corresponding horizontal translating movement of the pusher device 472, wherein the pusher device 472 is moved in a linear direction toward the filler table. As the pusher device moves toward the filler table 14, the face 474 engages the adjacent wall of the carton located at the transfer station and thereby moves the carton forwardly to the load station of the filler table.

It is essential that as the carton is moved to the load station of the filler table it is properly aligned during the translating movement thereof. For this reason pivotal side guides 490 and 492 are provided, the side guides being pivotally secured to the frame of the machine at pivot points 494 and 496 respectively. The side guides 490 and 492 are constructed so as to be overbalanced and will normally fall to an outwardly pivoted position as illustrated in the dotted line position of the side guide 492 in FIG. 40. In the outer or normal position of the side guides 492, sufficient space is provided therebetween for receiving a carton as it falls downwardly through the funnel 432. During movement of the carton through the funnel, the pusher device is retained in the inactive position as illustrated in FIG. 42. Since the side guides 490, 492 are located in their outer pivoted position, a carton may fall therebetween as it is directed downwardly through the funnel 432 to the transfer station. Simultaneously with the arrival of the carton at the transfer station, the vertical push rod 178 is vertically moved to cause the pusher device 472 to begin the forward travel thereof. Secured to the lower portion 476 of the pusher device 472 is a blade cam 498 on the forwardmost end of which beveled end portions 500 are formed. As the pusher member 472 moves forwardly the beveled portions 500 of the cam 498 engage rollers 502 and 504 that are secured to the lowermost ends of the side guides 490 and 492. As the pusher device 472 continues in its forward travel, the blade cam 498 moves between the rollers 502 and 504 forcing them away from each other to the position illustrated in FIG. 40. The side guides 490 and 492 to which the rollers 502 and 504 are secured are then pivotally moved to the upright position as also shown in FIG. 40. In this position the inner surfaces of the side guides 490, 492 are disposed in adjacent relation to the side walls of the carton that is located at the transfer station, the side guides acting to align the carton for the movement thereof by the pusher device 472 into the chamber 221 that is located at the load station of the filler table. Continued movement of the pusher device 472 forces the carton between the side guides 490 and 492 into the aligned chamber 221 of the filler table. The carton is now loaded on the filler table and is ready for indexing to the various work stations thereat. It is seen that the carton as loaded on the filler table is disposed in right side up position with the top panels thereof facing upwardly for the operation thereon by the work devices located at the various stations at the filler table.

*Tab break, pre-break and re-strike work devices at filler table*

Figure 46:
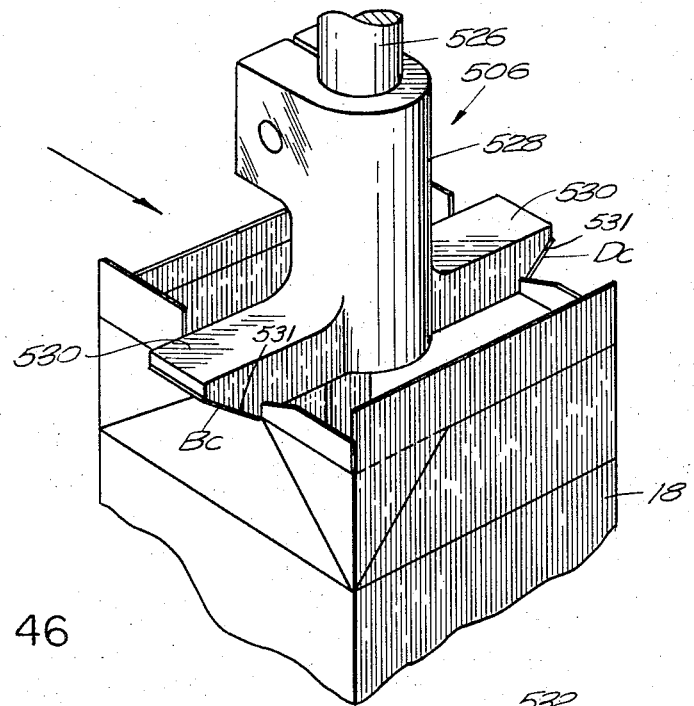
FIG. 46 is a perspective view of the tab break device as it appears in the tab break position in the upper portion of a carton.
Figure 48:
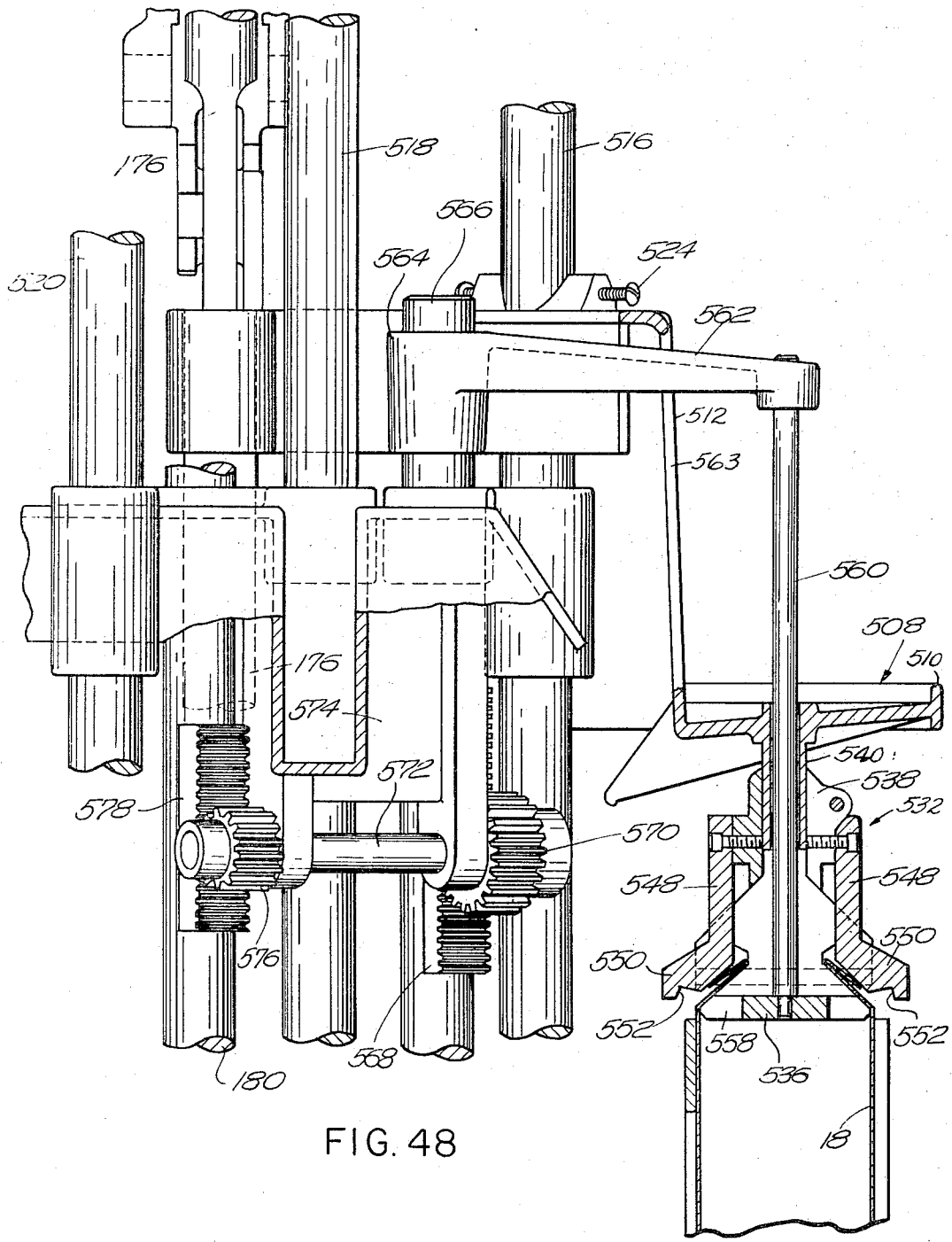
FIG. 48 is a view in elevation with parts shown in section of the drive for the filler table prebreak device.
Figures 50, 51, 52:
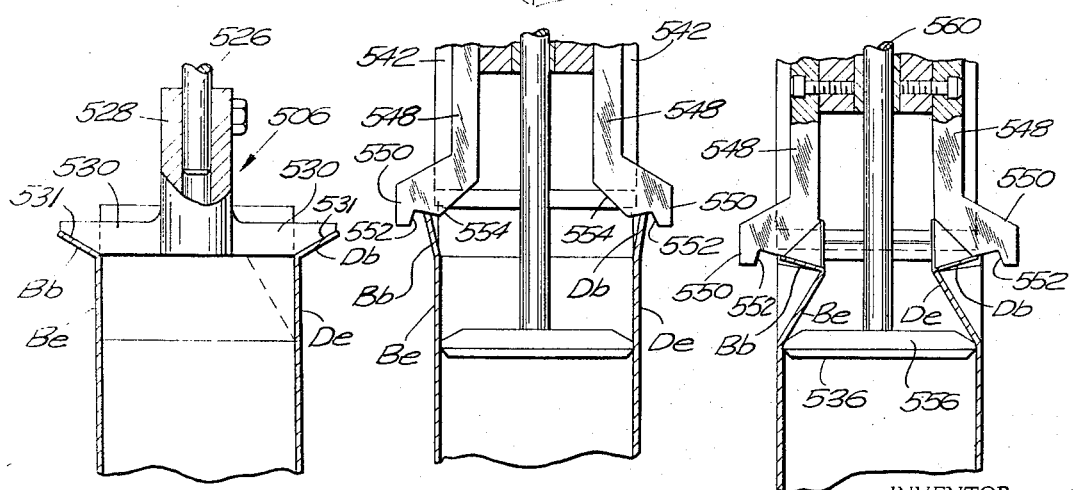
FIG. 50 is a view corresponding to FIG. 46 showing the position of the tab break device during the tab breaking operation.
FIG. 51 is a view showing the position of the prebreak fingers on the carton tabs during the initial step of the prebreak operation by the filler prebreak device.
FIG. 52 is a view showing the bending of the carton top panels by the filler prebreak device prior to reaching the position illustrated in FIG. 48.

In order to fold and seal the top panels of the carton, these panels must be first prefolded along the score lines thereof so during the sealing operation the panels may be properly folded for the effective closing and sealing thereof. Referring now to FIGS. 76 through 81, the top of the carton is shown during the various stages of the folding and sealing thereof. In order that the top panels of the carton be located in proper position for sealing, it is necessary that the side-tabs B*b* and D*b* be bent outwardly as illustrated in FIG. 80 and thus the first step in processing the cartons at the filler table work stations is the pre-breaking of the tabs to the position shown in FIG. 77. As shown in FIGS. 46 and 50 a tab break device generally indicated at 506 is provided and is adapted to prefold the tabs B*b* and D*b* of the carton top along their score lines SB*b* and SD*b* respectively. The pre-break device 506 is secured to a work bracket generally indicated at 508, which as shown in FIGS. 45 and 48 includes an arcuate plate 510 that overlies a plurality of work stations and carries the work devices thereon. Joined to the arcuate plate 510 is an upstanding curved wall 512 to which a rearwardly extending upper portion 514 is integrally joined. The upper portion 514 is provided with an opening through which the vertical push rod 176 extends, the work bracket 508 being secured to the vertical push rod 176 for vertical reciprocation therewith. As will be noted in FIG. 45 guide rods 516, 518, 520 and 522 extend through the central member 223 that is mounted on the machine frame and define guide means on which the various work devices move during the operation thereof. The upper portion 514 of the work bracket 508 is further provided with an opening therein through which the guide rod 516 extends, locating screws 524 cooperating with the guide rod 516 to guide the work bracket 508 during the vertical movement thereof.

Figure 70:
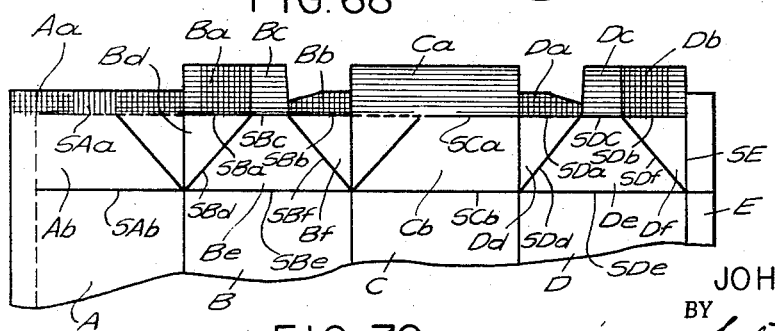
FIG. 70 is a view of the top portion of the carton in blank form showing the critical areas that are heated by the carton top heater manifold.

The tab break device 506 is secured to a support shaft 526 that is mounted in a suitable opening formed in the arcuate plate 510 of the work bracket 508, the tab break device 506 being positioned such that it is disposed over the chamber 221 of the casting 220 that is located adjacent to the load station. Referring again to FIGS. 46 and 50, the tab-break device 506 is shown including a tab break anvil that is defined by a head 528 to which opposed arms 530 are integrally joined. The head 528 of the tab break device 506 is secured directly to the support shaft 526 and the tab break device is thus movable with the work bracket 508 when it is reciprocated by the push rod 176. The under side of the opposed arms 530 are formed with inclined surfaces 531, the length and width of which correspond generally to that of the tabs B*b* and D*b*. Since the underside of the arms 530 are inclined, when the tab break device is moved downwardly by the work bracket 508 to the position shown in FIGS. 46 and 50, the inclined surfaces of the arms 530 strike the inner surfaces of the tabs B*b* and D*b* to bend them outwardly to "break" the tabs on their score lines SB*b* and SD*b* respectively. After upward movement of the tab break device with the work bracket 508, the tabs will remain in a prefolded position as illustrated in FIGS. 51 and 70.

Figure 47:
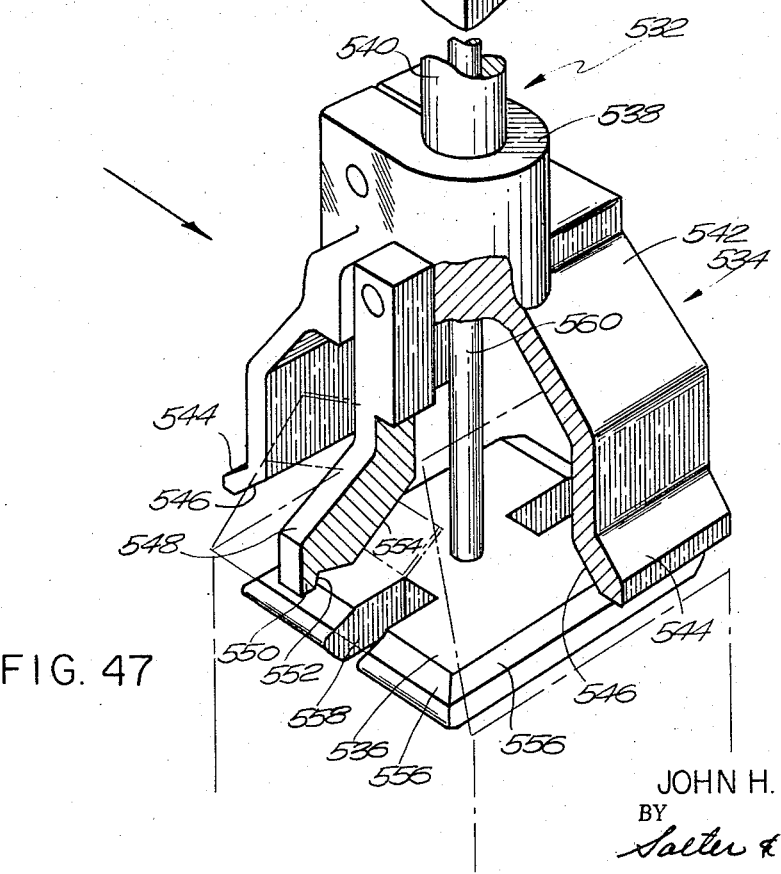
FIG. 47 is a perspective view of the prebreaking device on the filler table showing the position of the filler table prebreak device within a carton during the prebreaking operation.

After the tab breaking operation, it is necessary to prefold the remaining top panels to "break" these panels along their score lines for the subsequent closing and sealing thereof. However, the pre-break operation must be controlled so as to locate the panels in a position for permitting the insertion of a filling tube within the carton. Referring to FIGS. 47, 48 and 51 a pre-break device generally indicated at 532 is illustrated and includes an outer die member generally indicated at 534 and an inner mandrel 536 that is positioned within the outer die and is movable with respect thereto. The outer die member 534 includes an upper head portion 538 in which an opening is formed for receiving the outer shaft 540 that is secured to the underside of the arcuate plate 510 of the work bracket 508. As shown in FIG. 48, the pre-break device 532 is fixed to the plate 510 adjacent to the tab break device 506 and is aligned with respect to the carton that is located at the prebreak station on the filler table. Since the outer die member 534 is secured directly to the work bracket 508, vertical movement of the work bracket 508 by the vertical push rod 176 will result in a corresponding movement of the outer die member.

As shown in FIGS. 47 and 48, the outer die member includes opposed walls 542 that are integrally joined to the head portion 538 and include opposed outwardly flared bottom portions 544 on the inside of which inner inclined surfaces 546 are formed. Secured to the head portion 538 and disposed intermediate the opposed walls 542 of the outer die member are pre-break fingers 548 each of which is formed with a downwardly extending projection 550 in which an inner notch 552 is formed. The inner edge of each of the fingers 548 is further formed with an inclined surface 554 that aids in the pre-breaking operation as will be described.

Figure 78:
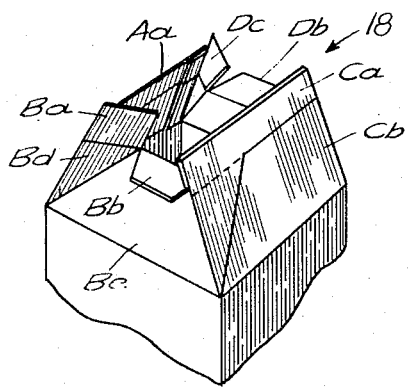

The inner mandrel 536 is movable between the opposed walls 542 of the die member 534 and as shown in FIG. 47 is formed with beveled peripheral edges 556 over which the top panels of the cartons are folded during the pre-breaking operation. Opposed slots 558 are formed in the inner mandrel 536 for receiving the pre-break fingers 548 in the lowermost position thereof during the pre-breaking operation. Secured to the inner mandrel 536 is an inner shaft 560 that extends upwardly through an opening formed in the outer shaft 540 and that projects upwardly therefrom for securement to an arm 562 that projects through an opening 563 formed in the arcuate wall 512 of the work bracket 508. Joined to the arm 562 at the inner end thereof is a collar 564 that is mounted on a vertical shaft 566 for movement therewith. The vertical shaft 566 extends downwardly into the central pedestal 227 of the frame located at the filler table 14 and is journaled therein. Referring again to FIG. 48, a vertical rack 568 is shown secured to the lower end of the shaft 566. Engaging the vertical rack 568 is a gear 570 that is secured to a shaft 572 mounted in a fixed bracket 574. Secured to the other end of the shaft 572 is a gear 576 that engages a rack 578, that is, in turn, secured to the vertical push rod 180. It is seen that vertical movement of the push rod 180 will be translated into vertical movement of the vertical shaft 566 through the rack 578, gear 576, shaft 572, gear 570 and rack 568. Movement of the push rods 176 and 180 is timed such that the push rod 176 is lifted just before upper movement of the push rod 180. However, the push rod 180 is timed to move downwardly just before downward movement of the push rod 176. In the operation of the prebreak device 532, the movement of the shaft 566 in response to movement of the shaft 180 causes the inner mandrel shaft 560 to move downwardly into the interior of the carton to the position shown in FIG. 51. The work bracket 508 is then moved downwardly by the shaft 176 to move the outer die member 534 therewith. As the outer die member 534 moves downwardly, the notches 552 of the pre-break fingers 550 engage the uppermost edges of the tabs B*b* and D*b* and upon further downward movement of the outer die member 534, the panels B*e* and D*e* are caused to bend along their score lines SB*d*, SB*e*, SB*f* and SD*d*, SD*e*, SD*f* respectively. The tabs B*b* and D*b* during this operation ride along the surfaces of the notches 552 as seen in FIG. 52. As the outer die member 534 reaches the lower position thereof as seen in FIG. 48, the tabs B*b*, D*b* are bent outwardly on their score lines SB*b* and SD*b* and are now engaged by the inclined surfaces 554 of the pre-break fingers. This acts to further bend the panels B*e*, D*e* along their score lines as indicated above and as shown in FIG. 78. Since the inner mandrel 536 is positioned interiorly of the carton the movement of the panels in the manner as described, causes the panels B*e*, D*e* to be bent over the beveled edges 556 of the inner mandrel. As the pre-break fingers move the tabs B*b* and D*b* to begin the pre-break operation, the inner inclined surfaces 546 of the opposed walls 544 engage the panels C*b* and A*b* to bend these panels over the beveled edges 556 of the inner mandrel, and all of the top panels of the carton are thus "broken" along their score lines to assume the positions as seen in FIG. 78. After completion of the pre-break operation, the push rod 176 is moved to first lift the outer die member 534 from engagement with the top panels of the carton. The push rod 180 is then moved to lift the shaft 560 for retracting the inner mandrel 536 from the interior of the carton.

Figure 49:
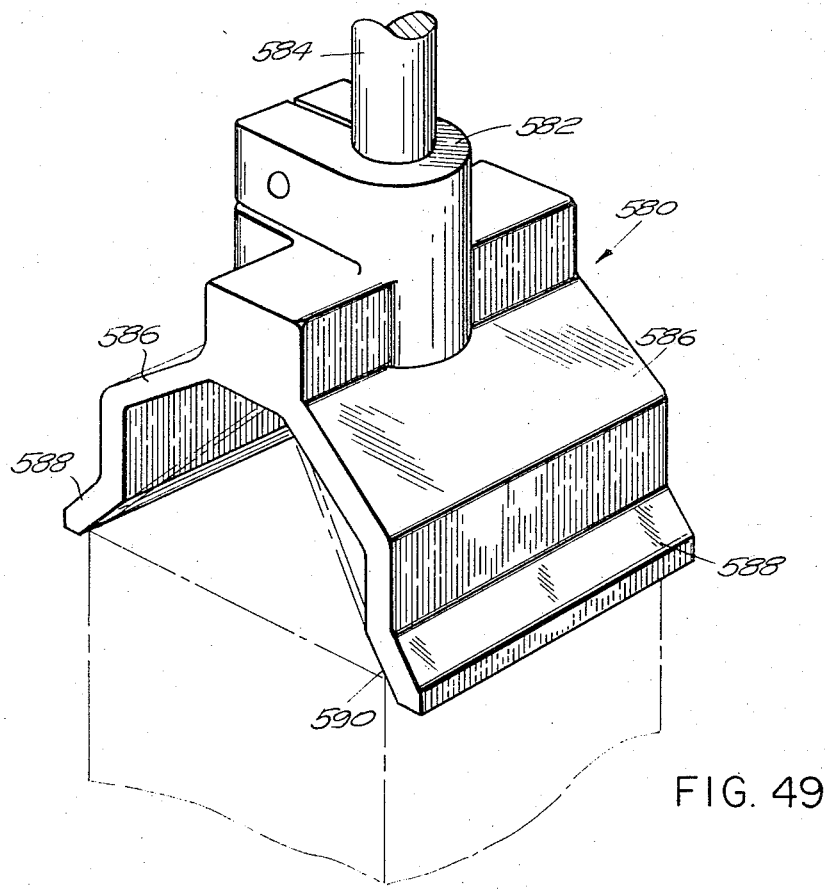
FIG. 49 is a perspective view of the restrike device on the filler table showing the position thereof on a carton during the restriking operation.

As the inner mandrel 536 lifts out of the carton, the edges thereof engage the pre-folded panels and tends to return them to their original position; thus a further pre-folding or "re-strike" operation is necessary to return the panels to the pre-break position thereof, structure for which is described hereinafter. Referring now to FIG. 49, a re-strike device generally indicated at 580 is provided and as shown is constructed similarly to the outer die member 534 of the pre-break device 532. The re-strike device 580 includes a head portion 582 mounted on a shaft 584, that is fixed to the underside of the arcuate plate 510 of the work bracket 508 for movement therewith. The re-strike device is located adjacent to the pre-break device 532 and is adapted to perform the re-strike operation immediately after the pre-break operation. Joined to the head portion 582 of the re-strike device 580 are opposed walls 586 on the lowermost ends of which flared portions 588 are formed. The inner surfaces of the flared portions 588 are inclined as indicated at 590 and define the surfaces for engaging the top panels of the carton for performing the re-strike operation. After the carton has been indexed by the filler table 14 from the pre-break station to the re-strike station, the push rod 176 is moved vertically to again lower the work bracket 508 therewith. The re-strike device 580 moves downwardly and the inclined inner surfaces 590 of the opposed walls 586 engage the panels A$b$ and C$b$ to again bend these panels along their score lines SA$b$ and SC$b$ respectively. Since the adjacent top panels had already been pre-folded by the pre-break device 532, this additional pre-folding of the panels A$b$ and C$b$ will once again serve to re-fold the panels B$d$, B$e$, D$d$, D$e$ and D$f$ along their score lines. Tabs B$b$ and D$b$ remain in the outer folded position thereof, the refolded panels now assuming the position shown in FIG. 79. As described above the tab-break device, the pre-break device and the re-strike device are all fixed to the work bracket 508 and with the exception of the inner mandrel 536 of the pre-break device do not include any parts that are movable relative to the work bracket. Thus the only movement with respect to these work devices aside from the relative movement of the inner mandrel 536 is the vertical movement thereof with the work bracket 508.

Figure 79:
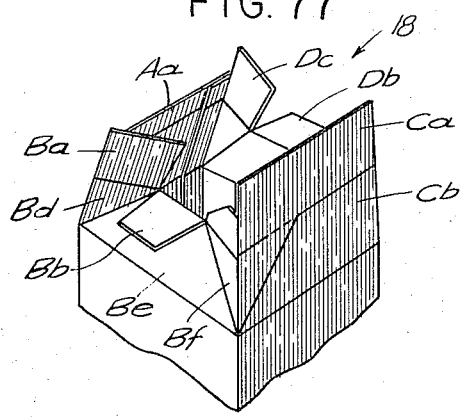
Figure 80:
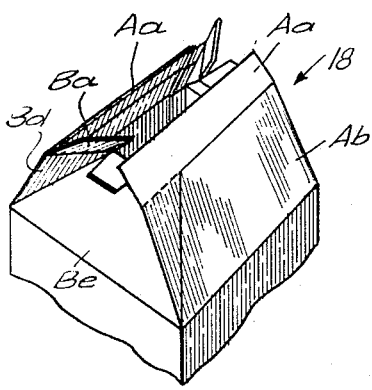
Figure 81:
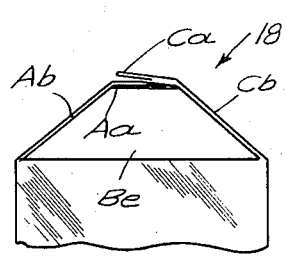

As shown in FIG. 79, the carton panels are sufficiently separated after the re-strike operation to permit the insertion of a sanitizing device into the interior of the carton, and further to permit the insertion of a liquid dispensing tube, to be described, for filling the carton with a liquid. Located adjacent to the re-strike station is the sanitizing or ultra-violet (U.V.) station at which an ultra-violet tube may be inserted into the carton for sanitizing the interior thereof. Referring to FIG. 56, a sanitizing tube 592 is shown located at the U.V. station. The sanitizing tube 592 is mounted on a convenient support 594 which is operatively connected to the push rod 176 for movement therewith. A convenient ultra-violet lamp 596 may be mounted within the tube 592 and will be connected to a source of electrical energy for carrying out the sanitizing operation. Although the present invention includes provision for sanitizing the interior of the carton, it is contemplated that this station may be omitted from the device if other provisions are made for sanitizing the carton interiors.

*Liquid filling device and control mechanism therefor*

Figure 53:
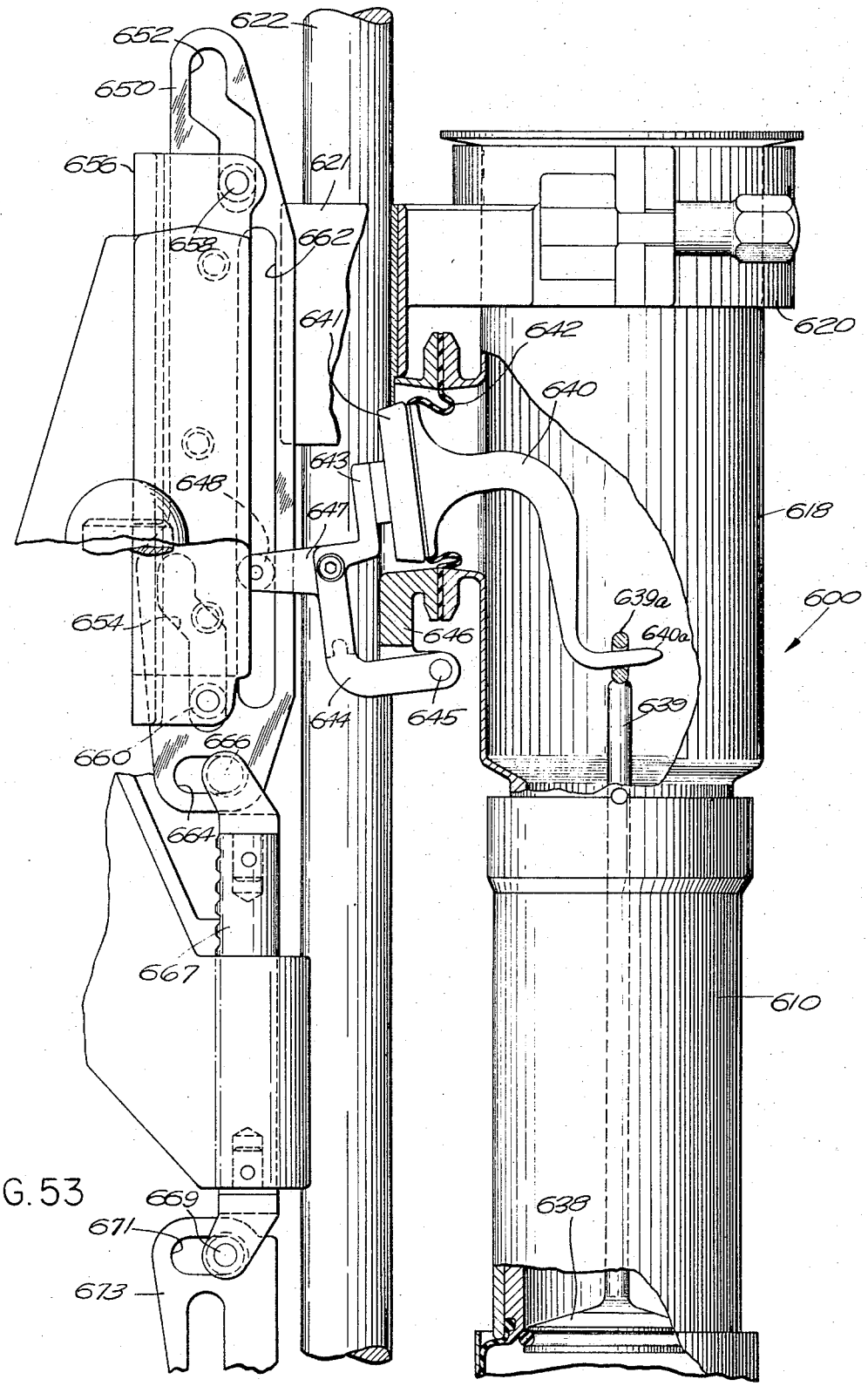
FIG. 53 is an elevatonal view with parts shown in section of the upper bar cam and upper operating assembly for the filler device, the operating assembly being illustrated in the closed position thereof.
Figure 54:
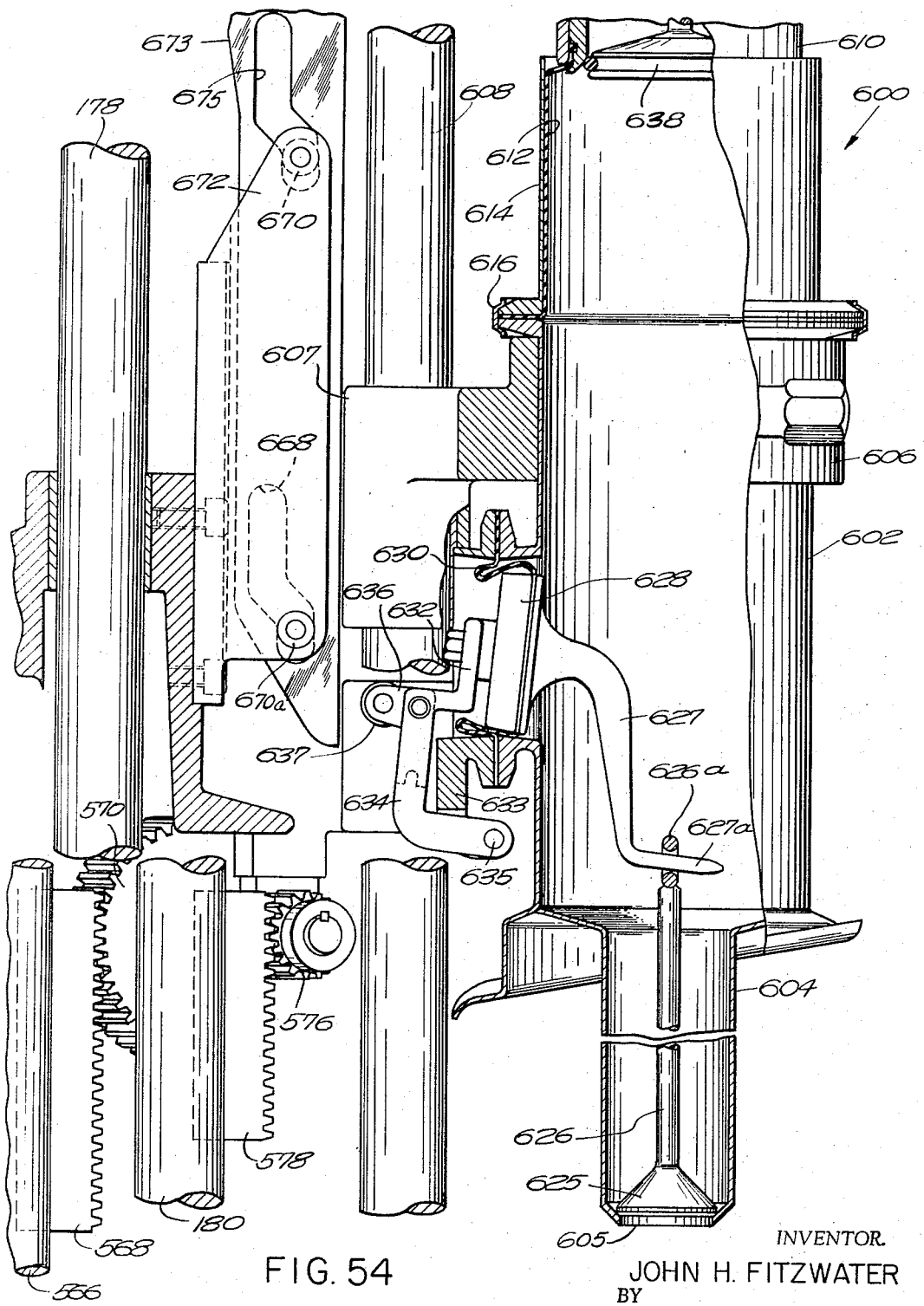
FIG. 54 is an elevational view with parts shown in section of the lower bar cam and the lower operating assembly for the filler device, the filler tube therefor being shown in the closed position and the lower bar cam being shown in the upper or open position.

Although the present invention has application for the filling of cartons with various kinds of liquids, the machine described herein does have particular application in the forming and filling of milk cartons, and although a specific form of liquid filling device is described herein as usable with the apparatus of the present invention, other liquid filling devices may be utilized without departing from the spirit of the present invention. Referring now to FIGS. 53 and 54 a liquid filling device generally indicated at 600 is illustrated and includes a lower tubular section 602 to which a foot portion or filler tube 604 is joined, the lower section 602 being mounted for movement with a guide rod 608, as will be described. As seen in FIG. 54 a dispensing opening 605 is formed in the filler tube 604. An upper section 610 is joined to the lower section of the filling device 600 by means of a flexible diaphragm 612 that is enveloped by a sleeve 614, the sleeve 614 being coupled to the lower section 602 and forming a part thereof. The upper section 610 of the filling device 600 includes a section 618 that is connected to the upper section 610 and forms a part thereof, the upper section 618 having a bracket 620 fixed thereto that is mounted on a guide rod 622 for movement therewith. Extending downwardly into the filler tube 604 of the lower section 602 and normally closing the dispensing opening 605 is a lower valve 625 to which a stem 626 is joined that has an eyelet 626$a$ formed on the upper end thereof. A lower valve operator 627 includes a finger 627$a$ that projects through the eyelet 626$a$ for interconnection to the lower valve 625. An enlarged portion 628 is joined to the lower valve operator and is secured to a flexible diaphragm seal 630 for movement therewith. The seal 630 is fixed between clamped flanges carried by the lower section 602. A link 632 is secured to the enlarged portion exteriorly of the seal 630 and includes an L-portion 634 that is pivotally connected at 635 to one of the clamped flanges. A projection 636 joined to the link 632 carries a roller 637 that is adapted to be engaged by a lower bar cam, to be described.

Located in the upper valve section 610 for controlling flow of liquid through an opening separating the upper and lower sections is an upper valve 638. Joined to the upper valve is a stem 639 to which an eyelet 639$a$ is secured. An upper valve operator 640 includes a finger 640$a$ that projects through the eyelet for interconnection to the valve 638. An enlarged portion 641 is joined to the upper valve operator 640 and is secured to a flexible diaphragm seal 642, the seal 642 being fixed between clamped flanges, carried by the upper section 618. A link 643 is secured to the enlarged portion 641 exteriorly of the seal 642 and includes an L-portion 644 that is pivotally connected at 645 to one of the upper clamped flanges. A projection 647 is joined to the link 643 and carries a roller 648 that engages an upper bar cam, to be described.

In the operation of the filler device 600 the upper valve 638 is held in a positive locked position during the liquid filling operation but is moved to an open position when the filler device is recharging with a liquid. In order to locate the upper valve 638 in the positive locked or unlocked position, an actuating mechanism is provided that includes an upper bar cam 650 in which cam slots 652 and 654 are formed in the upper and lower ends thereof respectively. It is seen that the cam slots 652 and 654 have offset portions that provide for lateral movement of the upper bar cam 650 as will be described. The upper bar cam 650 is mounted for vertical movement on a fixed bar 656 by means of rollers 658 and 660 that project into the cam slots 652 and 654 respectively. Since the bar 656 is fixed, vertical movement of the upper bar cam 650 will cause the rollers 658 and 660 to follow the contour of the cam slots 652 and 654, thereby resulting in a corresponding lateral movement of the upper bar cam 650. Formed in the upper bar cam 650 is a vertically extending slot 662 in which the roller 648 is received. Thus lateral movement of the upper bar cam 650 resulting from vertical reciprocation thereof, will produce a corresponding movement of the upper valve operator 640 through the link 644. The upper valve stem 639 is then reciprocated by the upper valve operator 640 to open or close the upper valve member 638 depending upon the vertical movement of the upper bar cam 650.

The lowermost end of the upper bar cam 650 has a transverse slot 664 formed therein that receives a roller 666 that, in turn, is secured to the uppermost end of a rack member 667. Mounted on the lowermost end of the rack member 667 is a roller 669 that is received within a transverse slot 671 formed in the upper end of a lower bar cam 673. Referring again to FIG. 54, the lower bar cam 673 is shown being formed with cam slots 675 and 668 that are located adjacent to the upper and lower ends thereof, respectively. The cam slots 675 and 668 also have offset configurations and receive rollers 670 and 670a therein, respectively, that are secured in a lower bar 672 that is fixed to the frame of the machine. In the operation of the filler device 600, the lower valve 625 is either retained in a closed position by weight of the valve itself or is allowed to move to an open position thereof through movement of the diaphragm seal 630. In order to prevent movement of the lower valve 625 to an open position, the lower bar cam 650 is moved into engagement with the roller 637 when shifted to the right hand position as seen in FIG. 54. This causes the lower lateral edge of the lower bar cam 673 to engage the roller 637 which positively shifts the link 634 and the lower valve operator 627. When the lower bar cam 673 has been shifted to the position illustrated in FIG. 54 the lateral engaging surface thereof is no longer in contact with the roller 637, and the lower valve 625 is available for movement to an open position.

Figure 59:
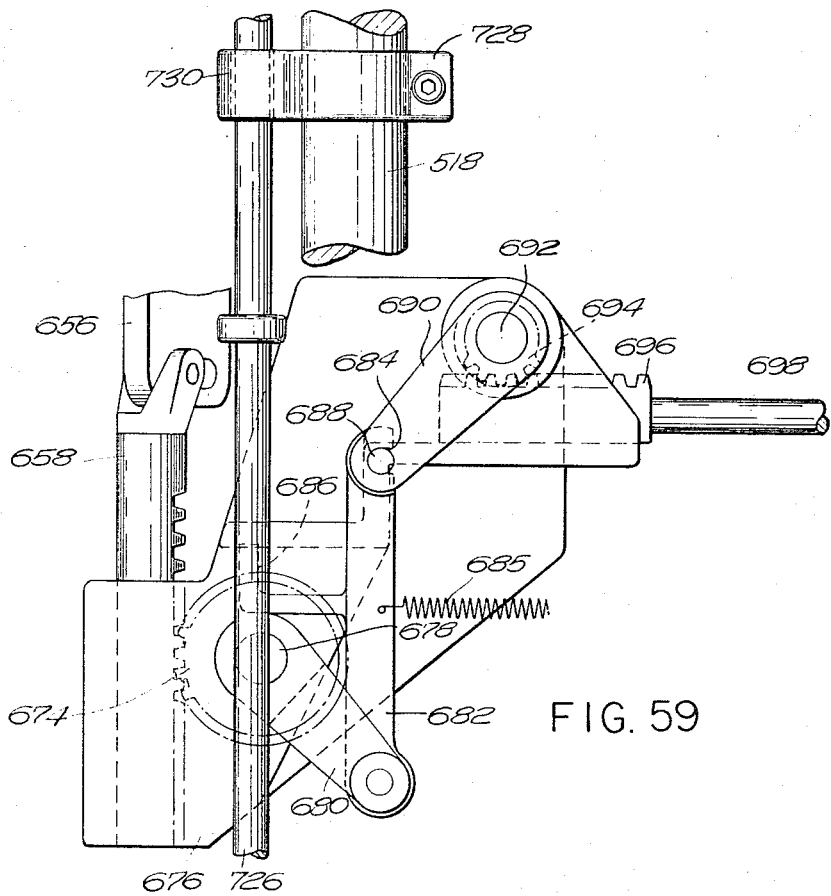
FIG. 59 is a side elevational view of the filler device actuating mechanism.
Figure 60:
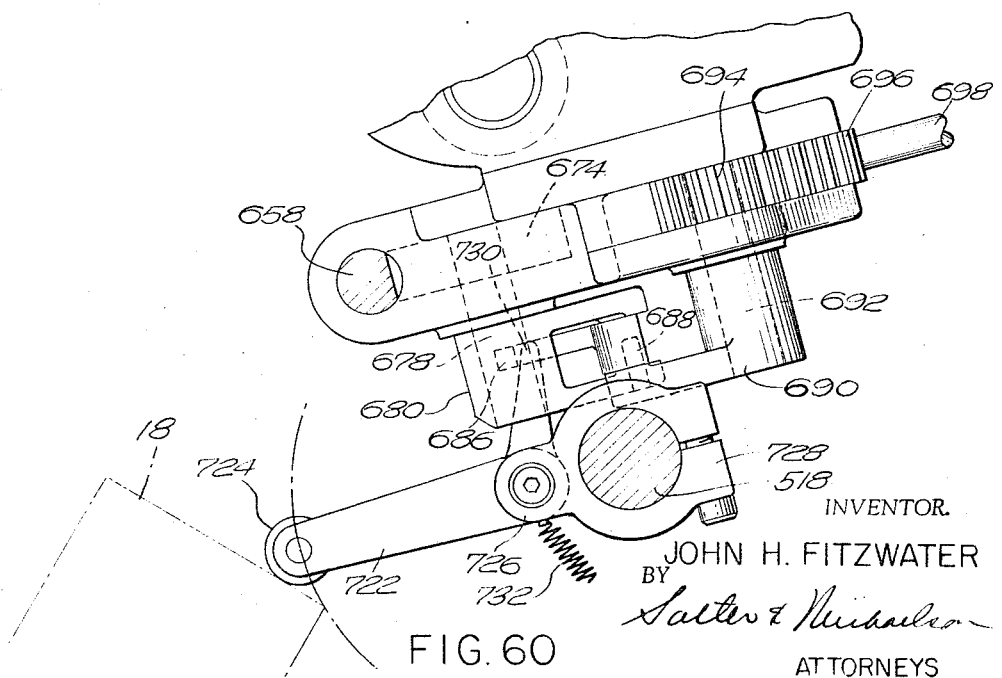
FIG. 60 is a top plan view of the device shown in FIG. 59 and further showing the carton detector device for the filler station.
Figure 64:
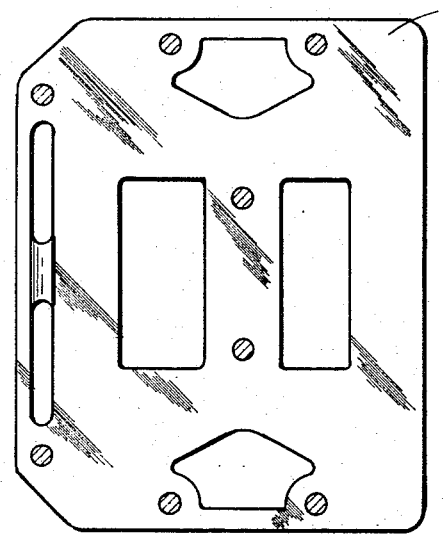
FIG. 64 is a sectional view taken along lines 64—64 in FIG. 61.

In order to vertically shift the upper bar cam 650 and the lower bar cam 673 to operate the upper valve 638 and the lower valve 625, it is necessary that the rack member 667 which interconnects the upper and lower bar cams be vertically shifted in accordance with the required operation of the filler device 600. Thus, vertical movement of the rack member 667 in the required direction will close the upper valve 638 and will then permit the lower valve to be opened. Reverse vertical movement of the rack 667 will move the upper and lower bar cams to open the upper valve 638 and locate the lower valve 625 in closed position. In order to shift the rack member 667 vertically, a dispensing control device is provided and as shown in FIGS. 59 and 60, includes a gear 674 that engages the rack member 667 and that is mounted for rotation within a body portion 676 fixed to the frame. The gear 674 is mounted on a shaft 678 that is journaled in the body portion 676, the shaft 678 having a bifurcated arm secured thereto. Secured between the spaced portions of the arm 680 is a latch link 682 that includes a hook like upper portion having a groove 684 formed therein. Joined to the latch link 682 intermediate the ends thereof is a hook member 686 that forms part of a carton detector device that will be described hereinafter. An arm 690 having a pin 688 secured thereto is mounted on a shaft 692, the pin 690 being normally received within the groove 684 of the hook shaped end of the latch link 682. A spring 685 connected to the latch link 682 urges the latch link to the right as seen in FIG. 59 for causing the pin 690 to be received within the groove 684. Mounted on the shaft 692 is a gear 694 that is located in engagement with a horizontal rack 696. A control rod 698 is joined to the rack 696 and as shown in FIGS. 3 and 15 a shoe 700 is secured to the outer end of the control rod 698. The shoe 700 is mounted on an operating cam 702 and has a slot 704 formed therein in which a slide 706 is located. Formed in the upper surface of the cam 702 is a cam slot 708 in which a follower 710 is received that is fixed to the shoe 700. The cam 702 is mounted for rotation on the vertical cam shaft 74 and it is seen that rotation of the vertical cam shaft 74 will produce a reciprocating movement of the operating rod 698 in accordance with contour of the cam slot 708. When the operating rod 698 is moved forwardly or to the left as seen in FIGS. 59 and 60, the rack 696 will rotate the gear 694 thereby pivoting the arm 690 and producing a corresponding pivoting action of the latch link 682. If the arm 690 is in engagement with the latch link 682 the arm 680 is pivoted with the latch link 682 to produce a rotating movement of the gear 674 and a vertical movement of the rack member 658. The rack member 658 is moved in the required direction to shift the upper and lower bar cams 650 and 664 as required.

Figure 75:
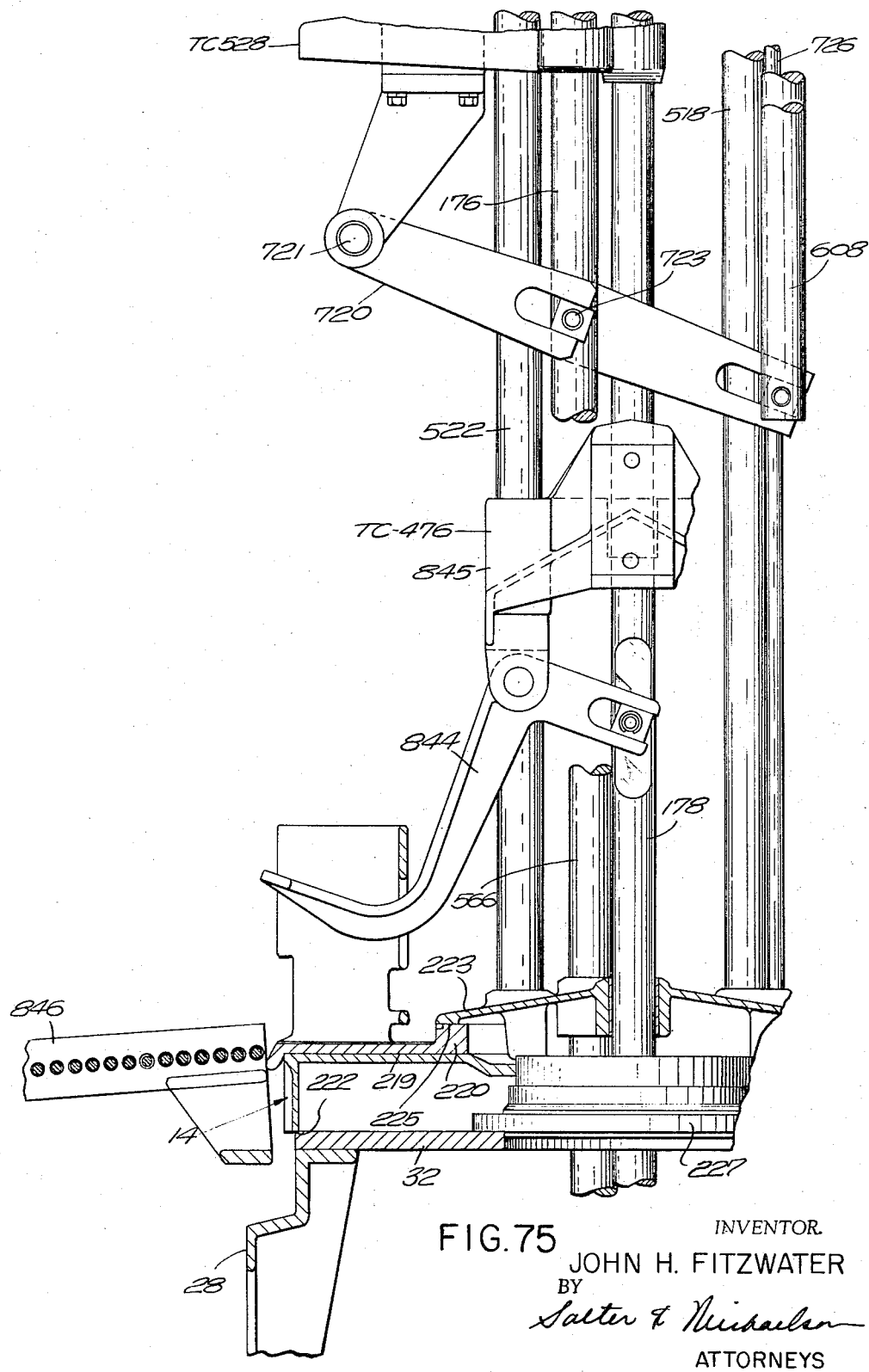
FIG. 75 is an elevational view with parts shown in section of the unloading device for the filler table.
Figure 76:
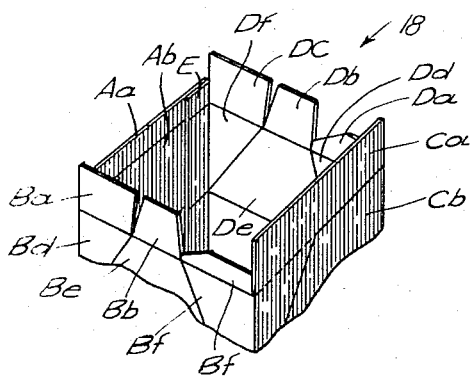
FIGS. 76–80 are perspective views and FIG. 81 is an end elevational view of the top carton showing the sequence of folding and sealing of the carton top panels as the carton is indexed by the filler table.
Figure 77:
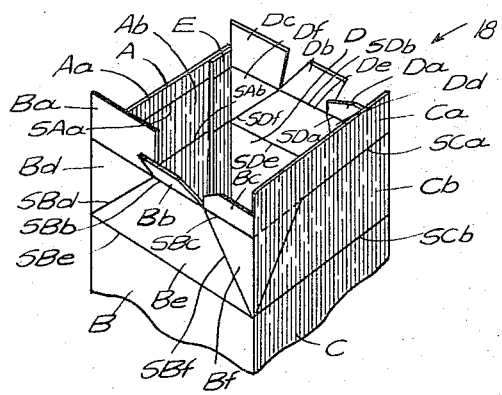

The lower and upper sections of the filler device are movable by the guide rods 620 and 622 respectively. The brackets 606 and 608 to which the lower and upper sections are secured, also include collars that are mounted for slidable movement on the opposite guide rod. Thus the lower section of the filler device that is secured to the guide rod 608 through the bracket 606 and collar 607 is mounted for slidable movement on the guide rod 622. The upper section which is mounted for movement with the guide rod 622 is slidably mounted on the guide rod 608. Both the upper and lower sections are movable as required by vertical movement of push rods to which the guide rods 608 and 622 are operatively interconnected. Referring now to FIGS. 57 and 58, the guide rods 622 to which the upper section of the filler device is secured is fixed to an operating lever 712 which is pinned to the vertical push rod 178 and is pivotally mounted on a post 714 through a pivot connection 716. A slot 718 is formed in the innermost end of the operating arm 712 and is provided for adjusting the throw of the arm 712 about the pivot connection 716. It is seen that vertical movement of the push rod 178 will produce a corresponding vertical movement of the guide rod 622. As seen in FIG. 75 an operating arm 720 that is similar to the operating arm 712 is joined to the vertical push rod 176 at 723 intermediate the ends thereof, and at the forward end is secured to the guide rod 608. The rearmost end of the operating arm 720 is pivotally mounted at 721 on a fixed post similar to that just described in connection with the operating arm 712. It is understood that vertical movement of the push rod 176 will produce a corresponding movement of the guide rod 608. As previously described the guide rods 608 and 622 define means for guiding supporting collars that are also secured to the upper and lower sections of the filler device. Thus the support collar that is mounted on the lower section of the dispensing device will be slidably moved on the guide rod 622. Similarly the supporting collar fixed to the upper section of the filler device will be mounted on the guide rod 608 for movement thereon.

Prior to the operation of the filler device 600 the upper and lower bar cams 650 and 664 are located in the lower position thereof, in which position the upper valve 638 is open and the lower valve 625 is closed and is inoperative. With the upper valve 638 open, liquid from a supply source is introduced into the top of the upper section 618 and the length of the filler device 600 is filled with a column of liquid. In operation of the filler device, after a carton has been indexed to the fill station, the push rods 176 and 178 are shifted simultaneously to move both the upper and lower sections of the filler device 600 downwardly to position the filler tube 604 in the carton at the proper level from the bottom thereof. With the filler tube 604 located within the carton, the operating rod 698 is moved in accordance with the configuration of the cam 702 to lift the rack member 658 to the upper position thereof, which position is shown in FIGS. 53 and 54. After movement of the rack member 658 to the upper position as illustrated in FIGS. 53 and 54, the upper valve 638 is closed and the lower valve operator 627 is released for operating movement as required. This releasing action is produced by removing the lateral surface of the bar cam 664 from engagement with the roller 637. With the filler device 600 located in the position as illustrated in FIGS. 53 and 54, the push rod 178 is actuated to move the guide rod 622 downwardly which moves the upper section 618 therewith. Since the lower section 602 is stationary during this period, the relative movement of the upper section with respect to the lower section will roll the flexible diaphragm connection 612, which action causes the interior of the lower section 602 to be pressurized. This increase in pressure within the lower section 602 is sensed by the diaphragm seal 630 which flexes outwardly to lift lower valve operator 627. The finger 627a located in the eye 626a of the valve stem 626, lifts the valve 625 to uncover the opening 605 and liquid enters the carton to cover the bottom of the carton and the valve 625. Upon completion of this preliminary filling of the carton occasioned by the downward travel of the upper valve section 618, the push rod 176 then moves to lift the guide rod 608 thereby elevating the lower section 602 therewith. With the upper section 610 now stationary, and with the upper valve 638 closed, the upper movement of the lower section 602 will again increase the pressure within the lower section 602. The diaphragm seal 630 is again flexed outwardly in response to the increase in pressure in the lower section 602 and will cause the lower valve operator 627 to lift the valve 625. With the valve 625 open and the filler tube 604 ascending with the upper section 602, the liquid located within the lower section is dispensed through opening 605 and into the carton. The carton is thus filled with liquid as the filler tube 604 is withdrawn therefrom. It is seen that the quantity of liquid dispensed into the carton will be determined first, by the distance of the downward travel of the upper section 610 and second, by the distance of the upward travel of the lower valve section 602. After the carton has been filled with the liquid to a predetermined level, the push rods 176 and 178 are simultaneously lifted to move the guide rods 608 and 622 therewith. The upper and lower sections of the filler device are then moved simultaneously upwardly to the inoperative position to complete the carton filling operation. As the upper and lower sections move upwardly together, the liquid within the upper section 618 is displaced therefrom and is returned to the liquid supply tank. Following the movement of the upper and lower sections to the upper position after the filling operation has been completed, the rack member 658 is shifted in response to operation of the control rod 698 to return the upper valve 638 to the open position and the lower valve member 625 to the closed position. In this position the lower valve member 625 is permitted to drop by its own weight to the closed position thereof and will remain in the closed position until the next fill operation when the diaphragm seal 630 is flexed in response to pressure in the lower valve section 602. Liquid from the supply source then enters through the top of the filler device to fill the length thereof for the next filling operation.

If for some reason a carton has not been indexed to the fill station, the filler device 600 must be automatically rendered inoperative so as to prevent the dispensing of liquid thereby. In order to accomplish this purpose a detector device is provided and is operated to prevent the operation of the rack member 658 so as to retain the valves 638 and 625 in their inoperative positions. Thus if the valve member 638 is not closed when the upper section 618 is moved downwardly with respect to the lower section and vice versa, a differential pressure is not created in the filler device and the filling operation will be prevented from being carried out. Referring again to FIGS. 59 and 60 a detector arm 722 is shown mounted on a detector shaft 726 at the lower end thereof. Secured to the outer end of the detector arm 722 is a roller 724 which is normally biased with the arm 722 by a spring 732 to the position illustrated in FIG. 60 for engagement with the adjacent wall of a carton located at the fill station. The detector shaft 726 to which the detector arm is secured extends upwardly in parallel relation with respect to the guide rod 518, and as shown in FIG. 59, a bracket 728 is fixed to the guide rod 518 and carries a bearing collar 730 through which the upper end of the detector shaft projects for rotation therein. The spring 732 that is fixed to the detector shaft 726 is also fixed to a part of the frame of the machine and normally urges the detector arm 722 in a direction toward the carton located at the fill station. Secured to the detector shaft 726 at a point adjacent to the hook 686 that is mounted on the latch link 682 is a finger 730, that in the normal position thereof projects into the space defined by the upwardly extending hook 686 and the latch link 682. In the normal operation of the control mechanism for the filler device 600 the spring 685 forces the latch link 682 toward the right as seen in FIG. 59 to retain the pin 688 of the arm 690 within the groove 684 formed in the upper hook portion of the latch link. If a carton has not been indexed to the fill station the roller 724 will fall into the unoccupied chamber 221 and the spring 732 which overrides the spring 685 will move the detector arm 722 in a counter-clockwise motion as seen in FIG. 60. The counter-clockwise movement of the arm 722 to which the roller 724 is secured, will produce a corresponding counter-clockwise movement of the detector shaft 726. The finger 730 then moves against the hook 686 to pivot the latch link to the left as seen in FIG. 59 and will withdraw the latch link from engagement with the arm 690. Since there is no longer a connection between the operating rod 698 and the rack member 658, the rack member 658 cannot be shifted by the reciprocating movement of the control rod 698, and the valves 638 and 624 will fail to operate. Thus in the absence of the carton at the fill station the carton detector arm 732 will sense the opening in the chamber at the fill station and will disconnect the control to the bar cams to prevent the operation of the filler device valves.

*Heater assembly for filler table*

Figure 65:
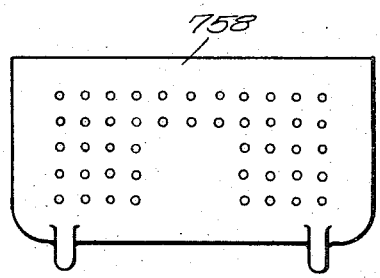
FIG. 65 is a sectional view taken along lines 65—65 in FIG. 62.
Figure 67:
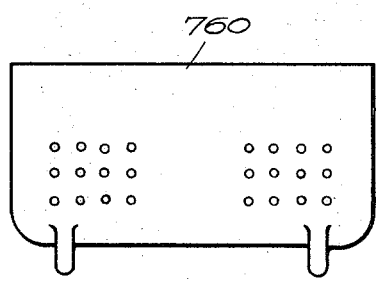
FIG. 67 is a sectional view taken along lines 67—67 in FIG. 62.
Figures 66, 68:
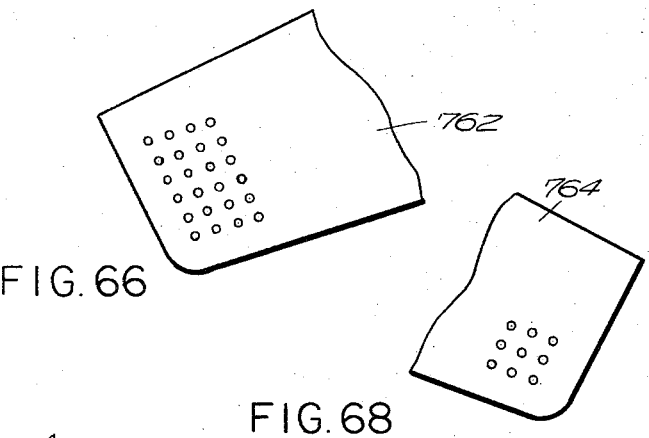
FIG. 66 is a sectional view taken along lines 66—66 in FIG. 62.
FIG. 68 is a sectional view taken along lines 68—68 in FIG. 62.
Figure 69:
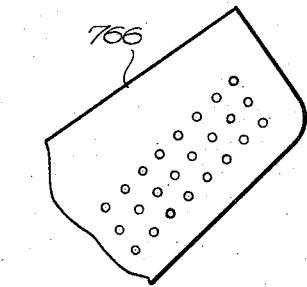
FIG. 69 is a sectional view taken along lines 69—69 in FIG. 62.

Upon completion of the filling operation at the fill station, the top panels of the carton must be closed and sealed, and in order to effect the seal of the top panels, they must be heated in predetermined patterns and at critical areas. Referring now to FIGS. 61 through 71 the heater assembly for applying the heated air to the critical areas of the top panels of the carton is illustrated and includes a housing 734 in which a blower is located for supplying the necessary air during the heating operation. Fixed to the housing 734 is a tubular member 736 in which a heating element 738 is positioned. A bracket 740 mounted on the tubular member 736 secures the tubular member 736 to the vertical push rod 180 for movement therewith. Secured to the tubular member 736 and communicating with the interior thereof is a heater manifold assembly generally indicated at 742. The manifold assembly 742 includes a fitting 744 in which the lowermost end of the tubular member 736 extends for communication with a chamber 746 that is formed in the interior of the fitting. Secured to the underside of the fitting 744 is a manifold plate 748 that is provided with a plurality of openings that are adapted to direct heated air from the tubular member 736 to the various manifold sections to be described. As seen in FIGS. 61 and 62, the manifold sections include a rear section 750, a front section 752, a side section 754 and a central section 756. Each of the manifold sections is formed with walls in which a plurality of nozzles or openings are formed for directing the heated air onto the critical areas of the top panels of the carton in predetermined patterns, as illustrated in FIG. 70. As previously described in connection with FIG. 35, the vertical lines shown on the panels in FIG. 70 indicate outside surfaces to be heated. The horizontal lines indicate inside surfaces of the panels to be heated and the cross lines indicate both inside and outside surfaces of the panels that are to be heated. With reference now being made to FIG. 62 and FIGS. 63 through 69, the patterns defined by the nozzle openings are shown in several of the manifold section walls. In FIG. 65 a wall 758 joined to the section 756 is shown formed with nozzle openings for applying heated air to panel Ca. In FIG. 67 the wall 760 formed on the section 756 is shown being formed with nozzle openings therein for heating the outside portions of panels A*a* as indicated. In FIGS. 66, 68 and 69 walls 762, 764 and 766 are shown being formed with nozzle openings therein for applying heated air to the inside surfaces of panels B*a*, B*b* and the outside surface of D*a* respectively. In FIG. 63 a wall 786 formed on the rear section 750 is formed with nozzle openings that are arranged in a pattern for heating the outside surfaces of panel D*b*. The central manifold section 756 and the side manifold section 754 are also provided with nozzle openings for directing the heated air therethrough for applying the necessary heat to the opposite surfaces of the top panels for the heating thereof in the patterns as indicated in FIG. 70. During the heating cycle at the filler heat station, the heater manifold assembly 742 is moved downwardly by the push rod 180 to locate the various manifold sections in proper position for heating the top panels of the carton as illustrated and described. Upon completion of the heating cycle, the push rod 180 moves the heater manifold assembly 742 upwardly and the carton is then indexed to the seal station.

*Carton top sealing device, unloader and miscellaneous elements*

Figure 74A:
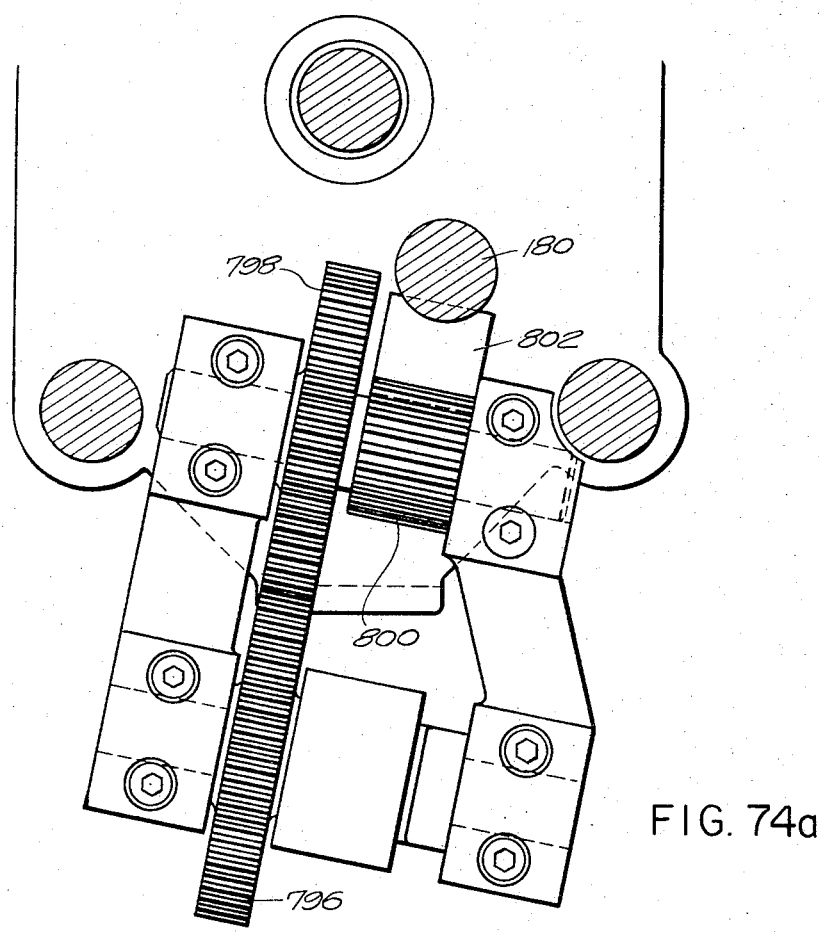
FIG. 74a is a top plan view of the sealing device operating mechanism shown in FIGS. 72 and 73.
Figure 12A:
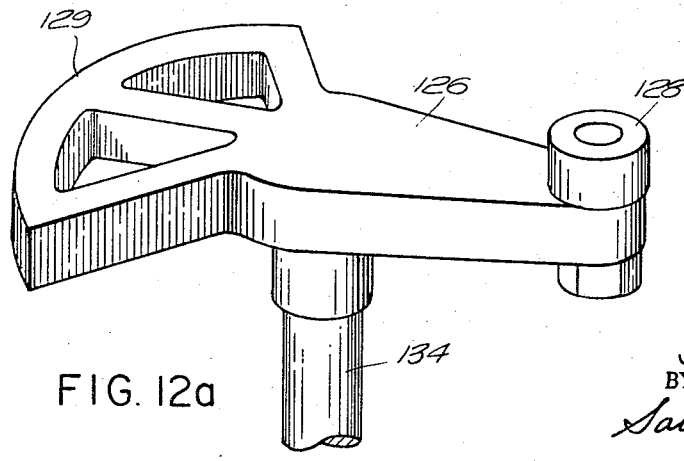
FIG. 12A is a perspective view of the Geneva drive member with the follower roller secured thereto.
Figure 19:
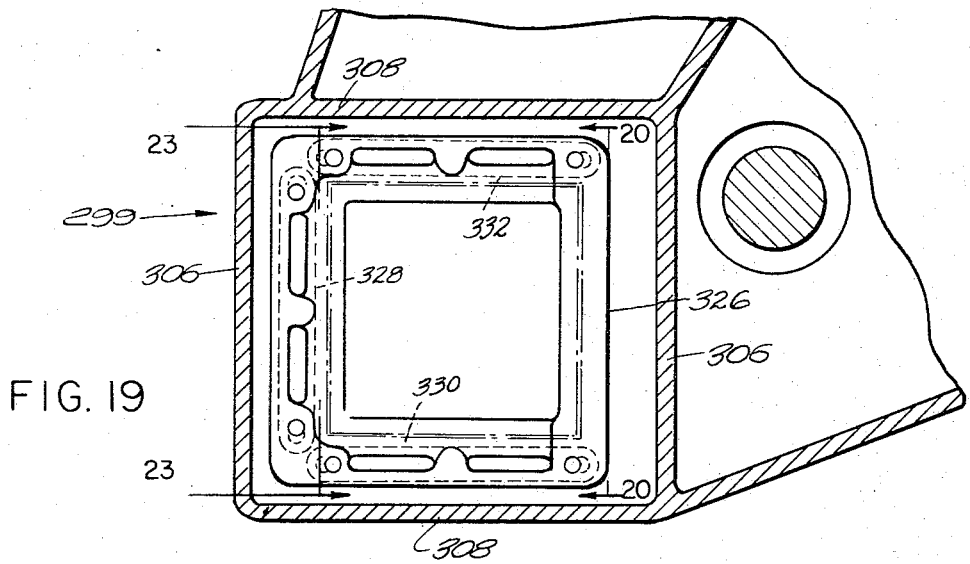
FIG. 19 is a plan view with parts shown in section of the bracket for carrying the heater assembly and the prebreak member on the bottom former table.
Figures 73, 74:
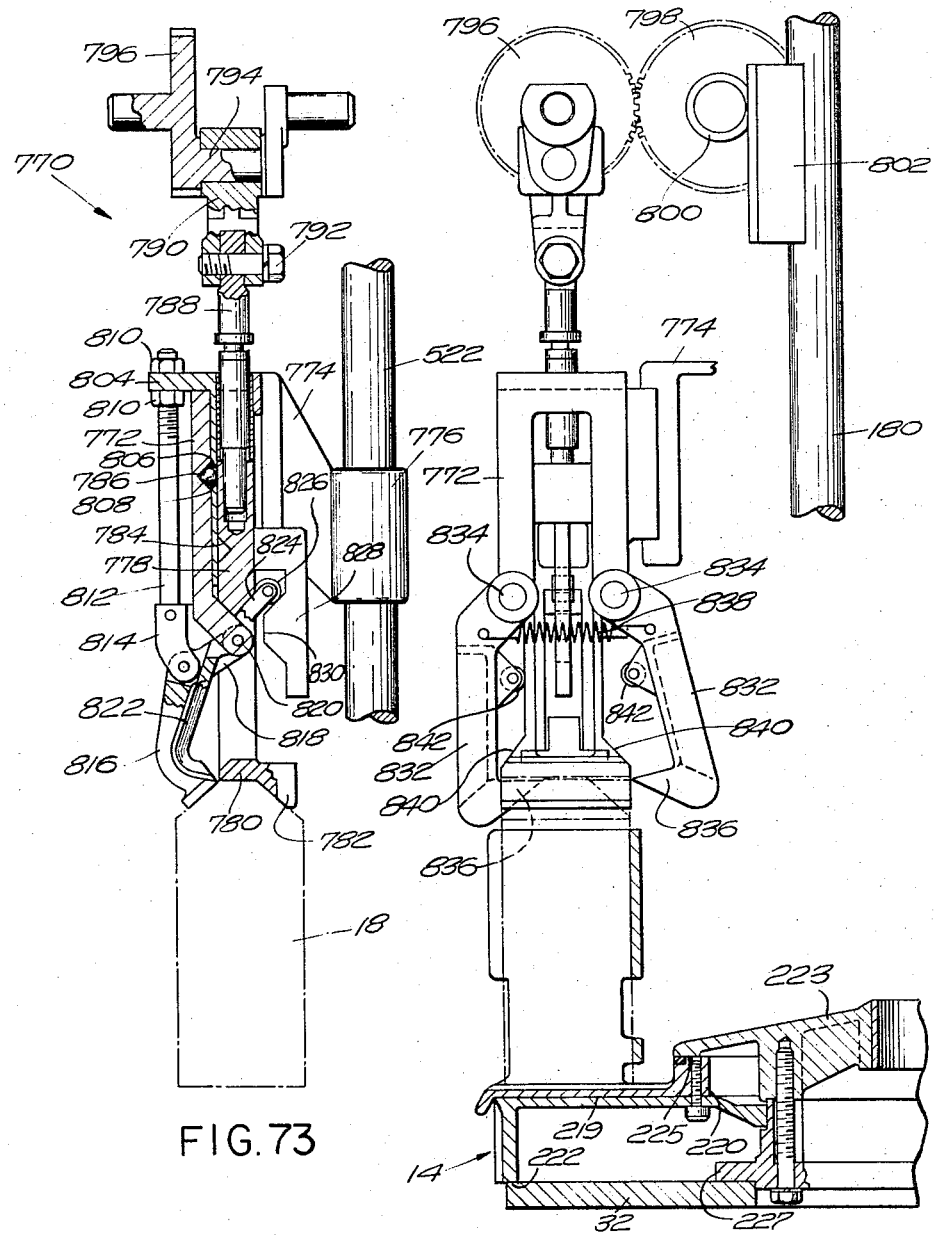
FIG. 73 is a sectional view of the sealing device for the carton top showing the operating mechanism therefor.
FIG. 74 is a side elevational view of the sealing device and operating mechanism therefor illustrated in FIG. 72.

When the carton is indexed from the heat station to the seal station, the top panels of the carton are disposed in the positions as illustrated in FIG. 79. The top panels must now be folded and sealed to form the modified gable top as illustrated in FIG. 82. In order to carry out the folding and sealing of the top panels of the carton, the sealing device generally indicated at 770 in FIG. 73, 74 and 74*a* is provided and includes a housing 772 that is secured to a bracket 774 on which a collar 776 is mounted for securement to the fixed guide rod 522. Slidably mounted within the housing 772 is a seal slide 778 on the lowermost end of which a seal head 780 is formed. The seal head 780 includes a pressure pad 782 that cooperates with the seal head 780 to effect the sealing action of the top panels of the carton during the sealing operation. Formed in the seal slide 778 is a V-shaped notch 784 which, as will be described, is adapted to receive a latch pin 786 therein when the seal slide 778 is located in the uppermost position thereof. Secured to the upper end of the seal slide 778 is a seal slide link 788 that projects outwardly of the housing 772 for securement to a connecting rod 790 by a bolt 792. The connecting rod 790 is mounted for reciprocating movement on a crank 794 that is formed integral with a gear 796. As seen in FIG. 74, the gear 796 engages a gear 798 on the shaft of which a pinion gear 800 is mounted. A rack 802 is engaged with the pinion 800 and is secured to the vertical push rod 180. It is seen that vertical movement of the push rod 180 will rotate the gears 798, 796 and will result in a corresponding vertical movement of the seal slide link 788 and the seal slide 778 secured thereto. The seal head 780 is thus moved downwardly in a timed relation to engage the top panels of the carton after they have been folded to the seal position as will be described below.

In order to properly fold the top panels of the cartons to the position for sealing, a plurality of movable elements are provided that are adapted to be moved in sequence and in accordance with the movement of the seal slide 778. Referring again to FIG. 73, a fold arm slide 804 is shown mounted within the housing 772 between the inner surface of the housing wall and the seal slide 778. An opening 806 that is formed in the fold arm slide for receiving the latch pin 786 therein provides for transferring of the latch pin from the notch 784 formed in the seal slide 778 to a notch 808 formed in the inner surface of the housing wall. Secured to the upper end of the fold arm slide 804 by lock nuts 810 is a vertically extending bolt 812 to the lowermost end of which a link 814 is secured. Secured to the link 814 is a fold arm 816 which includes a projecting portion 818 that is mounted for pivotal movement on the housing at pivot point 820. Also pivotally connected to the housing at pivot point 820 is a fold finger 822 that is provided with an extension 824 on which a follower 826 is mounted. Movement of the fold finger 822 is produced by vertical reciprocation of a cam member 828 on which a cam surface 830 is formed, the cam member 828 being secured to the seal slide 778 for movement therewith.

In order to complete the folding of the top panels on walls B and D and to locate these panels for the sealing thereof anvils 832 are provided, which as seen in FIG. 74 are pivotally secured to the housing 772 at pivot points 834. The anvils 832 have inwardly extending projections 836 formed on the lower ends thereof which are adapted to engage the panels on the walls B and D for the folding thereof. The anvils 832 further define means for holding these panels in fixed position and provide supporting surfaces for the panels that are engaged by the downwardly moving seal head 780. The anvils 832 are normally retained in the closed position thereof by a spring 838 that interconnects the anvils as seen in FIG. 74. In order to move the anvils 832 to the outer pivoted position, cam rollers 842 are secured to the inside edges of the anvils 832 and are engaged by ramps 840 formed on the seal slide 778. As the seal slide 778 moves upwardly, the ramps 840 formed thereon engage the anvil cam rollers 842 to move the anvils to their outer pivoted position. As seen in FIG. 74 the right hand anvil 832 is located in that position it will assume when the corresponding ramp 840 has moved into engagement with the roller 842 secured to the right hand anvil.

When the seal device is located in the position illustrated in FIGS. 73 and 74 a top sealing operation on a carton has just been completed. It will be assumed that such a sealing action has been completed and that the sealing devices is to be actuated for sealing the next carton indexed thereto. With the sealing device located in the position shown in FIG. 73, the push rod 180 is operated by its cam to move upwardly. As the push rod 180 moves up, the rack 802 is driven to rotate the gears 798 and 796 which causes the connecting rod 792 to move the seal slide 778 upwardly. As the seal slide 778 moves up, the ramps 840 formed thereon engage the anvil followers thereby withdrawing and pivoting the anvils 830 to the outer position thereof. During the initial upward movement of the seal slide 778, the fold arm slide 804 is disconnected therefrom and will remain in its lower position as seen in FIG. 73. However as the notch 784 formed in the seal slide 778 moves opposite the latch pin 786, the latch pin is forced through the opening 806 in the fold arm slide and into the notch 784, thereby interconnecting the fold arm slide to the seal slide 778. Continued upward movement of the seal slide 778 carries the fold arm slide 804 therewith, and the fold arm slide and seal slide then move together to the upper inoperative position to complete the removal stroke of the seal slide. At this point the cam 828 has moved upwardly with the seal slide 778, and the fold finger roller 826 is disposed on the lower dwell portion of the cam 828.

The filler table now indexes a carton to the seal station with the top panels disposed in the open prefolded position thereof. As the carton moves to the seal station the leading panel A*b* is engaged and partially folded by the fold finger 822. This position is illustrated in FIG. 80. The push rod 180 is now moved by its cam to begin the downward travel of the seal side 778. As the seal slide 778 moves down the fold arm slide 804 moves therewith to locate the fold arm 816 in engagement with the lead panel A*b* and to hold this panel in the true sealing position thereof. When the fold arm 816 is moved to locate the lead panel A*b* in the true seal position, the fold arm slide 804 has moved to the lower end of its stroke, at which point the latch pin 786 is transferred from the notch 784 to the notch 808 formed in the housing. The seal slide 778 then continues its downward movement while the fold arm slide 804 remains at the lower end of its stroke as illustrated in FIG. 73. As previously described, the fold arm 816 is holding the lead panel A*b* in true sealing position. As the seal slide 778 moves down further, the fold finger 822 is pivoted by movement of the roller 824 onto the cam surface 830. This movement of the fold finger 822 tacks the center panel A*a* into seal position. Continued downward movement of the seal slide 778 causes the anvil cam rollers 842 to be released from the seal slide ramps 840 and the anvils 832 are retracted to the inner position thereof by their interconnecting spring 838. The projecting portions 836 of the anvils then move into contact with panels B*e* and D*e* to collapse these panels together with panels located adjacent thereto wherein the trailing panels C*a*, C*b* are folded into position for sealing. The inner projecting portions 836 of the anvils 832 extend beneath the tabs B*b* and D*b* and thus define back up plates that are adapted to cooperate with the seal head 780 to effect the sealing operation. As the seal head 780 is moved downwardly by the seal slide 778 to the seal position the seal head 780 engages the trailing panel A*a* while the pressure pad 782 engages the adjacent trailing panel A*b* to move these panels into sealing engagement with the other panels of the carton top that have been folded and are being held by the fold arm 816 and anvils 836. Since all of the panels have been heated in predetermined patterns at the critical areas thereon as determined by the engaging surfaces thereof, pressure applied by the seal head 780 and the pressure pad 782, in cooperation with the location of the anvils 832, produce an effective sealing action to seal the carton top as illustrated in FIG. 82.

After the sealing operation, the sealing device 770 is moved upwardly as previously described and the filled and sealed carton is then indexed to the next station. Referring again to FIG. 83, it will be noted that the next station is an idle station and that a further indexing movement of the filter table moves the carton to a date stamp station. At this station a device containing a date stamp is moved downwardly by movement of an appropriate push rod to apply a date to the top center panel of the carton as seen in FIG. 82. Although a date stamp device is not illustrated herein any convenient construction may be utilized as required.

After the date has been applied to the top panel of the carton, the filler table is indexed to the last station which is the unload station.

Referring now to FIG. 75 an unload kicker foot 844 is shown pivotally secured to a collar 845 that is mounted on the guide rod 522. The inner end of the kicker foot 844 is fixed to the push rod 178 for movement thereby. After the carton has been indexed to the unload station, the push rod 178 is vertically shifted to pivot the unload kicker foot 844 to the position illustrated in FIG. 75. The folded and sealed carton located at the unload station is then kicked outwardly of the filler table by a kicker foot and onto an unload conveyor 846 for further handling.

In the withdrawal movement of the work devices from engagement with the cartons at the work stations the cartons may be partially shifted in position. It is therefore necessary to provide some form of a holding device to prevent the cartons from being lifted as the work devices are elevated. As shown in FIGS. 1 and 5 so-called stripping devices are provided and include rubber covered rollers 848 that are mounted on a pivotally mounted arm 850. The arm 850 is fixed to the frame of the machine by a bracket 852 and the rollers 848 are movable with the pivoted arm 850 to permit the carton to pass therebetween. The rollers 840 are further spaced apart sufficiently such that when the carton is located at a station, both of the rollers will contact the outwardly facing wall of the carton. The stripper rolls 848 thus prevent the carton from lifting when a work device such as the prebreak device 338 is removed in an upward direction after a work operation. The pivotal movement of the arm 850 on which the rubber covered rollers 848 are mounted further enables the cartons to be moved in the circular path by the bottom former and filler tables. Although not shown it is understood that the stripping devices will be located at most of the work stations where a work device is moved in a vertical direction.

In some instances it may be desirable to discontinue the operation of a machine if a carton fails to appear at a particular station. Such a control would be desirable at the load and unload stations at the bottom former table 12. In order to stop the operation of the machine any suitable switch such as a micro switch 854 shown at the unload station in FIG. 17 may be provided and may be interconnected in circuit to the motor 34. The micro switch includes a finger 856 that is bent so as to project into the hollow portion 218 of the mandrel if a carton is not located on the mandrel 216. If the carton is received on the mandrel, the wall of the carton will force the finger 856 outwardly to prevent the operation of the micro switch 854 and the machine will continue to operate. If a carton is not received on the mandrel 216, the finger 856 will fall into the hollow portion of the mandrel, actuating the switch 854 and thereby de-energizing the motor 34 to discontinue the operation of the machine.

*Operation*

In the operation of the carton form and fill machine 10, the machine is placed in operation by first loading the supply hopper 16 with cartons in flat folded, inverted and stacked relation. After the motor 34 which defines the power source for the machine, is energized, and the accessory devices for supplying compressed air and vacuum to the unloading and loading devices are actuated the machine is ready to automatically form and fill the cartons. During the operation of the machine, the various push rods for the bottom former table and the filler table will be vertically reciprocated at predetermined intervals and in sequence to operate the work devices that perform the work operations on the cartons at the various stations as the cartons are indexed thereto. The cam for each push rod is programmed so as to reciprocate each push rod in proper sequence for carrying out the various work operations at the work stations.

Referring now to FIG. 83 the carton at the discharge end of the supply hopper 16 is removed therefrom as the load picker arm 236 is moved in an arcuate path by the parallel link construction of the load device 234. The path of movement of the load picker arm 236 is controlled by the configuration of the cam 276 to which the load picker arm drive rod 264 is connected. The suction members 238 of the load picker arm 236 are moved into engagement with the adjacent wall of the carton at the discharge end of the supply hopper 16 and move the carton to an overbent position as illustrated in FIGS. 14 and 16. The overbending of the carton is produced by causing an edge thereof to be retained in contact with the gate 230 as the carton is moved in the arcuate path with the load picker arm 236. The load picker arm 236 is then retracted by the parallel linkage to locate the carton in the erected and square form at the load position. At this point the push member 284 is moved downwardly in response to operation of a piston within the air cylinder 288. The push member 284 engages the upper located edges of the carton and forces the carton through the guide funnel 282 that is located in aligned position with respect to a mandrel 216 disposed at the load station on the bottom former table 12. The carton as it passes through the guide funnel 282 is received on the mandrel 216 in bottom side up or inverted position with the bottom panels of the carton open. The bottom former table 12 is then indexed by the Geneva drive member 126 which is rotated upon actuation of the single revolution key clutch 136. The loaded carton is now indexed on the bottom former table 12 to the next station which as shown in FIG. 83 is an idle station. After a predetermined interval, the bottom former table 12 is indexed to move the carton to the heat station. At this station the heater manifold 324 mounted on the work housing 300 is moved downwardly by the center push rod 110 to locate the heater manifold sections in enveloping relation around the upwardly extending bottom panels of the carton. Heated air is applied to the plastic coated bottom panels at the critical areas and in predetermined patterns. After the work housing 300 is withdrawn by the push rod 110, the bottom former table 12 is once again indexed to move the carton to the pre break station where a pre break device 338 that is also secured to the work housing 300 is moved downwardly therewith to pre fold the bottom panels of the carton along their score lines prior to the sealing thereof. After the work housing 300 is again withdrawn, a further indexing movement of the bottom former table 12 carries the carton through the seal plow 356 at the seal station, wherein the pre folded bottom panels are closed and the carton is thereafter moved beneath the seal head 352. The seal head 352 which is responsive to movement of the center push rod 110 is moved downwardly by a seal slide 360 to engage the heated and closed bottom panels. The heated bottom panels which are still tacky are pressed into firm engagement with each other on the top surface of the mandrel and are adhered to form a permanent seal. After completion of the sealing of the bottom panels of the cartons and withdrawal of the sealing device, the bottom former table 12 is indexed to locate the bottom sealed carton at the bottom former table unload station. As the carton is indexed to the unload station an unload picker arm 404 that is rotatably mounted on the vertical cam shaft 74 is rotated into contact with the adjacent wall of the carton to be unloaded. Simultaneously with this movement, the pusher member 284 has been moved downwardly in a loading operation. Since the load pusher member 284 is interconnected to the unload picker arm 404 through the interconnecting chain 298, the unload picker arm 404 is lifted upwardly with the unload carrier 390 to remove the carton from the mandrel 216 that is located at the unload station. The suction element 406 on the unload picker arm 404 firmly retains the unloaded carton in engagement therewith and as the unload picker arm 404 is rotated in a circular path as seen in FIG. 36, the carton is moved to a position adjacent to the turnover and orienting funnel 432. When the unload carton is located adjacent to the funnel 432, the vacuum within the suction member 406 is released and simultaneously therewith an air blast from the nozzles 468 located in the pressure manifold 466 is directed into contact with the top of the carton as seen in FIG. 37. The carton is then flipped to the position shown in FIG. 43 and enters the opening 456 in the funnel 432 so as to be inverted; the carton is then directed by the inclined bottom wall 464 of the funnel to the right side up and oriented position as illustrated in FIG. 44. At this point the pusher device 472 which is actuated by the push rod 178 is moved forwardly to load the carton on to the load station at the filler table and into a chamber 221 disposed at the load station As the pusher device 472 moves forwardly, the side guides 492 are moved into guiding position properly aligning the carton as it is transversely moved by the pusher device 472 into the chamber 221 at the load station. The carton is then positioned at the load station on the filler table 14 which is drivingly interconnected to the bottom former table 12, the filler table 14 being responsive to the movement of the bottom former table to index the carton to the tab-break station.

At the tab-break station the work bracket 508 is moved downwardly in response to movement of the push rod 176 to move the tab-break device 506 therewith. The opposed arms 530 of the tab-break device strikes the tabs Bb and Db of the carton to force them to an outer position in the preliminary step of the pre folding the top panels of the carton. After the tab-break device 506 is withdrawn with the work bracket 508 the filler table is indexed to move the carton from the tab-break station to the pre-break station. At the pre-break station the inner mandrel 536 is moved downwardly within the carton and the outer die member is moved downwardly to engage the top panels of the carton to pre-fold or pre-break these panels along their score lines. After the pre-breaking operation the inner mandrel and outer die are retracted and the filler table 14 is indexed to move the carton to the re-strike station. At the re-strike station the restrike device 580 which is also secured to the work bracket 508 is moved downwardly therewith to again cause the bottom panels of the carton to be engaged for the re-folding thereof along their score lines. With the top panels of the carton pre-folded and open, the filler table 14 is indexed to move the carton to the next station which is the sanitizing station. At the sanitizing station a sanitizing tube in the form of an ultra-violet tube is inserted into the carton for sanitizing the interior thereof prior to the filling of the carton with a liquid.

On completion of the sanitizing operation, the filler table 14 is indexed to the fill station at which the filler device 600 is lowered to locate the filler tube 604 of the filler device within the carton. The valves 625 and 638 are then actuated to locate the filler device 600 in operative position for filling the carton. The operating rod 698 which is controlled by cam 702 moves the rack member 658 to shift the bar cams 650 and 664 for controlling the movement of the valve operators 640 and 627. As the push rods 176 and 178 are moved the filler device operating arms 712 and 720 are pivotally operated to vertically shift the guide rods 608 and 622. The filler device sections are then moved in their pre-determined sequence to carry out the filling operation. If a carton fails to arrive at the fill station the carton detector device is actuated to prevent the bar cams from being vertically shifted. This safety device thus prevents operation of the filler device if for any reason a carton is not indexed to the fill station.

After the filling of the carton, the filler table 14 is indexed to move the carton to the next station which is idle. After a pre-determined interval the filler table 14 is again indexed to locate the carton at the heat station at which the critical areas on the top panels of the carton are heated in predetermined patterns. Upon completion of the heating cycle, the filler table 14 is indexed and the carton is moved to the seal station at which the top panels of the carton are folded and sealed by the sealing device 770. After the sealing operation, the filler table 14 is indexed to the next station which is idle. Indexing of the filler table 14 then moves the carton to a date stamp station where a date may be applied to the top panel of the carton. Further indexing of the table 14 moves the carton to the unload station where the unload kicker 844 moves the filled and sealed carton onto an unload conveyor 846 for further handling.

It is understood that during the sequence of operation as just described, additional cartons are being loaded at the load station on the bottom former table 12 and unloaded at the unload station thereof. The cartons are further being loaded at the unload station on the filler table 14 and are simultaneously being unloaded at the unload station of the filler table. Thus a carton is located at each of the stations on both tables and the operations of the work devices as described are being simultaneously performed on the individual cartons located at these work stations.

While there is shown and described herein certain specific structure embodying the invention it will be manifested to those skilled in the art that various modifications and re-arrangements of the parts may be made without departing from the spirit and scope of the underlying inventive concept and that the same is not limited to the particular forms herein shown and described except insofar as indicated by the scope of the appended claims.

What is claimed is:

1. An apparatus for automatically processing a plurality of containers from flat folded tube form to an erected form, wherein the containers are filled with a liquid and sealed, the combination comprising a first circular table mounted for rotation, a second circular rotatably mounted table operatively interconnected to said first table and driven thereby, means for intermittently rotating said first table, said second table being indexed at intervals in accordance with the movement of said first table, means for successively erecting said containers from their flat folded to open-ended form and for successively feeding the erected containers to an unloading station on said first table in bottom side up position, a plurality of work stations located in spaced relation at said first table, means located at said work stations and responsive to the means for rotating said first table for successively folding, heating and sealing the bottom sides of said containers, means for transferring the bottom sealed containers to a load station at said second table in top side up position, a plurality of work stations located in spaced relation at said second table, means for successively pre-folding the tops of said containers, filling said containers with a liquid, heating the container tops and sealing the tops of the filled containers and means for unloading the filled and sealed containers from said second table.

2. An apparatus for forming and filling a plurality of cartons that are erected from flat folded form, the combination comprising a base, a first table mounted for rotation on said base, a second table mounted for rotation on said base interconnected to said first table and driven thereby, said first table including a plurality of spaced work stations, a vertical push rod extending through said first table and being mounted for reciprocation therein, a first cam operatively interconnected to said push rod, a vertical cam shaft located adjacent said first table, a drive mechanism connected to a source of power and and reciprocated therewith in accordance with the continuously driving said vertical push rod and said vertical cam shaft for the simultaneous operation thereof, a plurality of work devices interconnected to said push rod and reciprocated therewith in accordance with the configuration of said first cam, each of said work devices being adapted to perform a work operation on bottom panels of said cartons, means associated with said first table and said drive mechanism for periodically indexing said first table so that said cartons are sequentially transferred to said work stations, wherein the bottom panels of said cartons are folded and sealed, a horizontal cam shaft operatively interconnected to said drive mechanism for rotation thereby, a plurality of cams mounted on said horizontal cam shaft, a plurality of vertical rods projecting through said second table, each of said vertical rods being interconnected to one of said last-named cams and reciprocated thereby, and a plurality of work devices mounted on said vertical rods for vertical reciprocation in a predetermined sequence, said latter named work devices being reciprocated by said vertical rods for sequentially performing a bending operation on the top panels of said cartons, and for filling said cartons with a liquid and for forming and sealing said filled cartons, said second table being indexed by said first table to periodically move said cartons to the work stations at said second table.

3. An apparatus for forming and filling cartons with a liquid, wherein the cartons are erected from flat folded tubular form, a base, a pair of circular tables mounted for rotation on said base, both of said tables including means for retaining a plurality of cartons thereon in spaced angular relation, a drive assembly, means responsive to operation of said drive assembly for angularly indexing said first table at predetermined intervals, wherein the cartons on said first table are periodically and successively advanced to a plurality of stations located at said first table, means for drivingly interconnecting said first table to said second table, wherein indexing of said first table produces a corresponding angular indexing movement of said second table in accordance with the drive ratio between said tables to periodically and successively advance the cartons retained on said second table to a plurality of stations located at said second table, said second table having a greater number of work stations located thereat than said first table, and the drive ratio between said tables being such that the angular distance that said second table travels during an indexing operation is less than the angular distance traveled by said first table, the angular travel of both said tables during an indexing operation being in accordance with the number of work stations thereat.

4. An apparatus as set forth in claim 3, a plurality of work devices located at the work stations on said tables, each of said tables including a plurality of said work devices that are disposed interiorly of the periphery thereof, so that the peripheries of said tables and the adjacent areas thereto are unencumbered, said work devices being carried by said tables being mounted for vertical reciprocation in accordance with the indexing movement of said tables to perform a working operation on said cartons.

5. An apparatus as set forth in claim 4, the work devices at said first table including means for folding the bottoms of said cartons and means for sealing the bottoms of said cartons, the work devices at said second table including means for prefolding the carton tops, means for filling said cartons with a liquid, means for sealing said carton tops and means for unloading the filled and sealed cartons from an unload station at said second table.

6. An apparatus as set forth in claim 5, means for automatically loading a carton on said first table at a load station, means for unloading the cartons from an unload station at said first table, said loading and unloading means being operatively interconnected so that loading of a carton at said load station is carried out simultaneously with the unloading of a carton at said unload station.

7. An apparatus as set forth in claim 3, said drive assembly being connected to a source of power and including a clutch device, the input of which is the direct drive of said drive mechanism, the output of said clutch device including a Geneva drive member that operatively engages the underside of said first table, the underside of said first table having a Geneva configuration for accommodating said Geneva drive member and being periodically movable by said Geneva drive member upon rotation thereof to index the cartons on said first table to the various work stations located thereat.

8. An apparatus as set forth in claim 7, a cam drivingly connected to the output of said drive assembly, said clutch device being responsive to rotation of said cam for periodically interconnecting said Geneva drive member to the direct drive of said drive assembly, wherein said first table is indexed at preselected intervals.

9. An apparatus as set forth in claim 3, said drive assembly being connected to a source of power and including an input shaft, a horizontal cam shaft drivingly interconnected to said input shaft and continuously driven thereby, a main operating cam for said first table connected to said horizontal cam shaft, a plurality of drive cams for work devices associated with said second table mounted on said horizontal cam shaft and continuously driven thereby, a vertical cam shaft being interconnected to said horizontal cam shaft and driven thereby, said indexing means, said horizontal cam shaft and said vertical cam shaft all deriving their power from said drive assembly, said horizontal cam shaft and vertical cam shaft being interconnected to work devices located at the various work stations associated with said tables for causing said work devices to perform a predetermined work operation on the cartons located at said work stations.

10. An apparatus as set forth in claim 3, means for retaining said cartons in a loading area adjacent said first table in flat-folded bottom-side-up position, means responsive to operation of said drive assembly for successively withdrawing the flat folded cartons from said retaining means and for erecting said carton in open-ended form, pusher means for successively moving the open-ended erected cartons downwardly from their withdrawn position onto said first table at a load station thereon, and means for guiding said open-ended erected cartons onto said load station as they are moved downwardly by said pusher means.

11. An apparatus as set forth in claim 10, said load station on said first table including an upstanding mandrel on which an open-ended erected carton is inserted, the bottom-side up erected carton including opposed upstanding panels, said pusher means including opposed ears for engaging said opposed panels for moving the carton in the withdrawn position downwardly, said guide means being shaped and proportioned for receiving said withdrawn carton and pusher means therein and including opposed grooves for accommodating said ears as said pusher means travels downwardly therethrough during the loading movement thereof and when the withdrawn carton is inserted on the mandrel at said load station.

12. An apparatus as set forth in claim 3, a plurality of mandrels mounted on said first table in spaced apart angular position for receiving said cartons in bottom side up position thereon, a plurality of work devices located at the work stations associated with said first table for heating, folding and sealing the bottom panels of said cartons, said work devices being located interiorly of the periphery of said first table and being generally elevated with respect to said first table, said first table being indexed with respect to said work devices to successively transfer a mandrel and carton thereon under each of said work devices.

13. An apparatus as set forth in claim 12, one of said work devices comprising a heater assembly that is mounted for vertical reciprocation in timed relation with respect to the indexing movement of said first table, said heater assembly including a heater manifold, a heater unit and a tubular conduit communicating with said heater manifold and heater unit, said heater manifold being defined by a plurality of manifold sections in which nozzle openings are formed, said manifold sections being arranged to envelope the bottom panels of the carton located under the heater assembly, and said nozzle openings having a preselected pattern, wherein heated air is ejected through said nozzle openings onto predetermined areas of the surfaces of the bottom panels of the carton that is located under the heater assembly, and means responsive to operation of said drive assembly for vertically reciprocating said heater assembly.

14. An apparatus as set forth in claim 12, one of said work devices comprising a bottom panel pre-break assembly, that is mounted for vertical reciprocation, said pre-break assembly including a die having inclined walls that are adapted to engage selected bottom panels of the cartons and opposed pre-break fingers for engaging other selected bottom panels of said cartons, and means responsive to operation of said drive assembly for vertically reciprocating said pre-break assembly in accordance with the indexing movement of said first table to periodically move said pre-break assembly downwardly into engagement with the bottom panels of said cartons that are successively moved by said first table thereunder, wherein said bottom panels are bent along the score lines thereof to a pre-folding position prior to their sealing.

15. An apparatus as set forth in claim 12, said work devices including means for heating the bottom panels of said cartons and means for bending the heated bottom panels along their score lines in a pre-break operation, said work devices further including a folding and sealing assembly for said carton bottom panels, said folding and sealing assembly being located on the discharge side of said bottom panel bending means and including a panel forming plow and a vertically movable seal head that is located adjacent said plow on the discharge side thereof, said plow having runners formed thereunder that are shaped to fold the bent bottom panels of said cartons to a closed position, and means for moving said seal head downwardly in accordance with the indexing movement of said first table, wherein said seal head firmly engages the heated and folded bottom panels of said cartons to seal said bottom panels in liquid sealed relation.

16. An apparatus as set forth in claim 3, the peripheral surfaces of said tables having gear teeth formed thereon, the means for drivingly interconnecting said tables including a first gear engaging the peripheral surface of said first table, a second gear engaging the peripheral surface of said second table, and a drive connection between said first and second gears, wherein rotation of said first table produces rotation of said second table in accordance with the ratio of said first gear with respect to said second gear.

17. In apparatus as set forth in claim 16, the ratio between said first gear and said second gear being 2:1, wherein an angular indexing movement of 60° by said first table produces a corresponding angular indexing movement of 30° by said second table.

18. In apparatus as set forth in claim 17, the stations at said first table being angularly spaced apart at 60° intervals and the stations at said second table being angularly spaced apart at 30° intervals.

19. In apparatus as set forth in claim 16, means for adjusting said tables so that said tables are in oriented relation with respect to the stations located thereat, said adjusting means including spaced idler members that engage said drive connection and that are movable relative to each other and means for moving said idler members relative to each other and in a direction that is generally transverse to said drive connection wherein said drive connection is moved that amount necessary to orient the tables with respect to each other.

20. In apparatus as set forth in claim 3, means for successively loading said flat folded cartons in open-end erected form onto said first table, means located at said first table for closing the bottom ends of said cartons in sealed relation, means interconnected to said loading means for simultaneously unloading a carton that is sealed at the bottom end thereof from said first table, and means for transferring the cartons that are unloaded from said first table onto a loading station at said second table.

21. In apparatus as set forth in claim 20 said unloading means including a picker arm that has a suction member attached thereto for engagement with a wall of the bottom sealed carton to be unloaded from an unload station at said first table, means for rotating said picker arm to move said suction member against carton to be unloaded, wherein said suction member firmly engages the carton to be unloaded, an unload lift member directly connected to the loading means on said first table and responsive to movement thereof for elevating the carton at said unload station, said picker arm thereafter moving said unloaded carton in a circular path to said transferring means.

22. In apparatus as set forth in claim 21, means interconnected to said rotating means and to said picker arm for returning said picker arm to in-phase rotation with the rotating means after the picker arm has engaged the carton at the unload station and lifted it upwardly therewith.

23. In apparatus as set forth in claim 21, means located adjacent said transferring means for directing the unloaded carton thereto after the unloaded carton has been released by the suction member on said picker arm, means responsive to said drive assembly and located adjacent said directing means for directing a blast of air under pressure against the unloaded carton, and means responsive to said drive assembly and operated substantially simultaneously with the air directing means for releasing the suction member from engagement with the unloaded carton, wherein the unloaded carton is deposited in said directing means for movement to said transferring means.

24. In apparatus as set forth in claim 20, a directing funnel located adjacent said transferring means for receiving the unloaded cartons therein, the walls of said directing funnel being shaped and positioned for orienting said cartons and for directing said cartons in oriented right side up position to said transferring means.

25. In apparatus as set forth in claim 20, said transferring means including a pusher device that is reciprocated at predetermined intervals and in accordance with the indexing of said tables, and guide means for properly locating the unloaded carton forwardly of said pusher device and for guiding said unloaded carton onto the loading station at said second table when said pusher device is reciprocated during the loading operation thereof.

26. In apparatus as set forth in claim 20 means for transferring the cartons that are unloaded from said first table to a loading station at said second table in right side up oriented position, said stations at said second table including means for pre-folding the panels formed on the top of said cartons along the score lines thereof, means for filling said cartons with a liquid, means for heating the pre-folded top panels, means for sealing said panels to seal the filled cartons, and means for unloading the filled and sealed cartons from said second table.

27. In apparatus as set forth in claim 20, said drive assembly including a cam shaft on which a plurality of cams are mounted in spaced relation generally beneath said second table, a plurality of vertical push rods projecting through said table and being operatively connected to said cams for vertical reciprocation thereby in timed relation with respect to the indexing movement of said tables, and a plurality of work devices secured to said push rods at said stations above said second table for movement with said push rods, said work devices being operative to perform a work operation with respect to said cartons as the cartons are successively indexed to said stations by said second table, and being located interiorly of the periphery of said second table.

28. In apparatus as set forth in claim 27, one of said work devices including means for engaging side tabs that are joined to the top panels of said cartons for overbending said side tabs, said tab engaging means being operatively connected to one of said push rods, another of said work devices including means for engaging the top panels of said cartons for prefolding said top panels, said panel engaging means being operatively connected to said one push rod for reciprocation therewith, a liquid dispensing valve defining one of said work devices and being operatively interconnected to two of said vertical push rods for operation thereby, a top panel folding and sealing device defining another of said work devices and being interconnected to one of said push rods for operation thereby at predetermined intervals and in accordance with the indexing movement of said second table.

29. In apparatus for forming and filling cartons with a liquid, wherein the cartons are erected from flat folded form, a base, a first table mounted for rotation on said base, means on said first table for retaining a plurality of cartons therein bottom side up spaced angular relation, means for rotatably indexing said first table at predetermined intervals for periodically and successively advancing said cartons to a plurality of stations located at spaced intervals at said first table, wherein panels located on the bottom of each carton are heated, folded and sealed to seal the bottom of each carton, a second table rotatably mounted on said base adjacent said first table and including means for retaining a plurality of cartons thereon in right side up spaced angular relation, said second table being indexed in response to the indexing movement of said first table to successively and periodically advance said cartons thereon to a plurality of stations located at spaced intervals at said second table, wherein the tops of said cartons are pre-folded, said cartons are filled with a liquid and said carton tops are thereafter sealed.

30. In apparatus as set forth in claim 29, means for drivingly interconnecting said first table to said second table, wherein the indexing movement of said first table results in a corresponding movement of said second table and in accordance with the ratio of the drive between said tables.

31. In apparatus as set forth in claim 30, said drivingly interconnecting means including a gear operatively connected to and driven by said first table, a gear operatively engaging said second table, and a connecting drive element between said gears, the ratio of said gears with respect to each other determining the angular rotation of said second table with respect to said first table during the indexing movement thereof.

32. In apparatus as set forth in claim 29, said means for rotatably indexing said first table including a drive assembly, a power source operatively connected to said drive assembly and supplying power thereto, said drive assembly defining a self-contained unit that is adapted to be intermittently connected to said first table for producing the indexing movement thereof, said drive assembly further including a power output shaft on one end of which a cam is mounted, a vertical push rod operatively engaging said cam and having a plurality of work devices operatively connected thereto and responsive to vertical movement thereof, said work devices being located at selected stations at said first table and being adapted to perform a work operation on the bottom ends of the cartons that are carried by said first table.

33. In apparatus as set forth in claim 32, a plurality of operating cams connected to said output shaft adjacent the other end thereof and being located in the area of said second table, a plurality of vertical push rods operatively connected to said operating cams and vertically reciprocated at predetermined intervals thereby, and a plurality of work devices operatively connected to said latter named push rods and being movable therewith to perform a selected work operation on the top ends of said cartons that are carried by said second table.

34. In apparatus for automatically processing a plurality of open-ended flat folded cartons to an erected and sealed form, wherein the cartons are filled with a liquid, a base, a first table mounted for rotary movement on said base, a second table mounted for rotary movement on said base and being rotatable in response to the rotary movement of said first table, means for successively loading a plurality of said cartons in bottom-side-up position on said first table, means for indexing said first table at predetermined in tervals to sequentially move the cartons on said first table to a plurality of work stations located at said first table, wherein the bottom ends of said cartons are closed and sealed, means for unloading the bottom sealed cartons from said first table, means for orienting the unloaded cartons to right side up position, means for transferring the oriented cartons onto said second table, wherein said cartons are sequentially moved in accordance with the movement of said second table to a plurality of work stations for pre-folding the top ends of said cartons, filling said cartons with a liquid and sealing the top ends thereof, and means for unloading the filled and sealed cartons from said second table.

35. In apparatus as set forth in claim 34, said loading means and said unloading means at said first table being operatively interconnected, wherein a carton is unloaded from said first table simultaneously with the loading of a carton thereon.

36. In apparatus as set forth in claim 34, said loading means including a suction device that is operative to engage a flat folded carton and move it to an elevated erected open end position, a pusher member for moving said elevated erected open end carton downwardly onto said first table, means for guiding said carton as it is moved downwardly by said pusher member, and a plurality of upstanding mandrels on said first table, each of which receives a carton thereon in bottom side up position as the carton is moved downwardly by said pusher member.

37. In apparatus as set forth in claim 36, a load picker arm carrying said suction device and being pivotally movable in timed relation with respect to the indexing movement of said first table to move said suction device from an inoperative position into engagement with a flat folded carton, means for restraining movement of an edge of said flat folded carton when said suction device engages a wall thereof, wherein continued movement of said suction device by said load picker arm causes said flat folded carton to be overbent in erected open end form, said load picker arm being operative to return said suction device and carton engaged thereby to the load position in alignment beneath said pusher member.

38. In apparatus as set forth in claim 36, a piston located within a cylinder and being operatively connected to said pusher member for producing the downward movement thereof, said pusher member including opposed ears for engaging the upper edges of the bottom ends of the elevated and erected open end cartons, said guide means receiving said cartons therein for successively guiding them onto the mandrels on said first table, said guide means including opposed grooves for receiving the ears on said pusher member as said pusher member moves a carton through said guide means, and said mandrels being sequentially indexed under said guide means in alignment therewith by the indexing movement of said first table.

39. In apparatus as set forth in claim 34, said unloading means including an unload picker arm that is continuously rotated and that includes a suction device for engaging the wall of a bottom sealed carton, means interconnecting said unload picker arm to said loading means for simultaneously lifting said unload picker arm and the carton engaged by the suction device thereof as a carton is loaded onto said first table, said unload picker arm thereafter carrying the unloaded carton to a discharge position, said suction device being operative to release the unloaded carton at the discharge position, and means for directing the unloaded carton onto the orienting means that is located at the discharge position, wherein the unloaded carton is reversed in position and moved in oriented relation to said transfer means for transfer onto said second table.

40. In apparatus as set forth in claim 39, said orienting means being defined by a funnel member that includes an opening located adjacent said discharge position for receiving the unloaded carton therein, said directing means including a manifold having a nozzle formed therein, through which air under pressure is directed for engaging said carton at the unload position, the expulsion of air under pressure from said directing means being timed to correspond with the release of the unload picker suction device from engagement with the unloaded carton at said discharge position.

41. In apparatus as set forth in claim 34, a drive assembly mounted on said base and operatively connected to a source of power, means for intermittently connecting said drive assembly to said indexing means for indexing said first table, a vertical push rod extending through said first table and operable by said drive assembly, a plurality of work devices operatively connected to said push rod and movable therewith for performing a work operation on the bottom ends of said cartons located at the work stations on said first table, said work devices being located interiorly of the periphery of said first table.

42. In apparatus as set forth in claim 41, said work stations at said first table including a heat station, at which the panels at the bottom ends of said cartons are heated, a prefold station, at which the panels at the bottom ends of the cartons are prefolded to break their score lines, and a seal station, at which the heated and prefolded bottom panels are sealed, a bracket secured to said vertical push rod for movement therewith and carrying the work devices for said heat and prefold stations thereon, said work devices being operative to simultaneously perform selected work operations at said heat, prefold and seal stations on individual cartons located thereat.

43. In apparatus as set forth in claim 42, the work device at said heat station including a heating unit and a heater manifold communicating with said heating unit and receiving heated air therefrom, said heater manifold including outer sections and inner sections spaced from said outer sections, the spaces between said sections providing for receiving the bottom panels of a carton therein, said inner and outer sections having nozzle openings formed therein at selected locations to define a pattern of predetermined configuration, the nozzle openings directing the heated air onto selected surfaces of the bottom panels of a carton at the heat station and in accordance with the predetermined pattern defined by said nozzle openings, wherein only the necessary and critical areas of the bottom panels are heated for sealing.

44. In apparatus as set forth in claim 42, the work device at said prefold station being defined by a fold die that includes fixed inclined walls and fixed, opposed prefold fingers joined to said inclined walls at the apex thereof, said fingers depending below the lowermost edges of said inclined walls and initially striking selected panels on the bottom end of the carton at the prefold station to cause the bottom panels to begin to bend on their score lines, said inclined walls engaging inclined surfaces of selected panels to complete the prefold operation.

45. In apparatus as set forth in claim 42, the work device at said seal station including a fold plow and a vertically movable seal head that is operatively connected to said vertical push rod and movable in response to vertical movement thereof, said fold plow being located on the entry side of said seal head and including interior runners that are shaped and proportioned for closing the prefolded and heated panels of the cartons that are moved to the seal station whereupon the heated and closed bottom panels are sealed by the seal head that is moved into contact therewith by said vertical push rod.

46. In apparatus as set forth in claim 34, a drive assembly mounted on said base and operatively connected to a source of power, said drive assembly including a vertical output shaft and a horizontal output shaft operatively interconnected to said vertical output shaft, said first table having a plurality of equally spaced radially extending slots and arcuate grooves formed on the underside thereof to define a Geneva wheel, a Geneva drive member having an arcuate locking portion formed on one end thereof and a follower joined to the other end thereof, the arcuate locking portion of said follower being successively received in said arcuate grooves for locking said first table in fixed position after each indexing movement thereof.

47. In apparatus as set forth in claim 46, a clutch device for periodically connecting said vertical shaft to said Geneva drive member, and a cam mounted on one end of said horizontal output shaft, said clutch device being actuated at predetermined intervals by rotation of said cam to periodically interengage said Geneva drive member to said vertical shaft, wherein said Geneva drive member is periodically rotated one revolution to move said follower into a slot in said table for causing limited indexing movement thereof as said Geneva drive member and said table are interlocked through the interaction of said follower and the slot in which the follower is received, the indexing movement of said table being limited by removal of said follower from the slot in which it is received and by movement of the arcuate locking portion of said follower into engagement with an arcuate groove as said Geneva drive member is rotated by said vertical shaft through said clutch device.

48. In apparatus as set forth in claim 34, a drive assembly mounted on said base and operatively connected to a source of power, said drive assembly including a vertical output shaft and a horizontal output shaft operatively interconnected to said vertical output shaft, means for periodically interconnecting said indexing means to said vertical output shaft to produce the indexing movement of said first table, cam means mounted on said horizontal output shaft, a vertical push rod extending through said first table and having a plurality of work devices operatively connected thereto at selected work stations, said push rod being responsive to rotation of said cam means for moving said work devices vertically for carrying out a working operation on the bottom ends of said cartons, a vertical cam shaft operatively connected to said horizontal output shaft and rotated thereby, said vertical cam shaft having a plurality of cams mounted thereon at least one of which controls movement of said loading means, and said unloading means being responsive to rotation of said vertical cam shaft for carrying out the unloading operation.

49. In apparatus as set forth in claim 48, said horizontal cam shaft having a plurality of cams mounted thereon, each of which is interconnected to a vertical push rod, said last named push rods having work devices interconnected thereto for vertical reciprocation thereof, said last named push rods being vertically movable at predetermined intervals by their cams to move work devices operatively connected thereto in a vertical direction to carry out a selected operation on the cartons located on said second table at the corresponding work stations.

50. In apparatus as set forth in claim 48, said transferring means being operatively interconnected to one of the push rods at said second table and responsive to vertical movement thereof for being movable in a linear direction toward the periphery of said second table from a point remote therefrom, wherein said oriented cartons are transferred onto said second table.

51. In apparatus as set forth in claim 34, a drive assembly mounted on said base and operatively connected to a source of power, said drive assembly including a vertical output shaft and a horizontal output shaft operatively interconnected to said vertical output shaft, means for periodically interconnecting said indexing means to said vertical output shaft to produce the indexing movement of said first table, a vertical cam shaft operatively connected to said horizontal drive shaft and driven thereby, cam means mounted on said vertical cam shaft and rotatable therewith, said loading means being responsive to rotation of said cam means for carrying out the loading operation.

52. In apparatus as set forth in claim 51, means operatively interconnecting said unloading means to said vertical cam shaft, wherein said unloading means is responsive to rotation of said vertical cam shaft for engaging a carton for the unloading thereof from said first table, said unloading means being operatively interconnected to said loading means and operative therewith to lift said carton to be unloaded from said first table for movement to a discharge position.

53. In apparatus as set forth in claim 34, a drive assembly mounted on said base and operatively connected to a source of power, means for periodically connecting said drive assembly to said indexing means for indexing said first table, means for drivingly connecting said first table to said second table, wherein the indexing movement of said first table results in a corresponding indexing movement of said second table.

54. In apparatus as set forth in claim 34, a drive assembly mounted on said base and operatively connected to a source of power, said drive assembly including a horizontal output shaft on which a plurality of cams are mounted, a plurality of vertical push rods operatively connected to said cams for vertical reciprocating movement and extending through said second table, said vertical push rods having work devices operatively connected thereto and being movable therewith, said work devices being located at selected work stations for performing a selected work operation on said cartons as the cartons are indexed to the work stations at said second table.

55. In apparatus as set forth in claim 54, the work stations at said second table including a tab-fold station, at which tabs on the top ends of said cartons are folded outwardly, a prefold station, at which panels at the top ends of said cartons are prefolded along their score lines, a restrike station, at which the prefolded panels are restruck to again prefold them along their score lines, a liquid filling station at which the cartons are filled with a liquid, a heat station, at which the top panels of the cartons are heated at critical areas, a seal station, at which the heated top panels of the cartons are sealed, and an unload station, at which the filled and sealed cartons are discharged from said second table.

56. In apparatus as set forth in claim 55, a bracket secured to one of said vertical push rods and vertically movable therewith, said bracket carrying the work devices for said tab fold, prefold and restrike stations thereon that are operative to simultaneously perform selected work operations on individual cartons at the latter named work stations.

57. In apparatus as set forth in claim 56, the work device at said tab fold station including an anvil defined by opposed arms on the undersurface of which inclined surfaces are formed, said arms being proportioned for engaging opposed tabs formed on the top ends of said cartons and for bending them outwardly along their score lines, as said anvil is moved downwardly with said bracket during the tab fold operation.

58. In apparatus as set forth in claim 56, the work device at said prefold station including an outer die that is fixed to said bracket for movement therewith and an inner mandrel movable relative to said outer die, said outer die including opposed fingers for striking selected panels at the top of said cartons for bending the panels on their score lines, said inner die further including opposed walls having inner inclined marginal surfaces 90° removed from said fingers for striking other selected surfaces on the top panels of said cartons for bending these panels along their score lines, means for initially moving said inner mandrel interiorly of a carton located at said prefold station, wherein said inner mandrel cooperates wtih said outer die to engage the top panels of said cartons during the prefolding operation.

59. In apparatus as set forth in claim 56, the work device at said restrike station including a die that is formed with opposed inclined marginal surfaces, said inclined marginal surfaces engaging selected surfaces of the top panels of said cartons at said restrike station for prefolding the panels to rebend them along their score lines prior to the filling of the cartons with a liquid and the sealing of the top ends thereof.

60. In apparatus as set forth in claim 55, the means for unloading the filled and sealed cartons being located at the second table unload station and including a kicker foot that is connected to one of said push rods for pivotal movement upon vertical movement of the push rod connected thereto, said kicker foot being pivoted in accordance with the indexing movement of said second table to push a carton outwardly of the unload station thereat.

61. In apparatus as set forth in claim 34, a liquid dispensing device located at the station for filling the cartons with a liquid, said liquid dispensing device including upper and lower sections that are movable with respect to each other during the filling operation, and that are provided with closure valves and valve operators that are normally retained in a pre-selected position, means for controlling movement of said valve operators in accordance with the indexing movement of said tables to control the position of said closure valves, and means for individually controlling movement of said upper and lower sections, wherein a predetermined quantity of liquid is filled in said cartons.

62. In apparatus as set forth in claim 61, said controlling means for said valve operators including elongated bar cams that are interconnected to said valve operators, and means for controlling movement of said bar cams in accordance with the indexing movement of said second table.

63. In apparatus as set forth in claim 62, said means for controlling movement of said bar cams including a vertical cam shaft that is driven by the means for indexing said first table, a cam mounted on said vertical cam shaft and having a rod interconnected thereto for reciprocation thereby, a linkage responsive to reciprocating movement of said rod and operatively interconnected to said vertical bar cams, wherein reciprocation of said rod in accordance with the configuration of the cam connected thereto causes said bar cams to be vertically moved for controlling operation of said valve operators and the closure valves connected thereto.

64. In apparatus as set forth in claim 34, means for detecting the presence of a carton at the liquid filling station, said detecting means including a detecting finger normally engaging a carton, a detector shaft connected to said detecting finger and pivotally movable when said finger moves in the absence of a carton at said liquid filling station, a latch device connected to said detector shaft and operable normally to connect said rod to a liquid filling control member and being movable by said detector shaft to disconnect said rod from operable connection with said liquid filling control member so as to prevent dispensing of liquid when a carton is not located at the liquid filling station.

65. In apparatus for automatically processing a plurality of cartons from an open-ended flat folded condition to erected and sealed form, wherein the cartons are filled with a liquid, the combination comprising a first table mounted for intermittent rotary movement, a second table located adjacent said first table and mounted for intermittent rotary movement in response to rotation of said first table, means for successively loading a plurality of said cartons on said first table, wherein the cartons on said first table are sequentially moved therewith to a plurality of work stations located at said first table to close and seal the bottoms of the cartons on said first table, means for removing the bottom sealed cartons from said first table and transferring them in oriented relation to a loading station at said second table, wherein the cartons are sequentially moved with said second table to a plurality of work stations located at said second table, the cartons thereby being filled with a liquid and sealed, and means for unloading the filled and sealed cartons from said second table.

66. In apparatus as set forth in claim 65, means for drivingly interconnecting said second table to said first table wherein rotation of said first table produces an angular movement of said second table in accordance with the ratio of the drive between said tables.

67. In apparatus as set forth in claim 65, said removing and transferring means including an unloading device and a transfer mechanism that are operable in timed relation with respect to movement of said tables.

68. In apparatus as set forth in claim 67, said loading means and said unloading device being operatively interconnected, wherein the loading of a carton onto said first table and the removal of a carton therefrom is carried out substantially simultaneously.

69. In apparatus as set forth in claim 68, said unloading device including a picker arm that is mounted for continuous rotation adjacent the unload station at said first table, a suction member secured to said picker arm and said picker arm being located such that its rotary movement carries said suction member into engagement with the carton that is located at the first table unload station, said loading means including a downwardly traveling plunger the movement of which is timed with the engagement of the suction member with the carton at the first table unload station, wherein the interconnection of said loading means and said unloading device provides for lifting of the picker arm and the suction member with the carton engaged thereby simultaneously with the downward travel of said plunger.

70. In apparatus as set forth in claim 69, a vertical shaft mounted for continuous rotation and having a spring secured thereto, said picker arm being mounted on said vertical shaft and being connected to said spring that is tensioned so as to resiliently interconnect said picker arm and vertical shaft, wherein said picker arm normally rotates with said vertical shaft in phase therewith, said spring being operative to permit relative movement of said picker arm with respect to said vertical shaft when the suction member of said picker arm engages a carton at the first table unload station, and being further operative to return said picker arm to the in-phase position with said rotating vertical shaft after the picker arm is vertically lifted at the first table unload station.

71. In apparatus as set forth in claim 70, stop means interconnecting said picker arm to said vertical shaft and normally limiting the position of said picker arm so that said picker arm rotates in-phase with said vertical shaft, but permitting the relative movement of said picker arm with respect to said vertical shaft when the suction member engages a carton at said first table unload station.

72. In apparatus as set forth in claim 65, a drive assembly, means responsive to operation of said drive assembly and operatively interconnected to said first table for periodically indexing said first table, a plurality of work devices located at the work stations at said first table and responsive to operation of said drive assembly for carrying out a work operation on the cartons located at the work stations at said first table, immediately subsequent to an indexing movement of said first table.

73. In apparatus as set forth in claim 72, a vertical push rod extending through said first table and being operatively connected to said drive assembly for sequential vertical reciprocation, the work devices at said first table being operatively connected to said vertical push rod and responsive to the vertical movement thereof for movement in a direction toward the cartons located at the first table work stations, wherein said work devices perform selected work operations on the bottom ends of said cartons.

74. In apparatus as set forth in claim 65, said loading means for loading the cartons on said first table including an inclined hopper in which the cartons are stacked in flat folded upside-down position and in face-to-face relation, said hopper including inclined members between which the cartons are located, and a feed plate mounted on said inclined members in sliding relation therewith and bearing against the rearmost of said cartons for urging said cartons forwardly in said hopper to the load position.

75. In apparatus as set forth in claim 65, said loading means for loading the carton at said first table including a linkage assembly to which a load picker arm is operatively connected, said load picker arm having suction means secured thereto for engagement with cartons located adjacent said first table, and means for operating said linkage assembly in a predetermined sequence of movements, said load picker arm thereby being moved to a first position to present said suction member for engagement with a carton thereat, said picker arm then being moved to locate said carton in an overbent position and said picker arm thereafter being partially retracted to present the engaged carton in open-ended erected form at a load position for loading onto said first table.

76. In apparatus as set forth in claim 78, said loading means further including a load pusher that is normally located vertically above said load position of the cartons and that is movable at predetermined intervals in a downward direction into engagement with the cartons located at said load position to force said cartons onto the first table at the load station thereof, and means located below the load position of said cartons for guiding said cartons onto said first table.

77. In a device for sucessively removing a plurality of cartons from a hopper, wherein the cartons are of the open-end tubular type and are stacked in said hopper in flat-folded condition, and said hopper has a feed end in which the stacked cartons are placed and a discharge end from which the cartons are individually removed, the combination comprising gates fixed to the discharge end of said hopper and defining end stops for the cartons located therein, a load member mounted for pivotal movement in a prescribed path and including a suction element thereon, and means for moving said load member in the prescribed pivotal path thereof wherein the suction element is brought into contact with the endmost carton at the discharge end of said carton, the prescribed path of said load member moving the suction element and the carton engaged thereto to a point beyond the confines of said hopper, the edge of the engaged carton being restrained from movement by a gate to cause the carton to be erected to an overbent position, wherein the carton panels are overfolded along the longitudinal edges, thereof, the load member then moving in its prescribed path to retract the carton engaged by the suction element from the overbent position to a load position adjacent the discharge end of said hopper, the carton at the load position having a substantially square open-end configuration for loading onto a work table located adjacent said hopper.

78. In a device as set forth in claim 77, said work table being located below the position where the carton is held in a square erected open-end condition, and means located above said load member and movable in timed relation with respect to movement of said work table for engaging the square erected open-end carton for moving it downwardly in a linear direction onto said work table.

79. In a device for successively removing erected cartons from a table for transfer to a discharge area, means for indexing said table at periodic intervals, means for retaining said erected cartons on said table in spaced relation, a continuously rotating vertical shaft located adjacent said table, a picker arm mounted on said shaft, means for normally mounting said picker arm for in-phase rotation with respect to said shaft, said mounting means including a resilient interconnection between said picker arm and shaft, wherein said picker arm may have momentary relative movement when a carton is engaged thereby on said table, and means for lifting said picker arm vertically upon contact of the picker arm with a carton, the vertical movement of said picker arm combined with the rotary movement thereof by said shaft, transferring the engaged carton to the discharge area.

80. In a device as set forth in claim 79, said mounting means including a first collar fixed to said shaft for rotation therewith, a second collar secured to said picker arm, a slot formed in one of said collars and a pin fixed to the other collar and movable in said slot, the resilient interconnection moving said collars with respect to each other to normally locate the pin at one end of said slot, wherein said picker arm is drivingly connected to said shaft through said collars, said slot cooperating with said resilient interconnection to provide for the momentary relative movement of said picker arm with respect to said shaft, when the picker arm engages a carton on said table.

81. In a device as set forth in claim 79, said picker arm having a suction member attached thereto, and means for controlling the operation of said suction member so that a suction is present therein when the picker arm is moved into engagement with a carton on said table, the carton thereby being securely retained on said suction member.

82. In a device as set forth in claim 81, an air pressure manifold located adjacent said discharge area and including nozzles through which air under pressure is directed, means for controlling operation of said air pressure manifold, wherein the air under pressure is directed through the nozzles therein into contact with a carton that has been moved to the discharge area by said picker arm, said means for controlling operation of said suction member being simultaneously operated with said air pressure manifold control means to cut off the suction in said suction member for releasing the carton at the discharge area, whereby the air under pressure directs said carton from said discharge area to an orienting station.

83. In apparatus for prefolding the end panels of a carton along the panel score lines after the carton has been erected from a flat folded position to substantially a square configuration, means for locating said carton in a fixed position during the prefolding operation, a bracket that is spaced from the fixed carton, a prefolding member that is fixed to said bracket and that includes opposed walls, at least a portion of the inside surfaces of which are inclined, the slope of the inclined surfaces defining the slope that the carton panels to be engaged thereby will assume during the prefolding operation, means for moving said bracket and prefolding member secured thereto toward said fixed carton, wherein said inclined surfaces strike panels to be prefolded for prefolding these panels along their score lines, said prefolding member further including opposed fingers that are fixed with respect to said walls and that are movable therewith when said bracket is moved toward said carton, said fingers being located intermediate said walls at the ends thereof and including projecting portions that engage side panels of said carton to bend these panels along their score lines when said bracket is moved toward said carton, the inclined surfaces of said walls thereafter engaging the carton end panels for bending them along their score lines to complete the prefolding operation, each of said fingers including a notch formed in the projecting portion thereof and an inclined portion located adjacent said notch, the notches in said fingers striking the outer edges of panels of said cartons to begin the prefolding operation when said bracket is moved toward said carton, the inclined portions of said fingers thereafter engaging the struck panels to further fold these panels along their score lines to an outer position upon further movement of said bracket toward said carton.

84. In apparatus as set forth in claim 83, an inner mandrel mounted for relative movement with respect to said prefolding member and bracket and including a plate that is shaped and proportioned for entry within the interior of said carton, and means for moving said inner mandrel within said carton to a predetermined position prior to the movement of said prefolding member and fingers secured thereto toward said carton, the inner mandrel in the interior location thereof defining a back-up means over which the panels are folded by said fingers and walls during the prefolding operation.

85. In apparatus for folding and sealing the end panels of a plastic coated carton that has been erected from a flat folded position to substantially a square configuration a table, means on said table for locating said carton in a fixed position thereon with the end panels of the carton to be folded and sealed being exposed at an outer end thereof, a sealing member mounted for movement with respect to said table and located above the carton that is positioned on said table, a folding member located adjacent said sealing member on the entry side thereof and including means for folding the end panels of said carton to a closed position prior to movement beneath said sealing member, means for heating said end panels, means for effecting relative movement of said table with respect to said folding member and sealing member so as to move the carton under said folding member to foldably close the heated end panels and to then move the carton with the heated and folded end panels beneath said sealing member, and means for moving said sealing member into positive engagement with the heated and folded end panels for effecting a sealing action thereof.

86. In apparatus as set forth in claim 85, said folding member being secured to said sealing member and movable therewith.

87. In apparatus as set forth in claim 86, said folding member having ribs formed on the underside thereof that are disposed in converging relation toward said sealing member, wherein the end panels engage said ribs and are effectively folded to a closed position thereby when the carton is moved under said folding member during relative movement of said table with respect to said folding and sealing members.

88. In apparatus as set forth in claim 85, said means for moving said sealing member into positive engagement with the heated and folded end panels including a vertical slide on which said sealing member is mounted, a fixed bracket in which said vertical slide is vertically movable, a roller fixed to said vertical slide, spring means for normally urging said vertical slide to an upper position, a pivotally mounted cam link engaging said roller for moving said roller and slide secured thereto downwardly against the action of said spring, and means engaging said cam link for effecting pivotal movement thereof, wherein said roller and slide are moved vertically to control the sealing operation of said carton end panels.

89. In a turn over orienting funnel for reversing the endwise position of erected tubular cartons that are directed thereto with the bottom ends of the cartons being first inserted in said funnel, the combination comprising a housing having a lower portion that defines a base and an upper portion in which an orienting chamber is formed, said upper portion including a vertical wall in which an opening is formed that communicates with said orienting chamber, said opening being proportioned for receiving a carton therein in endwise position, the lower end of said chamber being defined by a downwardly inclined wall that faces in a direction 90° removed from the plane of said opening, and an opening formed in the lower end of said upper portion and communicating with said chamber and the downwardly inclined wall thereof, wherein a carton that is inserted in said housing with the bottom end first is reversed in position and directed by said inclined wall downwardly to a transfer station in upright and oriented position.

90. In apparatus for processing a plurality of cartons from flat folded to erected condition for filling with a liquid, a table on which said cartons are held in fixed and spaced relation, a sealing device for sealing the top panels of said cartons said sealing device including a housing, a vertically movable seal slide mounted for vertical movement within said housing and having a seal head secured to the lowermost end thereof, inclined ramps formed on opposed sides of said seal slide adjacent said seal head, a fold arm slide mounted for limited vertical movement with said seal slide, means for limiting the vertical movement of said fold arm slide with respect to said seal slide, a fold arm pivotally interconnected to said fold arm slide and pivotally movable to a seal position when the fold arm slide is moved to the lower limit of the vertical position thereof, a fold finger pivotally connected to said housing and having a cam follower joined to an end thereof, a cam secured to said seal slide and movable therewith for engaging said cam follower to pivot said fold finger to an operative position, opposed anvils mounted for pivotal movement on said housing and having followers secured thereto for engagement with said ramps, means for normally locating said anvils in a lower pivoted position, and means for moving said seal slide from an upper inoperative position at which the anvil followers engage the ramps to pivot the anvils outwardly, to a lower position, wherein the fold finger is pivoted by engagement of the cam with the cam follower for striking the lead panel of a carton to partially fold said lead panel, the initial movement of said seal slide carrying the fold arm slide therewith to the lower limit position thereof at which the fold arm engages said lead panel to retain said lead panel in the seal position thereof, further downward movement of said seal slide causing said anvil followers to ride off said ramps so that said anvils are moved to a closed position in engagement with side panels of said carton, said seal head being simultaneously moved into engagement with the trailing panel of the carton, the seal head and anvils cooperating to produce the sealing action of said leading, trailing and side panels.

91. In a device for sealing the open end panels of an erected carton in which a liquid has been inserted, the open panels including a leading panel, a trailing panel, and side panels, all of the panels having been prefolded along their score lines, the combination comprising a vertical movable seal head, opposed anvils that are responsive to movement of said seal head and that cooperate therewith to engage said trailing and side panels during the sealing operation, a fold finger responsive to initial movement of said seal head to partially fold said leading panel, and a fold arm that is responsive to movement of said seal head for movement against the partially folded leading panel to locate said leading panel in the seal position thereof, and means for moving said seal head in a vertical direction to cause sequential movement of said fold finger, fold arm, and anvils to the operative position thereof during the sealing operation.

92. In a device for sealing the end panels of a carton, the end panels including a leading panel, a trailing panel and side panels, the combination comprising a sealing member that is movable in a linear direction for engagement with the trailing panel, a first means for initially engaging said leading panel for the partial folding thereof, a second means for engaging said partially folded leading panel and locating said leading panel in sealing position, and a third means for engaging said side panels during the sealing operation, and means for moving said sealing member from an inoperative to a sealing position in engagement with the trailing panel, the movement of said sealing member producing sequential movement of said first, second and third means.

93. In a device for sealing the end panels of a carton, a housing, a sealing member mounted for movement in a linear direction in said housing from an inoperative to operative sealing position, slide means responsive to movement of said sealing member for limited movement therewith, means for restraining said slide means from further movement after the limited movement thereof, means responsive to the limited movement of said slide means for locating a panel of said carton in a sealing position, and anvil means movable in response to the movement of said sealing member for predetermined location with respect to the panels of said cartons so as to cooperate with said sealing member to effect a sealing action of said panels.

94. In a device as set forth in claim 93, said restraining means including a latch pin that is retained in a slot formed in the sealing member and in an opening formed in said slide means when the sealing member is located in the inoperative position thereof, a slot formed in said housing and receiving the pin therein for locking said pin therein after limited simultaneous movement of said sealing member and slide means wherein said pin is retained in said opening in said slide means and in the slot in said housing to prevent further movement of said slide means with respect to said sealing member.

95. In a device as set forth in claim 93, cam means formed on said sealing member for engaging said anvil means in the inoperative position of said sealing member, thereby locating said anvil means in an outer position, and means interconnecting said anvil means for moving said anvil means to an operative sealing position when said sealing member moves to the operative position thereof.

96. In a device as set forth in claim 95, a fold finger mounted for pivotal movement in said housing and movable in response to movement of said sealing member for engaging and partially folding a carton panel during the initial phase of the panel sealing operation.

97. In apparatus for processing cartons from flat folded to erected form, a first table, means for moving said first table, means for successively loading said cartons on said first table, means for processing said cartons at said first table, means for unloading said cartons from said first table, means for directing said unloaded cartons to a transfer station, a second table for processing said cartons and movable in response to movement of said first table, and means for transferring the cartons that are unloaded from said first table to said second table.

98. In apparatus as set forth in claim 97, said transferring means including a push member that is movable in a horizontal direction, means responsive to movement of said tables for moving said push member, pivotal guide members located adjacent said push member for guiding said cartons onto said second table, and means responsive to movement of said pusher member for pivotally driving said guide members into the guide position thereof.

99. An apparatus for automatically processing a plurality of containers from flat folded tube form to an erected form, wherein the containers are filled with a liquid and sealed, the combination comprising a first circular table mounted for rotation, a second circular rotatably mounted table operatively interconnected to said first table and driven thereby, means for intermittently rotating said first table, said second table being indexed at intervals in accordance with the movement of said first table, means for successively erecting said containers from their flat folded to open-ended form and for successively feeding the erected containers to an unloading station on said first table in bottom side up position, a plurality of work stations located in spaced relation at said first table, means located at said work stations and responsive to the means for rotating said first table for successively folding, heating and sealing the bottom sides of said containers, means for transferring the bottom sealed containers to a load station at said second table in top side up position, a plurality of work stations located in spaced relation at said second table, means for successively prefolding the tops of said containers, filling said containers with a liquid, heating the container tops and sealing the tops of the filled containers and means for unloading the filled and sealed containers from said second table, said load station on said first table including an upstanding mandrel on which an open-ended erected carton is inserted, the bottom-side up erected carton including opposed upstanding panels, said pusher means including opposed ears for engaging said opposed panels for moving the carton in the withdrawn position downwardly, said guide means being shaped and proportioned for receiving said withdrawn carton and pusher means therein and including opposed grooves for accommodating said ears as said pusher means travels downwardly therethrough during the loading movement thereof and when the withdrawn carton is inserted on the mandrel at said load station.

References Cited by the Examiner
UNITED STATES PATENTS

| | | |
|---|---|---|
| 1,627,169 | 5/1927 | Gangler. |
| 2,760,320 | 8/1956 | Piazze _____ 53—183 |
| 3,002,328 | 10/1961 | Monroe et al. _____ 53—375 X |
| 3,120,089 | 2/1964 | Monroe et al. _____ 53—186 |
| 3,239,995 | 3/1966 | Monroe et al. _____ 53—375 |
| 3,248,841 | 5/1966 | Heffelfinger et al. _____ 53—29 |

GRANVILLE Y. CUSTER, Jr., *Primary Examiner.*